United States Patent [19]
Allen et al.

[11] Patent Number: 5,465,359
[45] Date of Patent: Nov. 7, 1995

[54] METHOD AND SYSTEM FOR MANAGING DATA AND USERS OF DATA IN A DATA PROCESSING SYSTEM

[75] Inventors: Ruth A. Allen, Poughkeepsie, N.Y.; Lisa M. Goetze, Austin, Tex.; Jeffrey M. Nick, Fishkill, N.Y.; Kelly B. Pushong, Highland, N.Y.; David H. Surman, Milton, N.Y.; Michael D. Swanson, Poughkeepsie, N.Y.

[73] Assignee: International Business Machines Corporation, Armonk, N.Y.

[21] Appl. No.: 146,727

[22] Filed: Nov. 1, 1993

[51] Int. Cl.[6] .................................................. G06F 9/06
[52] U.S. Cl. .............................. 395/700; 364/DIG. 1; 364/281.3; 364/243.41
[58] Field of Search ...................................... 395/650, 700

[56] References Cited

U.S. PATENT DOCUMENTS

| | | | |
|---|---|---|---|
| 3,768,074 | 10/1973 | Sharp et al. | 364/DIG. 1 |
| 4,622,633 | 11/1986 | Ceccon et al. | 364/DIG. 1 |
| 4,890,223 | 12/1989 | Cruess et al. | 364/DIG. 1 |
| 4,980,818 | 12/1990 | Shinmura | 364/DIG. 1 |
| 5,027,269 | 6/1991 | Grant et al. | 364/DIG. 1 |
| 5,093,918 | 3/1992 | Heyen et al. | 364/DIG. 1 |
| 5,129,083 | 7/1992 | Cutler et al. | 364/DIG. 1 |
| 5,144,556 | 9/1992 | Wang et al. | 395/145 X |
| 5,187,790 | 2/1993 | East et al. | 364/DIG. 1 |
| 5,220,657 | 6/1993 | Bly et al. | 364/DIG. 1 |
| 5,276,901 | 1/1994 | Howell et al. | 364/DIG. 1 |
| 5,317,739 | 5/1994 | Elko et al. | 395/650 |

*Primary Examiner*—Thomas M. Heckler
*Attorney, Agent, or Firm*—Bernard M. Goldman; Joann K. Crockatt

[57] ABSTRACT

A method and system for managing information in a data processing system is provided. The data processing system includes one or more operating systems coupled to a coupling facility. Stored within the coupling facility is data, which is accessed by one or more users. The status of those users are also stored in the coupling facility. A number of operating system services are provided for recording the users' status and managing the data and the users of the data. The data may include cache, list and/or lock structures.

75 Claims, 31 Drawing Sheets

CACHE-STRUCTURE CONTROLS

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CAST-OUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM STRUCTURE SIZE | (MNSS) |
| STRUCTURE AUTHORITY | (SAU) |
| USER STRUCTURE CONTROL | (USC) |
| LCID VECTOR | (LCIDV) |

*fig. 4*

DIRECTORY INFORMATION BLOCK

| | |
|---|---|
| NAME | (N) |
| USER-DATA FIELD | (UDF) |
| STORAGE CLASS | (SC) |
| CHANGE INDICATOR | (C) |
| DATA-CACHED INDICATOR | (D) |
| CAST-OUT-PARITY-BITS INDICATOR | (CP) |
| CAST-OUT CLASS | (CC) |
| CAST-OUT-LOCK VALUE | (CLV) |
| DATA-AREA SIZE | (DAS) |
| LOCAL-CACHE IDENTIFIER | (LCID) |
| LCEN-VALIDITY INDICATOR | (LVI) |
| LOCAL-CACHE ENTRY NUMBER | (LCEN) |

*fig. 6*

LIST-STRUCTURE CONTROLS

| | |
|---|---|
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| LIST-ELEMENT CHARACTERISTIC | (LELX) |
| MINIMUM STRUCTURE SIZE | (MNSS) |
| LOCK-TABLE-ENTRY COUNT | (LTEC) |
| LIST COUNT | (LC) |
| STRUCTURE SIZE | (SS) |
| MAXIMUM STRUCTURE SIZE | (MXSS) |
| MAXIMUM LIST-SET-ELEMENT COUNT | (MLSELC) |
| LIST-SET-ELEMENT COUNT | (LSELC) |
| NON-ZERO-LOCK-TABLE-ENTRY COUNT | (NLTEC) |
| MAXIMUM LIST-SET-ENTRY COUNT | (MLSELC) |
| LIST-SET-ENTRY COUNT | (LSEC) |
| STRUCTURE AUTHORITY | (SAU) |
| USER STRUCTURE CONTROL | (USC) |
| USER-IDENTIFIER VECTOR | (UIDV) |

LIST-USER CONTROL BLOCK (LUCB)

| | |
|---|---|
| USER IDENTIFIER | (UID) |
| USER STATE | (US) |
| LIST-NOTIFICATION TOKEN | (LNT) |
| USER AUTHORITY | (UAU) |
| SYSTEM IDENTIFIER | (SYID) |
| USER-ATTACHMENT CONTROL | (UAC) |
| DETACHMENT RESTART TOKEN | (DURT) |

LIST ENTRY CONTROL BLOCK (LECB)

| | |
|---|---|
| DATA-LIST-ENTRY SIZE | (DLES) |
| LIST NUMBER | (LN) |
| LIST-ENTRY IDENTIFIER | (LEID) |
| VERSION NUMBER | (VN) |
| LIST-ENTRY KEY | (LEK) |
| LIST-ENTRY NAME | (LEN) |

LIST CONTROLS

```
┌─────────────────────────────────────────────────┐
│  LIST-ENTRY-COUNT LIMIT              (LECL)     │
│                                                 │
│  LIST-ENTRY-COUNT                    (LEC)      │
│                                                 │
│  LIST-STATE-TRANSITION COUNT         (LSTC)     │
│                                                 │
│  LIST AUTHORITY                      (LAU)      │
│                                                 │
│  USER LIST CONTROLS                  (ULC)      │
│                                                 │
│  LIST-MONITOR-TABLE ENTRY 0                     │
│       LIST-MONITORING-ACTIVE BIT     (LMAB)     │
│       LIST-NOTIFICATION-REQUEST TYPE (LNRT)     │
│       LIST-NOTIFICATION-ENTRY NUMBER (LNEN)     │
│                                                 │
│  LIST-MONITOR-TABLE ENTRY 1                     │
│       LIST-MONITORING-ACTIVE                    │
│       LIST-NOTIFICATION-REQUEST TYPE            │
│       LIST-NOTIFICATION-ENTRY NUMBER            │
│       ...                                       │
│  LIST-MONITOR-TABLE ENTRY n                     │
│       LIST-MONITORING-ACTIVE                    │
│       LIST-NOTIFICATION-REQUEST TYPE            │
│       LIST-NOTIFICATION-ENTRY NUMBER            │
└─────────────────────────────────────────────────┘
```

REQUEST/RESPONSE OPERANDS

| | |
|---|---|
| ATTACHMENT INFORMATION | (AINF) |
| COMPARATIVE LOCAL-CACHE AUTHORITY | (CLCAU) |
| COMPARATIVE STRUCTURE AUTHORITY | (CSAU) |
| COMPARATIVE USER AUTHORITY | (CUAU) |
| DETACHMENT-REQUEST TYPE | (DRT) |
| LIST-MONITORING-ACTIVE BIT | (LMAB) |
| LIST-NOTIFICATION-ENTRY NUMBER | (LNEN) |
| LIST-NOTIFICATION-TOKEN | (LNT) |
| LCID-UNASSIGNMENT CONTROL | (LUC) |
| LOCAL-CACHE AUTHORITY | (LCAU) |
| LOCAL-CACHE-ENTRY NUMBER | (LCEN) |
| LOCAL-CACHE IDENTIFIER | (LCID) |
| LOCAL-CACHE TOKEN | (LCT) |
| STRUCTURE AUTHORITY | (SAU) |
| USER-ATTACHMENT CONTROL | (UAC) |
| USER AUTHORITY | (UAU) |
| USER IDENTIFIER | (UID) |
| USER STATE | (US) |
| USER STRUCTURE CONTROL | (USC) |
| ALLOCATON TYPE | (AT) | fig. 13

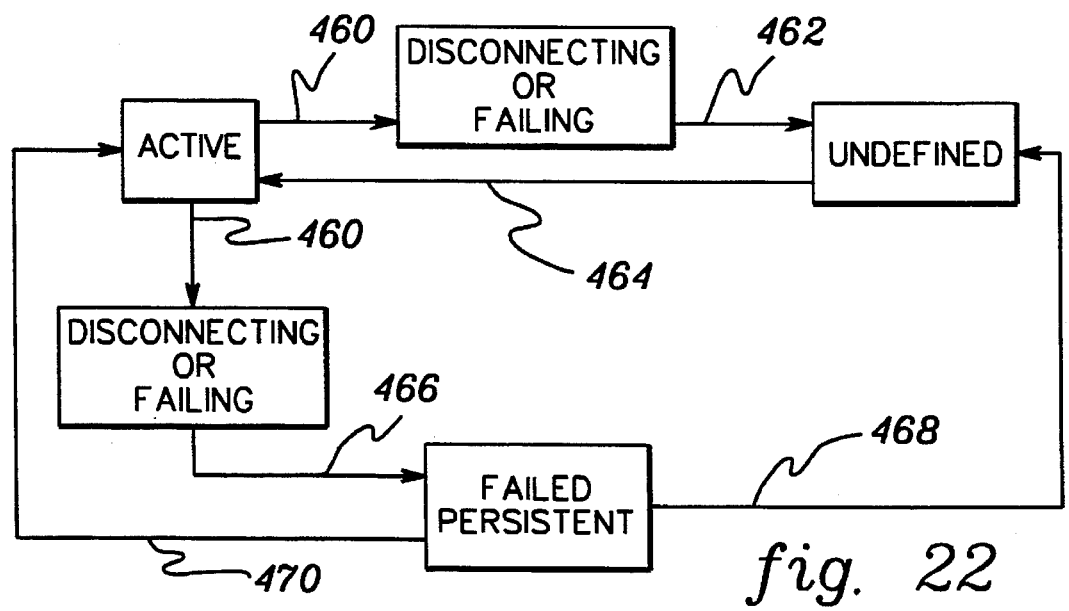

fig. 22

DISCONNECT/FAILED

METHOD AND SYSTEM FOR MANAGING DATA AND USERS OF DATA IN A DATA PROCESSING SYSTEM

TECHNICAL FIELD

This invention relates in general to the field of data processing and, in particular, to the management of structures and users of structures of a coupling facility located in a data processing system.

CROSS REFERENCE TO RELATED APPLICATIONS

This application contains subject matter which is related to the subject matter of the following applications which are assigned to the same assignee as this application. Each of the below listed applications is hereby incorporated by reference:

"Configurable, Recoverable Parallel Bus," by N. G. Bartow et al., Ser. No. 07/839,657, (Docket No. PO9-91-066), Filed: Feb. 20, 1992, now U.S. Pat. No. 5,357,608;

"High Performance Intersystem Communications For Data Processing Systems," by N. G. Bartow et al., Ser. No. 07/839,652, (Docket No. PO9-91-067), Filed: Feb. 20, 1992, now U.S. Pat. No. 5,412,803;

"Frame-Group Transmission And Reception For Parallel/Serial Buses," by N. G. Bartow et al., Ser. No. 07/839,986, (Docket No. PO9-92-001), Filed: Feb. 20, 1992, now U.S. Pat. No. 5,267,240;

"Communicating Messages Between Processors And A Coupling Facility," by D. A. Elko et al., Ser. No. 07/860,380, (Docket No. PO9-91-006), Filed: Mar. 30, 1992, abandoned;

"Sysplex Shared Data Coherency Method And Means," by D. A. Elko et al., Ser. No. 07/860,805, (Docket No. PO9-91-052), Filed: Mar. 30, 1992;

"Method And Apparatus For Distributed Locking Of Shared Data, Employing A Central Coupling Facility," by D. A. Elko et al., Ser. No. 07/860,808, (Docket No. PO9-91-059), Filed: Mar. 30, 1992, now U.S. Pat. No. 5,339,427;

"Command Quiesce Function," by D. A. Elko et al., Ser. No. 07/860,330, (Docket No. PO9-91-062), Filed: Mar. 30, 1992, now U.S. Pat. No. 5,339,405;

"Storage Element For A Shared Electronic Storage Cache," by D. A. Elko et al., Ser. No. 07/860,807, (Docket No. PO9-91-078), Filed: Mar. 30, 1992;

"Management Of Data Movement From A SES Cache To DASD," by D. A. Elko et al, Ser. No. 07/860,806, (Docket No. PO9-91-079), Filed: Mar. 30, 1992;

"Command Retry System," by D. A. Elko et al., Ser. No. 07/860,378, (Docket No. PO9-92-002), Filed: Mar. 30, 1992, now U.S. Pat. No. 5,392,397;

"Integrity Of Data Objects Used To Maintain State Information For Shared Data At A Local Complex," by D. A. Elko et al , Ser. No. 07/860,800, (Docket No. PO9-92-003), Filed: Mar. 30, 1992, now U.S. Pat. No. 5,331,673;

"Management Of Data Objects Used To Maintain State Information For Shared Data At A Local Complex," by J. A. Frey et al , Ser. No. 07/860,797, (Docket No. PO9-92-004), Filed: Mar. 30, 1992, now U.S. Pat. No. 5,388,266;

"Recovery Of Data Objects Used To Maintain State Information For Shared Data At A Local Complex," by J. A. Frey et al., Ser. No. 07/860,647, (Docket No. PO9-92-005), Filed: Mar. 30, 1992, now U.S. Pat. No. 5,394,542;

"Message Path Mechanism For Managing Connections Between Processors And A Coupling Facility," by D. A. Elko et al., Ser. No. 07/860,646, (Docket No. PO9-92-006), Filed: Mar. 30, 1992, abandoned;

"Method And Apparatus For Notification Of State Transitions For Shared Lists Of Data Entries," by J. A. Frey et al., Ser. No. 07/860,809, (Docket No. PO9-92-007), Filed: Mar. 30, 1992, now U.S. Pat. No. 5,390,328;

"Method And Apparatus For Performing Conditional Operations On Externally Shared Data," by J. A. Frey et al., Ser. No. 07/860,655, (Docket No. PO9-92-008), Filed: Mar. 30, 1992, abandoned;

"Apparatus And Method For List Management In A Coupled DP System," by J. A. Frey et al., Ser. No. 07/860, 633, (Docket No. PO9-92-009), Filed: Mar. 30, 1992, now U.S. Pat. No. 5,410,695;

"Interdicting I/O And Messaging Operations In A Multi-System Complex," by D. A. Elko et al., Ser. No. 07/860,489, (Docket No. PO9-92-010), Filed: Mar. 30, 1992, now U.S. Pat. No. 5,394,554;

"Method And Apparatus For Coupling Data Processing Systems," by Elko et al., Ser. No. 07/860,803, (Docket No. PO9-92-012), Filed: Mar. 30, 1992, now U.S. Pat. No. 5,317,739;

"Authorization Method For Conditional Command Execution," by Elko et al., Ser. No. 08/021,285, (Docket No. PO9-92-018), Filed: Feb. 22, 1993, abandoned.

"A Dumping Service Facility For Multisystem Environment," by Elko et al., Ser. No. 08/073,909 (Docket No. PO9-92-068), Filed: Jun. 08, 1993; and "A Method And System For Capturing and Controlling Access To Information In A Coupling Facility," by Neuhard et al., Ser. No. 08/146,647 (Docket No. KI9-93-004), Filed Nov. 1, 1993.

BACKGROUND ART

Existing data processing systems allow for the tracking of data and/or the recording of the status of users of the data. For example, International Business Machines provides a system, referred to as a Data Base Recovery Control System (DBRC), for maintaining an inventory of the Information Management System (IMS) subsystems that are currently sharing data bases. In particular, when IMS wants to use a data base, it registers this usage with DBRC.

In addition to the above, techniques are available for recording where data is located on direct access storage devices (DASD). As one example, a volume table of contents (VTOC) is provided for indicating location of data. Further, a catalog may be provided, which can be used as a pointer to information stored on DASD.

In another example, a technique for maintaining the status of sessions within a network system is described in U.S. Pat. No. 5,027,269, entitled "Method and Apparatus for Providing Continuous Availability of Applications in a Computer Network," issued on Jun. 25, 1991 and assigned to International Business Machines. As described in the patent, session states, including states for suspended sessions, are tracked for future recovery actions.

The above techniques are disadvantageous, however, because there is no readily recognizable correlation of data and the users of that data. Data and the status of users usually has to be kept in case recovery is needed. As there is no correlation between data and the users of data, there is no automatic reuse of storage by software management systems. Further human intervention or program extensions are required for cleanup or recovery synchronization. The requirement of synchronization adds complexity to the system, degrades system performance and limits resource reuse.

SUMMARY OF THE INVENTION

The shortcomings of the prior art are overcome and additional advantages are provided through the provision of a method for managing information in a data processing system. A coupling facility is located within the data processing system and stored within the coupling facility is data. In addition, maintained at the coupling facility is the status of a user of the stored data. In one embodiment, associated with the stored data is one or more controls which are also stored within the coupling facility. The one or more controls and the status of the user may be modified in a single atomic operation.

In one embodiment, the single atomic operation comprises a detach command. The detach command deletes one or more of the controls associated with the data, resets a user control corresponding to the user of the data, and updates the status of the user. In one embodiment, the one or more controls are located within a cache structure within the coupling facility and the user is identified by a local cache identifier.

In another embodiment, the one or more controls are located within a list structure within the coupling facility and the user is identified by a user identifier.

In another embodiment of the invention, the one or more controls are updated when the user of the data is terminated. In a further embodiment, a determination is made as to whether the termination is a normal termination or termination due to failure. In a further embodiment, if the user terminates abnormally, the allocation of the stored data and the user is maintained until one or more predefined conditions occur.

In another embodiment of the invention, a method for managing information in a data processing system is provided. The data processing system includes a coupling facility. Stored within the coupling facility is one or more structures which include information. Also within the coupling facility status of users associated with one or more structures is maintained.

In another aspect of the invention, a system for managing information in a data processing system is provided. The system includes a coupling facility located within the data processing system for storing data. Further, means are included for maintaining at the coupling facility status of a user of the data. In a further aspect of the invention, one or more controls stored within the coupling facility are associated with the stored data. In a further aspect of the invention, a single atomic operation is used in order to modify the one or more controls and the status of the user.

In a further aspect of the invention, a system for managing information in a data processing system is provided. Information is stored in one or more structures stored within a coupling facility of the data processing system. In addition, means for maintaining at the coupling facility status of users associated with the one or more structures is provided.

In accordance with the principles of the present invention, data, such as cache structures, list structures and/or lock structures, are located within a coupling facility along with the status of users of the structures. Further, in accordance with the principles of the present invention, the status of a user may be conditionally kept, based on the manner in which termination of the user occurs. That is whether the user is terminated normally or abnormally. The continued existence of a structure may be determined by the presence of status regarding terminated users.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 4 depicts one example of the controls associated with a cache structure, in accordance with the principles of the present invention;

FIG. 5 depicts one example of a local cache control block associated with each local cache of the data processing system depicted in FIG. 1, in accordance with the principles of the present invention;

FIG. 6 depicts one embodiment of a directory information block in connection with the directory depicted in FIG. 3, in accordance with the principles of the present invention;

FIG. 8 depicts one example of the controls associated with the list structure of FIG. 7, in accordance with the principles of the present invention;

FIG. 9 depicts one embodiment of a list-user control block, in accordance with the principles of the present invention;

FIG. 10 depicts one example of the controls associated with a list within the list structure of FIG. 7, in accordance with the principles of the present invention;

FIG. 11 illustrates one example of a list entry control block, in accordance with the principles of the present invention;

FIG. 13 depicts one embodiment of request/response operands, in accordance with the principles of the present invention;

FIG. 22 illustrates one example of transitioning states, in accordance with the principles of the present invention;

BEST MODE FOR CARRYING OUT THE INVENTION

In accordance with the principles of the present invention, a management/recording facility is provided for managing structures and users of structures and for recording status of users and of structures in a data processing system. As described in further detail below, through this facility, structures and the status of users of these structures may be maintained across termination of one or all users of a coupling facility located within the data processing system. Stored within the coupling facility are both the structures and the status of the users of the structures.

Figure 1:
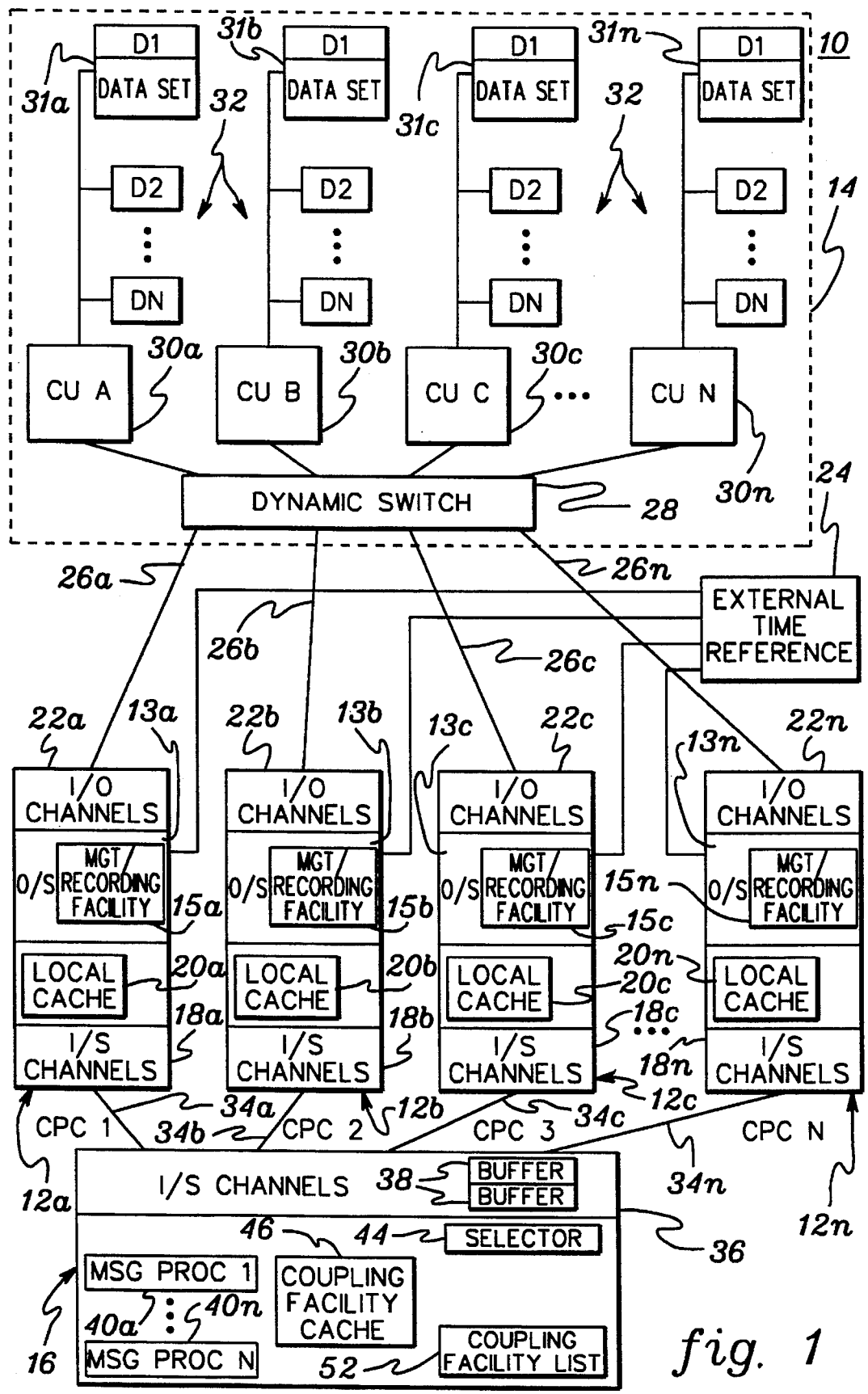
FIG. 1 depicts one example of a block diagram of a data processing system incorporating the management/recording facility of the present invention.

FIG. 1 is a block diagram of a data processing system 10 incorporating the management/recording facility of the present invention. Data processing system 10 includes multiple central processing complexes (CPCs) 12a through 12n which are coupled to an input/output (I/O) system 14 and a coupling facility 16. (As used herein, central processing complexes 12a–12n are collectively referred to as central processing complex (CPC) 12.) The main components associated with each central processing complex 12, input/output system 14 and coupling facility 16 are described in detail below.

Each of the CPCs 12a–12n may be an International Business Machines' (IBM) system following the Enterprise Systems Architecture/390 Principles of Operation as described in IBM publication SA22-7201-00, which is hereby incorporated by reference in its entirety. Each of CPCs 12a–12n includes one or more central processing units (CPUs) (not shown) which executes an operating system 13a–13n, respectively. As used herein, operating systems 13a–13n are collectively referred to as operating system 13. In one instance, operating system 13 is an International Business Machines' Multiple Virtual Storage (MVS) operating system for controlling execution of programs and the processing of data, as is well known. In addition, in accordance with the principles of the present invention, each operating system 13a–13n includes a management/recording (MGT/Recording) facility 15a–15n, respectively, for managing structures and users of structures and for recording status of users and structures in a coupling facility, as described further below.

In addition, each CPC 12a–12n contains a plurality of intersystem (I/S) channels 18a18n, a plurality of local caches 20a–20n, and a plurality of input/output (I/O) channels 22a–22n, respectively. (Local caches 20a–20n are referred to herein collectively as local cache 20. Similarly, intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information to be written into a log to document recovery from failures, backing out of undesired operations and for audit trails. External time reference 24, which uses fiber optic interconnect cables, synchronizes the time clocks (not shown) of CPCs 12a–12n to a precision equal to or less than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as DASD 32), which are controlled by the control units. Dynamic switch 28 may be an ESCON Director Dynamic Switch available from IBM Corporation, Armonk, N.Y. Such a dynamic switch is disclosed in U.S. patent application Ser. No. 07/429,267 for "Switch and its Protocol," filed Oct. 30, 1989 and assigned to the owner of the present invention, which application is incorporated herein by reference in its entirety. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

One or more of direct access storage devices 32 includes one or more data sets 31a–31n, respectively. In particular, DASD 32 may include one or more couple data sets for storing status information relating to one or more CPCs 12 (i.e., read information for all CPCs and write information relating to one CPC) and/or one or more function data sets for storing the active policy, as described in detail below. In one embodiment, the couple and function data sets are not stored on the same DASD data set or volume.

Each central processing complex 12a–12n is also coupled via a bus 34a–34n, respectively, to coupling facility 16. Coupling facility 16 contains storage accessible by the CPCs, performs operations requested by programs in the CPCs and maintains status regarding structures and users of structures located within the coupling facility. The coupling facility enables sharing of data, which is directly accessible by multiple operating systems. As described further below, the coupling facility contains control information regarding shared data and may contain shared data. In one embodiment, coupling facility 16 is a structured-external storage (SES) processor and includes, for example, a plurality of intersystem (I/S) channels 36 for communicating with intersystem channels 18a18n, one or more buffers 38 located within intersystem channels 36 for storing data received from intersystem channels 18a18n, message processors 40a–40n for handling messages, a selector 44 for directing message requests received over an intersystem channel to a message processor 40a–40n, a coupling facility cache 46 and a coupling facility list 52, which are described in further detail below. Even though only one coupling facility 16 is shown in the embodiment of FIG. 1, it will be understood that multiple coupling facilities may be provided for, each with its own I/S channels and message paths connected to all or some subset of the CPCs 12a–12n.

Figure 2:
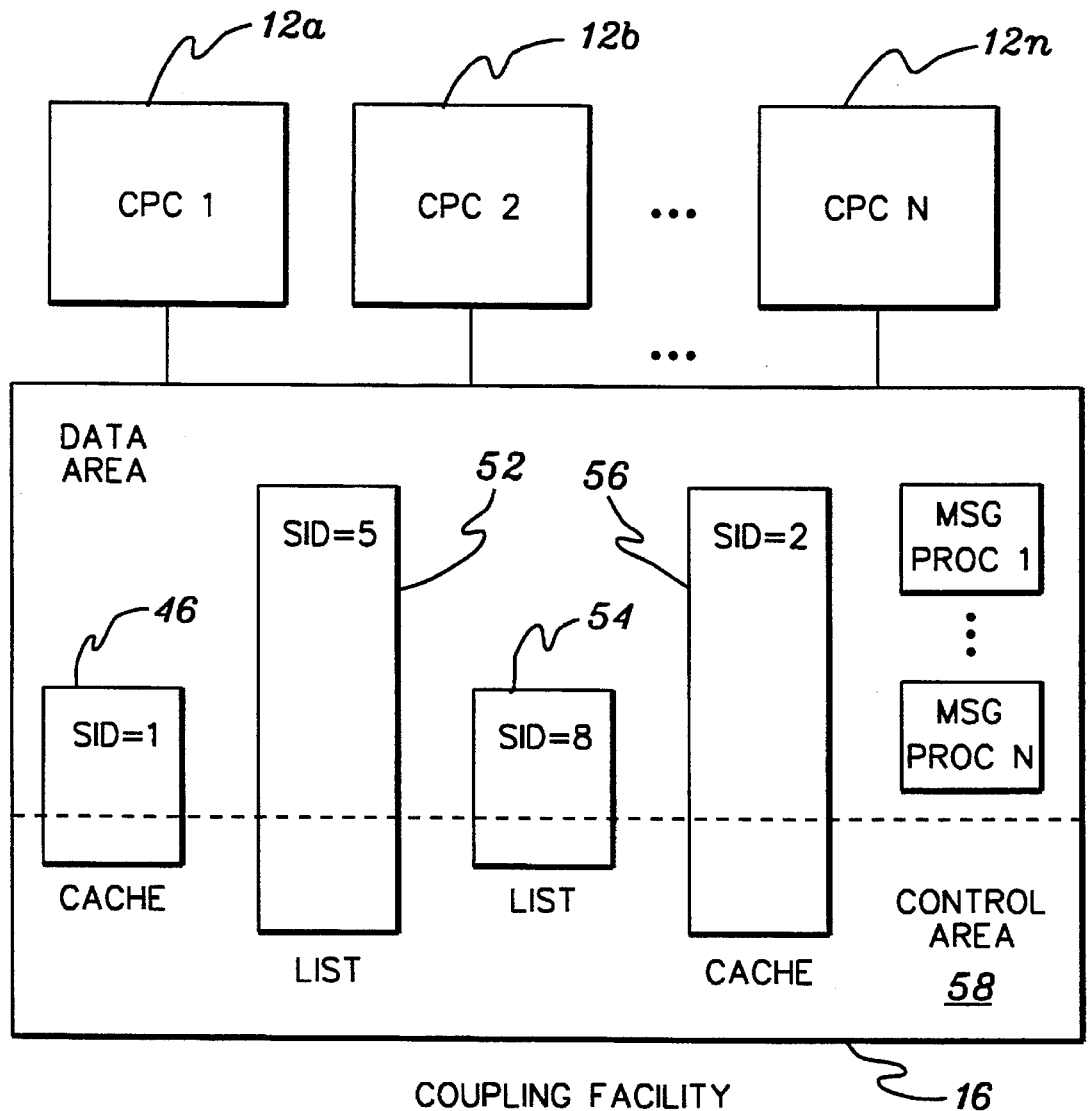
FIG. 2 depicts one example of a coupling facility including multiple storage structures, in accordance with the principles of the present invention.

Coupling facility cache 46 of coupling facility 16 is one example of a coupling facility storage structure. As shown in FIG. 2, coupling facility 16 includes multiple storage structures, such as storage structures 46, 52, 54 and 56. The storage structures include, for instance, list structures (for example, 52 and 54) and cache structures (for example, 46 and 56). Each coupling facility storage structure contains data objects and control objects. The data objects may reside in any storage location, whereas the control objects are generally restricted to control area 58.

Allocated structures (such as cache structures 46 and 56 and list structures 52 and 54) reside in separate coupling facility storage locations and are located by a structure identifier (SID). The SID value provides an identification of a target structure by a command. A command of a particular structure type, such as a cache-structure or list-structure command, may only address or alter the contents of a single structure of the given type. The allocation of a structure is described in detail below.

Figure 3:
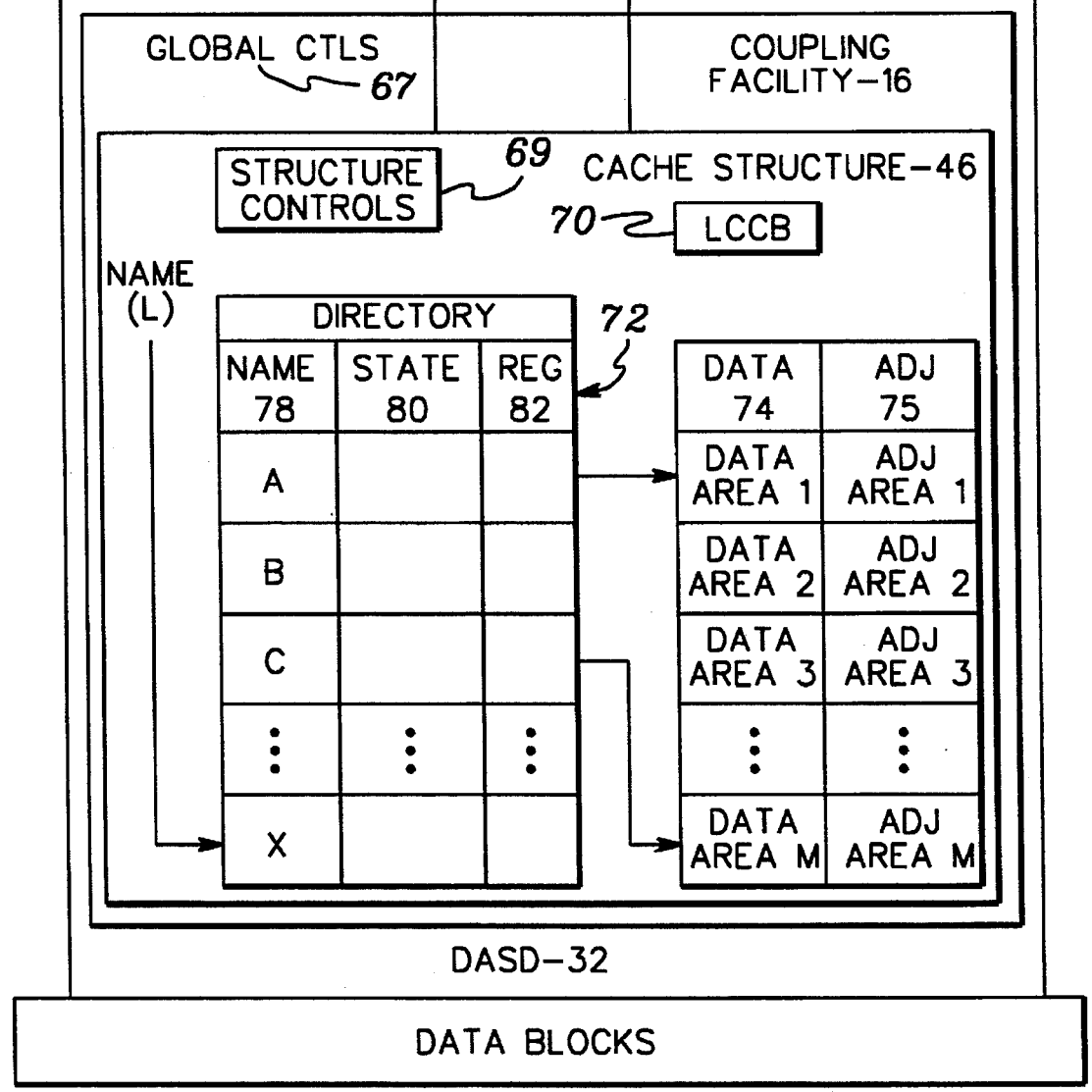
FIG. 3 depicts one embodiment of a three-level storage hierarchy in a network of attached processors, in accordance with the principles of the present invention.
Figure 7:
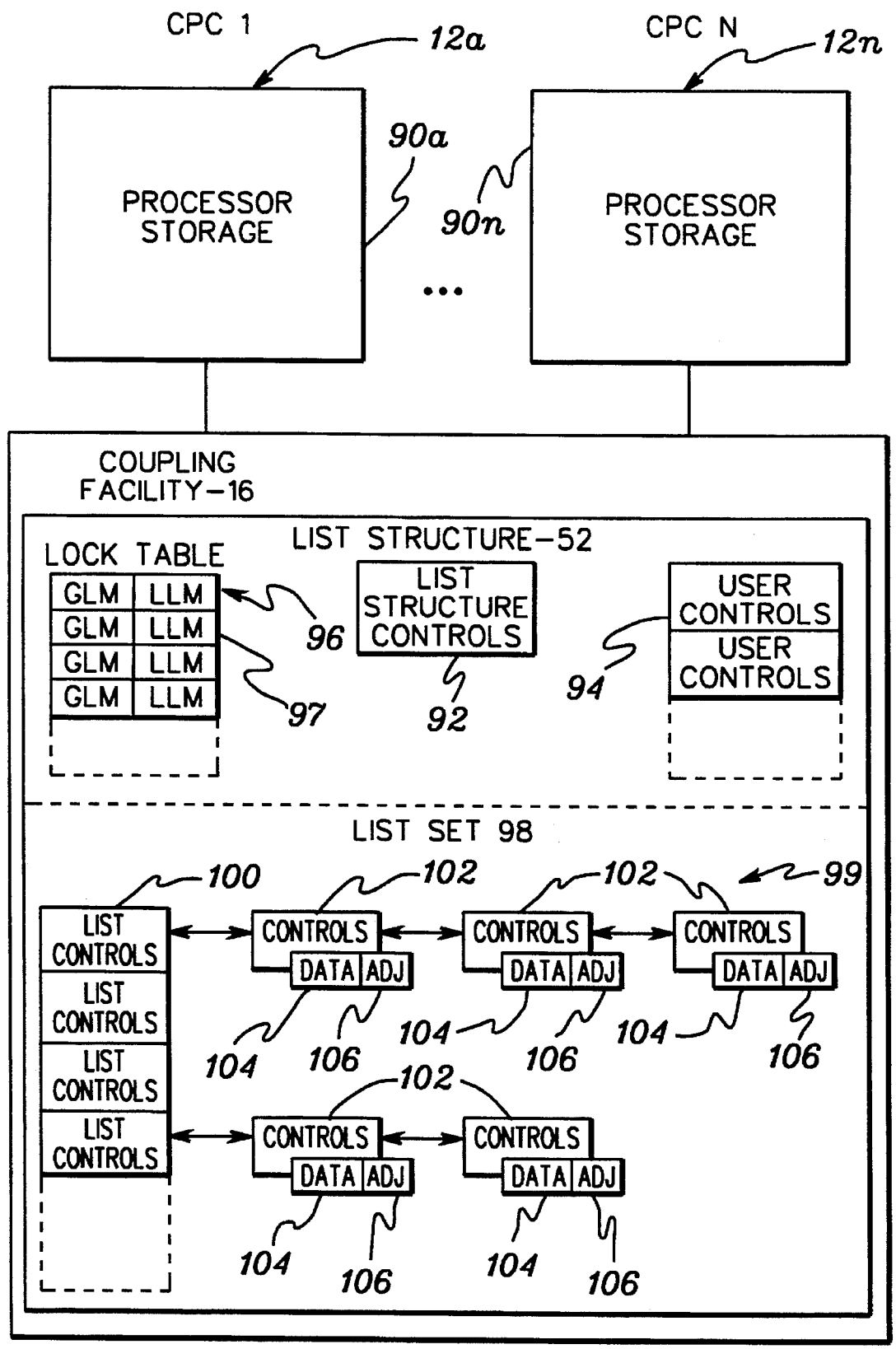
FIG. 7 depicts one example of a list structure, in accordance with the principles of the present invention.

The partitioning of the coupling facility storage and control area 58 into structures, as shown in FIGS. 2, 3 and 7, is managed by the operating system program. The data objects are organized in tables or lists with an optional adjunct data area. The remaining objects are controls. The relative amount of storage assigned to data and control objects is determined by program-specified parameters in the allocation commands.

Referring to FIG. 3, a three-level storage hierarchy in a network of attached processors 12a–12n is described. The lowest level of the hierarchy is DASD 32, the intermediate level is coupling facility cache structure 46, and the highest level is local cache 20 (e.g., local caches 20a and 20b). Each of these levels is described below.

Direct access storage devices 32 include data blocks which represent data stored in the devices. Local caches 20a and 20b include, for instance, a 16-byte name field 60A, 60B for referencing data; a data field 64A, 64B for storing the data; an optional adjunct data field 66A, 66B for additional data; and a state field 68A, 68B, respectively, for indicating whether the data is valid or invalid. When the data is located in local cache 20, the state of the data is either valid or invalid. The data is validated by CPU instructions and invalidated by, for example, SES-write and SES-invalidate operations. The valid state of the data is tested by a CPU instruction. A valid named data object must be registered in a coupling facility cache directory, described below, in order to maintain local cache coherency. Local cache coherency is maintained by the invalidation process. A registered local-cache entry may test as invalid.

Cache structure 46 includes, for instance, a number of cache structure controls 69, a number of local-cache control blocks (LCCB) 70, a directory 72, a data area 74, and an adjunct area 75, each of which is explained in further detail below.

As shown in FIG. 4, cache structure controls 69 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum Storage Class (MSC): A value that specifies the number of storage classes. Valid storage class values range from one to the maximum storage class value.

(e) Maximum Cast-Out Class (MCC): A value that specifies the number of cast-out classes. Valid cast-out class values range from one to the maximum cast-out class value.

(f) Data-Area-Element Characteristic (DAEX): A value that specifies the number of bytes in each data-area element. The size of the data-area element in bytes is the product of 256 and 2 raised to the power of the value specified in the data-area element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, SES storage allocated for the cache.

(i) Maximum Structure Size (MXSS): A value that specifies the maximum number of units of SES storage that can be allocated for the cache.

(j) Minimum Structure Size (MNSS): A value that specifies the minimum number of units of SES storage that can be allocated for the cache.

(k) Structure Authority (SAU): A value associated with each bit in a SID vector, described herein. The structure authority has two parts: A time of day (TOD), which reflects the moment when a system was allocating the structure and the system ID used to make the TOD unique. Paired with the sysplex name, it further identifies who caused the structure to be allocated.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with a local-cache identifier (LCID) value of (i). When the bit is one, the local-cache-identifier is assigned. The bit at position (i) is reset to zero when the local cache is detached and LCID unassignment is requested, when the cache structure is de-allocated, or when a SES power-on reset occurs. When the bit is zero, the local-cache-identifier is not assigned.

A local cache may have, for instance, local-cache states and local-cache-identifier states, described below:

Local-Cache States: A cache structure local cache exists when the associated local-cache identifier is assigned. When a local cache exists, it is either in the attached or the detached state. A local cache is placed in the attached state by an attach-local-cache command, described below. A local cache is placed in the detached state by a detach-local-cache command, also described below, when the detachment process is complete.

Local-Cache-Identifier States: A local-cache identifier is in the assigned state when the associated assigned bit in the local-cache-identifier vector is one. A local-cache identifier is placed in the assigned state by the attach-local-cache command. A local-cache identifier is in the unassigned state when the associated bit in the local-cache-identifier vector is zero. A local-cache identifier is placed in the unassigned state by the detach-local-cache command, depending on LCID-unassignment control, described herein.

As mentioned above, in addition to structure controls 69, cache structure 46 includes local-cache control block 70. Local-cache control block 70 includes a number of local cache controls, described below, which are initialized when a local cache is attached to a coupling facility cache. In accordance with the principles of the present invention, the local-cache control block includes the user status, as described below. In one embodiment, local-cache control block 70 includes the following fields (FIG. 5):

(a) Local-Cache Identifier (LCID): A value that identifies a local cache. The controls are deleted when the local-cache identifier is unassigned and they are valid when the local-cache identifier is assigned.

(b) Attachment Status (AS): A control that describes the state of the attachment of a local cache. When the value of the attachment status is one, the local cache is active. When the value of the attachment status is zero, the local cache is inactive.

The attachment status controls the execution of commands that specify the local cache. When the local cache is active, all commands that specify the local cache are processed normally. When the local cache is inactive, all commands that specify the local cache, except attach local-cache, detach local-cache and read local-cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path, used to communicate commands and messages (as described in co-pending U.S. patent applications entitled, "Communicating Messages Between Processors And A Coupling Facility," by D. A. Elko et al., Ser. No. 07/860,380, (Docket No. PO9-91-006), Filed: Mar. 30, 1992 and "Message Path Mechanism For Managing Connections Between Processors And A Coupling Facility," by D. A. Elko et al., Ser. No. 07/860,646, (Docket No. PO9-92-006), Filed: Mar. 30, 1992, each of which is hereby incorporated herein by reference in its entirety) is activated. The system identifier is maintained in a message-path status vector and copied into the local cache controls when an attach-local-cache command is communicated over the message path.

(f) Attachment Information (AINF): A value set by the program when the local cache is attached.

(g) Detachment Restart Token (DURT): A value used to indicate how far along a detachment process has proceeded.

Referring back to FIG. 3, cache structure 46 also includes a directory 72. Directory 72 is a collection of directory entries positioned into storage classes and arranged as a fully associative array. The directory is a repository of state and location information for the storage hierarchy. The subset of changed directory entries is additionally positioned into cast-out classes. As described with reference to FIGS. 3 and 6, directory 72 includes a name field 78, a state field 80 for indicating the state of each directory entry and a register field 82, described below. Whenever a named data object is placed in the higher two levels of the storage hierarchy (i.e., coupling facility cache structure 46 and local cache 20), its name is registered in name column 78 and its state is registered in state column 80 by coupling facility cache directory 72. In general, state information indicates whether the data is changed, unchanged, locked for cast-out, or resident in coupling facility 16. In particular, state field 80 includes:

(a) A User-Data Field (UDF): The user-data field contains a value that is associated with the data when it is initially changed in the SES cache and is maintained until the data area is re-used. The user-data field is valid when the data is cached as changed.

(b) A Storage Class (SC): A value which identifies the storage class assigned for the name.

(c) A Change Indicator (C): A value which, in conjunction with the cast-out lock, indicates the changed state of the data. When the change bit is one, the data is cached as changed. When the change bit is zero and the data is not locked for cast-out, the data is either not cached, or is cached but not changed. When the change bit is zero and the data is locked for cast-out, the data is cached as changed. Whenever the data is in the changed state, the most recent version of the data resides in the cache. When the change bit is one, the data bit must also be one.

(d) A Data-Cached Indicator (D): A value which indicates whether the data is located in the SES cache. When the data bit is one, the data is cached. When the data bit is zero, the data is not cached.

(e) A Cast-Out-Parity-Bits Indicator (CP): A field which indicates the current assignment of the cast-out parity. Three possible values are: cast-out parity is zero; cast-out parity is one; the cast-out parity is unknown.

(f) A Cast-Out Class (CC): A value which identifies the cast-out class assigned for the name.

(g) A Cast-Out-Lock Value (CLV): A value which indicates the cast-out state of the data. When the cast-out lock is zero, the data is not being cast-out. When the cast-out lock is not zero, the value of the first byte of the cast-out lock identifies the local cache that is casting out the data block from the SES cache to DASD. The value of the second byte identifies the cast-out process on the local system. When the cast-out lock is not zero, the data bit must be one.

(h) A Data-Area Size (DAS): A value that specifies the size of the data area as an integral multiple of the data-area-element size. The initial value is zero when the directory entry is assigned and is zero until the data bit is set to one.

In addition to the above, register 82 is a table containing information on the location of the locally cached copies of the data block. Each row in the table corresponds to an attached local cache. The columns contain the local cache identifier (LCID), local-cache-entry number (LCEN) and a valid bit (LVI) for the local-cache-entry number. A valid local-cache-entry number is registered in the local-cache register when the registration process is executed for the specified name and local cache. A local-cache-entry number is invalidated when a local cache is detected, or when an invalidate-complement-copies process is executed for the specified name and the local cache is a member of the set of local caches being invalidated. The LCEN field is invalid, when LVI is zero.

Location information includes which of the local caches 20a–20n contains a copy. Certain SES-read and SES-write commands register the local cache copy in coupling facility directory 72. SES write and SES-invalidate commands remove the registration and invalidate local copies.

Cache structure 46 further includes data areas 74 and optional adjunct data areas 75. The data sizes are variable with the range of variability being, in one embodiment, between 1 and n times the data-area element size. The data-area element size is fixed for each coupling facility cache structure 46 and is a power of 2 with a minimum size of 256 bytes.

Coupling facility cache 46 is normally smaller than DASD storage 32. Thus, periodically, the changed data is transferred from cache 46 to the backing DASD 32 (FIG. 3). This process, called cast-out, is controlled by the operating system program. In one embodiment, a control associated with a cast-out class includes a cast-out class count, which indicates the number of elements associated with the cast-out class. Cast-out involves for a coupling facility, such as a SES facility, the following operations:

A SES-read for cast-out operation is issued that sets the cast-out serialization and copies the data block to main storage which may or may not be put in local cache 20.

An I/O operation is executed that copies the data block to DASD 32.

A SES-unlock cast-out locks operation is issued that releases the cast-out serialization.

Multiple cast-out processes may co-exist for a single one of local caches 20a–20n. Whenever data is locked for cast-out, an identifier for local cache 20a–20n and an identifier for the cast-out process are placed in directory 72. This is disclosed in U.S. patent application Ser. No. 07/860, 806 for "Management of Data Movement from a SES Cache to DASD" by D. A. Elko, et al. (Attorney Docket No. PO9-91-079), incorporated herein by reference in its entirety as noted.

Described in detail above is one example of a cache storage structure. In addition to cache structures, there are list structures, such as list structure 52, depicted in FIGS. 2 and 7. Referring to FIG. 7, the contents of a list structure, such as list structure 52, are described in detail.

List structure 52 resides within coupling facility 16. As shown in FIG. 7, in one embodiment, coupling facility 16 is coupled to processor storage 90a–90n located within each CPC 12a–12n, respectively. List structure 52 includes list-structure controls 92, user controls 94 and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 8. Referring to FIG. 8, list structure controls 92 include:

(a) Maximum Data-List-Entry Size (MDLES): An object or field that specifies the maximum size of the data list entry.

(b) List-Structure Type (LST): An object or field that indicates the list objects created on allocation. A field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are named.

The key indicator specifies whether or not the list entries are keyed.

(c) Lock-Table-Entry Characteristic (LTEX): An object or field that specifies the number of bytes in each lock-table entry. The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e) Minimum Structure Size (MNSS): A value that specifies the minimum number of units of SES storage that can be allocated for the list.

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of SES storage that can be allocated for the list.

(j) Maximum List-Set-Element Count (MLSELC): An object or field that specifies the maximum number of list elements that are available for assignment to list entries or retry-data blocks, Or both, in the list set.

(k) List-Set-Element Count (LSELC): An object or field that specifies the number of list elements that have been assigned to list entries or retry-data blocks, or both, in the list set.

(l) Non-Zero-Lock-Table-Entry-Count (NLTEC): An object or field that specifies the number of non-zero lock-table entries that exist in the structure.

(m) Maximum List-Set-Entry Count (MLSELC): An object or field that specifies the maximum number of possible list entries in a list set.

(n) List-Set-Entry Count (LSEC): An object or field that specifies the number of existing list entries in the list set.

(o) Structure Authority (SAU): A value associated with each bit in the SID vector.

(p) User Structure Control (USC): A field per structure defined by the user.

(q) User-Identifier Vector (UIDV): An object or field that specifies the assigned UIDs, described below.

Referring back to FIG. 7, user controls 94 are created and initialized when the list-structure user is attached. In accordance with the principles of the present invention, user controls 94 include user status, as described below. In one embodiment, user controls 94 include the following fields (FIG. 9):

(a) A User Identifier (UID): A value that identifies an attached list user. A user identifier is either in the assigned or the unassigned state. A user identifier is in the assigned state when the associated assigned bit in the user-identifier vector is one. A user identifier is placed in the assigned state by the attach-list-structure-user command. A user identifier is in the unassigned state when the associated assigned bit in the user-identifier vector is zero. A user identifier is placed in the unassigned state by the detach-list-structure-user command, depending on detachment-request type, described below.

(b) A User State (US): A field that specifies the state of the user. The value has the following encoding: the user is detached; the user is attached. A list structure user exists when the associated user identifier is assigned. When a list structure user exists, it is either in the active or the inactive state. A user is placed in the active state by the attach-list-structure-user command. A user is placed in the inactive state by the detach-list-structure-user command when the detachment process is complete.

(c) A List-Notification Token (LNT): A value that specifies a list-notification vector to the system.

(d) A User Authority (UAU): A value that is compared and conditionally updated.

(e) A System Identifier (SYID): A value specified by the program when a message path is activated. The system identifier is maintained in the message-path status vector and copied into the user controls when an attach-list-structure-user command is communicated over the message path.

(f) A User-Attachment Control (UAC): A field per attached-user defined by the user.

(g) A Detachment Restart Token (DURT): A value used to indicate how far along a detachment process has proceeded.

Referring once again to FIG. 7, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure controls 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero. In one embodiment, list controls 100 include the following controls, as depicted in FIG. 10:

(a) List-Entry-Count Limit (LECL): An object or field that specifies the maximum number of possible list entries in a list. This object is initialized to the maximum list-set-entry count when a list structure is created.

(b) List-Entry Count (LEC): An object or field that specifies the number of list entries currently in the list.

(c) List-State-Transition Count (LSTC): An object or field that specifies the number of empty to not-empty list state transitions that have occurred.

(d) List Authority (LAU): A value that is compared and conditionally updated. The LAU is initialized to zeros.

(e) User List Controls (ULC): A field per list defined by the user.

(f) List-Monitor-Table: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit and are indexed by the user identifier (UID).

Each list-monitor-table entry has a list-monitoring-active-bit object, a list-notification-request-type object and a list-notification-entry-number object, each of which is described below:

(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.

(2) List-Notification-Request Type (LNRT): An object or field that indicates whether the list-notification-vector summaries are to be updated when an empty to not-empty state transition occurs on a monitored list.

(3) List-Notification-Entry Number (LNEN): An object or field that specifies a list-notification-vector entry.

When a list-state transition occurs, one or more list-notification commands are initiated for each user who is monitoring the list to the system which attached the user. All the list-notification commands initiated as a result of the list-state transition are initiated before the command that caused the list-structure transition is completed.

The list-notification command provides the information necessary for the system to update one list-notification entry and, when requested, the associated list-notification summaries, to reflect the new list state.

A user becomes a list monitor by registering with the list by means of a registered-list-monitor command. A user ceases to be a list monitor by deregistering from the list by means of a deregister-list-monitor command or by detaching from the list structure by means of a detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

When a transition notification is initiated to a system, any previously initiated but unsent notifications for the same list and user may be purged.

Each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include the following controls, as depicted in FIG. 11:

(a) A Data-List-Entry Size (DLES) indicating the size of the associated data entry.

(b) A List Number (LN) representing the list that a particular entry is associated with.

(c) A List-Entry Identifier (LEID) identifying a particular list entry. The list-entry identifier is unique to a list set 98 and is assigned by coupling facility 16.

(d) A Version Number (VN) object that is conditionally compared and conditionally updated, reflecting a program specified state for the list entry.

(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.

(f) An optional List-Entry Name (LEN). A list-entry name is unique to a list set 98 (FIG. 7) at any particular instant and is provided by the operating system program.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Serial No. 07/860,655 for "Method and Apparatus for Performing Conditional Operations on Externally Shared Data" by J. A. Frey, et al. (Attorney Docket No. PO9-92-008), incorporated herein by reference in its entirety as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of list 99. More than one list entry may be deleted synchronously, and more than one data list entry 104 or adjunct list entry 106 may also be read synchronously. Data list entry 104 is always returned in the data area designated in main storage by a message command/response block, described below. The adjunct list entry is returned in either a message command/response block or the data area, depending on the command. This is disclosed in U.S. patent application Ser. No. 07/860,633 for "Apparatus and Method for List Management in a Coupled DP System" by J. A. Frey, et al., (Attorney Docket No. PO9-92-009), incorporated herein by reference in its entirety, as noted.

Figure 12:
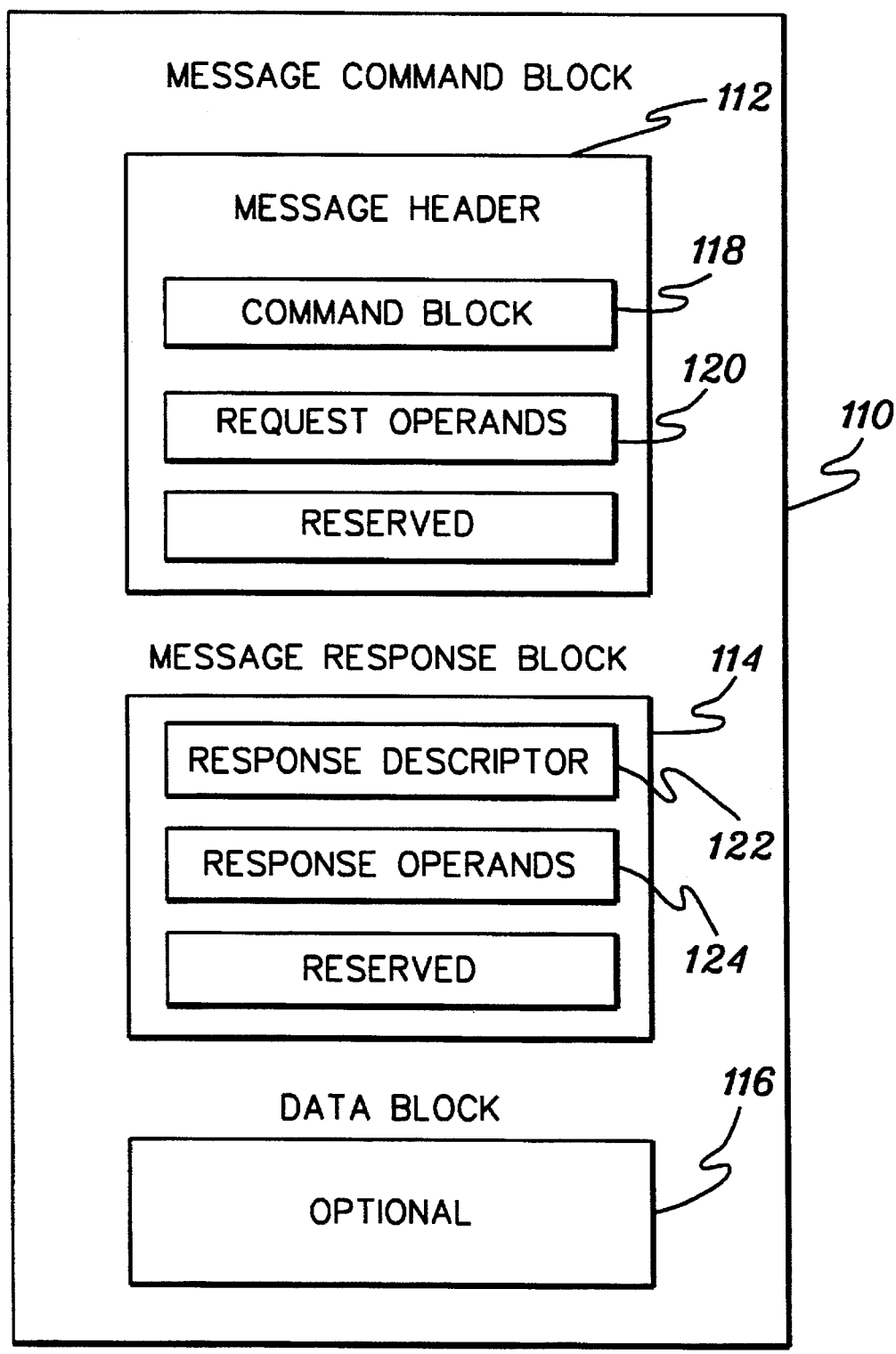
FIG. 12 depicts one example of a message command/response block, in accordance with the principles of the present invention.

In one embodiment, messages are communicated between CPC 12 and coupling facility 16 via a message command/response block 110 (FIG. 12). In one example, message command/response block 110 includes a message command block 112, a message response block 114 and an optional data block 116. Message command block 112 includes a command block 118 and a plurality of request operands 120 and message response block 114 includes a response descriptor 122 and a plurality of response operands 124. In one embodiment of the present invention, request operands 120 and response operands 124 include the operands listed below, which are depicted in FIG. 13. (An operand may be a request operand, a response operand or both, depending upon the command. It is also possible that other request and/or response operands exist, which are not shown in FIG. 13.) In one embodiment, the response/request operands include the following:

(a) Attachment Information (AINF): A value set by the program when the local cache is attached.

(b) Comparative Local-Cache Authority (CLCAU): A value used as a comparison value to the local-cache authority when a local-cache attachment is performed for an assigned local-cache identifier or when a local cache is detached.

(c) Comparative Structure Authority (CSAU): A value used as a comparison value to the structure authority when the structure is allocated and deallocated.

(d) Comparative User Authority (CUAU): A value that is compared to the user-authority object.

(e) Detachment-Request Type (DRT): A value that indicates whether the user identifier is to be unassigned when the list-structure user is detached. The value has one of two meanings: Keep the user identifier assigned and unassign the user identifier.

(f) List-Monitoring-Active Bit (LMAB): A value that specifies whether the user associated with the list-monitor-table entry is monitoring the list-state transitions of the list. The value has one of the two following meanings: Not monitoring the list and monitoring the list. When the list-monitoring-active bit indicates that the list is not monitored, all previously issued list-notification commands on behalf of the associated user for this list are complete.

(g) List-Notification-Entry Number (LNEN): An unsigned binary integer that specifies a list-notification-vector entry.

(h) List-Notification Token (LNT): A value that specifies a list-notification vector to the system. A list-notification token of zero indicates that the user may not be registered to monitor a list.

(i) LCID-Unassignment Control (LUC): A value that controls the unassignment of the local-cache identifier. When the value is one, the local-cache identifier is unassigned, and the local-cache controls are reset. The LCID value is available for assignment. When the value is zero, the LCID vector and the local-cache controls are not updated.

(j) Local-Cache Authority (LCAU): A value set by the program when the local cache is attached.

(k) Local-Cache-Entry Number (LCEN): A value that specifies a local cache entry.

(l) Local-Cache Identifier (LCID): An integer that identifies a local cache. The LCID must be assigned for a read-local-cache-information, attach local cache and detach local cache commands and must be attached for all other commands.

(m) Local-Cache Token (LCT): A value that identifies a local cache.

(n) Structure Authority (SAU): A value that is conditionally updated.

(o) User-Attachment Control (UAC): A field per attached user defined by the user.

(p) User Authority (UAU): A value that is compared and conditionally updated.

(q) User Identifier (UID): A value that identifies a user. A user identifier must identify an attached UID when a user is registered, and must identify an assigned UID when a user is deregistered or user controls are read.

(r) User State (US): A field that specifies the state of the user. The value has the following two meanings: The user is detached or the user is attached.

(s) User Structure Control (USC): A field per structure defined by the user.

(t) Allocation Type (AT): A field that indicates the type of allocation.

In addition to cache and list structures, there exists a lock structure which is comprised of a coupling facility list structure with an associated lock table and a set of operating system services to assist in lock contention resolution.

In support of the cache and list structures, described above, is a set of global controls 67, which is located in coupling facility 16 (see FIG. 3). In one embodiment, global controls 67 identify the coupling facility, describe its state, define its model-dependent limitations and summarize the status of its resources. In one example, global controls 67 include a free-space object, a free-control space object and a structure identifier (SID) vector. The SID vector is a string of bits, which increases sequentially having an initial value of zero. The structure identifier value provides an identification of a target structure by a command. A position i in the string is set to one when a structure is created with a SID value of i. The bit at position i is reset to zero when the structure is deallocated. A read SID vector command, returns the SID vector to the data area in the requesting program.

In one embodiment, a structure identifier is either in the assigned or unassigned state. A structure identifier is in the assigned state when the associated created bit in the structure-identifier vector is one. A structure identifier is placed in the assigned state when a structure is created by the allocate-cache,structure or allocate-list-structure command.

In addition, a structure identifier is in the unassigned state when the associated created bit in the structure-identifier vector is zero. A structure identifier is placed in the unassigned state by the deallocate-cache-structure or deallocate-list-structure command.

A coupling facility structure has one of the following states:

Allocated: The structure is created and commands are processed against structure objects.

Allocation Incomplete: An allocation process has been initiated for a structure, but the initialization of the structure objects has not completed.

Deallocation Incomplete: A deallocation process has been initiated for a structure, but the storage has not all been released.

Unassigned: The structure identifier (SID) value is available for selection by an allocate-cache-structure or allocate-list-structure command, as described in detail below.

A set of commands is provided for each coupling facility storage structure type, as well as additional commands for referencing global objects. The creation, deletion and attributes of a particular structure are controlled by the operating system program through allocation and de-allocation commands, described in detail below. Allocation commands for list structures are described in "Apparatus and Method For List Management In A Coupled DP System" (Docket No. PO9-92-009), by J. A. Frey et al., Ser. No. 07/860,633, Filed: Mar. 30, 1992, which is hereby incorporated by reference in its entirety. In addition, allocation commands for cache structures are described in "Sysplex Shared Data Coherency Method and Means" (Docket No. PO9-91-052), by D. A. Elko et al., Ser. No. 07/860,805, Filed: Mar. 30, 1992, which is also hereby incorporated by reference in its entirety. One embodiment of an allocate-cache-structure command is also described in detail below.

As described in detail herein, an allocate-cache-structure command updates the user structure control and (1) creates a cache structure or (2) continues or completes initial allocation of a cache structure. A cache structure is created on the first successful invocation of the allocate-cache-structure command for a structure that does not already exist. A cache structure is initially allocated after one or more successful invocations of the allocate-cache-structure command. These operations are referred to generically as cache-allocation processes.

One embodiment of the logic associated with an allocate-cache-structure command is described in detail with reference to FIGS. 14a–14b. Initially, a determination is made as to whether the value of the created bit in the structure identifier vector associated with the SID value is equal to zero, INQUIRY 130 "IS CREATED BIT OF SID=0?" If the value of the created bit associated with the SID is equal to zero, indicating a cache structure has not been created, then another determination is made as to whether the comparative structure authority (CSAU) request operand is equal to zero, INQUIRY 132 "DOES CSAU=0?" When the CSAU is not equal to zero, the structure authority value of zero in request/response operands (FIG. 13) and an error code are returned, STEP 134 "RETURN AND INDICATE ERROR."

Otherwise, if the CSAU is equal to zero, then the amount of storage is checked, INQUIRY 136 "SUFFICIENT STORAGE?" In particular, the free space and free control space objects in the global controls are checked. Should there be insufficient storage, an indication as such is returned, STEP 138 "RETURN AND INDICATE INSUFFICIENT STORAGE."

Should there be sufficient storage and therefore, a cache structure is created, global controls 67 and cache structure controls 69 are updated, STEPS 140, 142. In particular, when the cache structure is created, the created bit in the structure-identifier vector associated with the SID value is set to one and the free-space and free-control-space global objects are updated. In addition, the LCID vector of cache structure controls 69 is initialized to zero; the SAU operand of the request/response operands is placed in the structure authority object of cache structure controls; and the USC operand of the request/response operands is placed in the user-structure control.

Thereafter, there is an indication of whether a model-dependent time-out has occurred, INQUIRY 144 "MODEL-DEPENDENT TIME-OUT?" When a model-dependent time period has elapsed before the allocation processes are completed, the processes are checkpointed, STEP 146 "SET ALLOCATION CHECKPOINT." In particular, the structure size, cache structure controls 69, the free-space and free-control-space global objects are updated. Subsequently, the structure state control (not shown) in the structure controls is set as allocation incomplete, STEP 148 "SET STRUCTURE STATE ALLOCATION INCOMPLETE," and cache structure information and an exception response code are returned, STEP 150 "RETURN AND INDICATE NOT DONE."

Returning to INQUIRY 144, when a model-dependent time-out has not occurred, a determination is made as to whether the allocation process is complete, INQUIRY 152 "ALLOCATION COMPLETE?" In particular, the structure state control is checked and, if it is equal to one, allocation is complete and, if equal to zero, allocation is incomplete. Should allocation be complete, a successful response code is returned, indicating all requested cache-allocation processes are complete, STEP 154 "RETURN AND INDICATE COMPLETION."

Otherwise, when a cache structure is created but not completely allocated, all cache-structure commands issued to the structure except for the allocate-cache-structure, deallocate-cache-structure, and read-cache-structure-information commands are suppressed or terminated with an initial-allocation-incomplete status condition. Further, control and data areas are created, STEP 156 "CREATE CONTROL AND DATA AREAS." In particular, a directory and data areas are created. Thereafter, flow passes to INQUIRY 144 "MODEL-DEPENDENT TIME-OUT?"

Returning to INQUIRY 130, if the created bit of SID is not equal to zero, signifying a structure is created, a structure authority comparison is made, INQUIRY 158 "DOES STRUCTURE AUTHORITY=CSAU?" Should the value of SAU in cache structure controls 69 not be equal to the value of CSAU, the value of the structure authority in the request/response operands and an error code are returned, STEP 160 "RETURN AND INDICATED ERROR." Otherwise, a determination is made as to whether there is a user control update request, as specified as an input to the allocation command, INQUIRY 162 "USER CNTL UPDATE REQUEST?"

Should there be such a request, the user structure control in cache-structure controls 69 is updated, STEP 164 "UPDATE USER STRUCTURE CNTLS." Subsequent to updating the user structure controls or if there is no user control update request, a determination is made as to whether a model-dependent time-out has occurred, INQUIRY 166 "MODEL-DEPENDENT TIME-OUT?"

If a time-out has not occurred, then it is ascertained as to whether the allocation process is complete, INQUIRY 168 "ALLOCATION COMPLETE?" If allocation is incomplete, control and data areas are created, STEP 170 "CREATE CONTROL AND DATA AREAS," as described above, and flow passes to INQUIRY 166 in order to complete the initial allocation of the cache structure. On the other hand, when allocation is complete, the allocation incomplete state is reset, indicating allocation complete, STEP 172 "RESET ALLOCATION INCOMPLETE STATE." The allocation complete indication is then returned, STEP 174 "RETURN AND INDICATE COMPLETION."

Returning to INQUIRY 166, if a time-out has occurred, the allocation checkpoint is set, STEP 176 "SET ALLOCATION CHECKPOINT" and cache structure information and a response code are returned, indicating allocation incomplete, STEP 178 "RETURN AND INDICATE NOT DONE."

After initial allocation is completed, an allocate-cache-structure command is always checkpointed when a successful or incomplete response code is returned. Also, after initial allocation is completed, an allocation process may be checkpointed anytime during the execution of a successful allocate-cache-structure command or when background processing continues as a result of a successful allocate-cache-structure command. Background processing of a successful allocate-structure command stops when a successful response code is returned. As described above, when a cache-allocation process is checkpointed, the structure controls and global controls are updated.

In one embodiment, in order to allocate a list structure, the logic associated with FIGS. 14a–14b may be used, as described in detail below. The allocate-list-structure command updates the user structure control and (1) creates a list structure or (2) continues or completes initial allocation of a list structure. A list structure is created on the first successful invocation of the allocate-list-structure command for a structure that does not already exist.

Figure 14A:
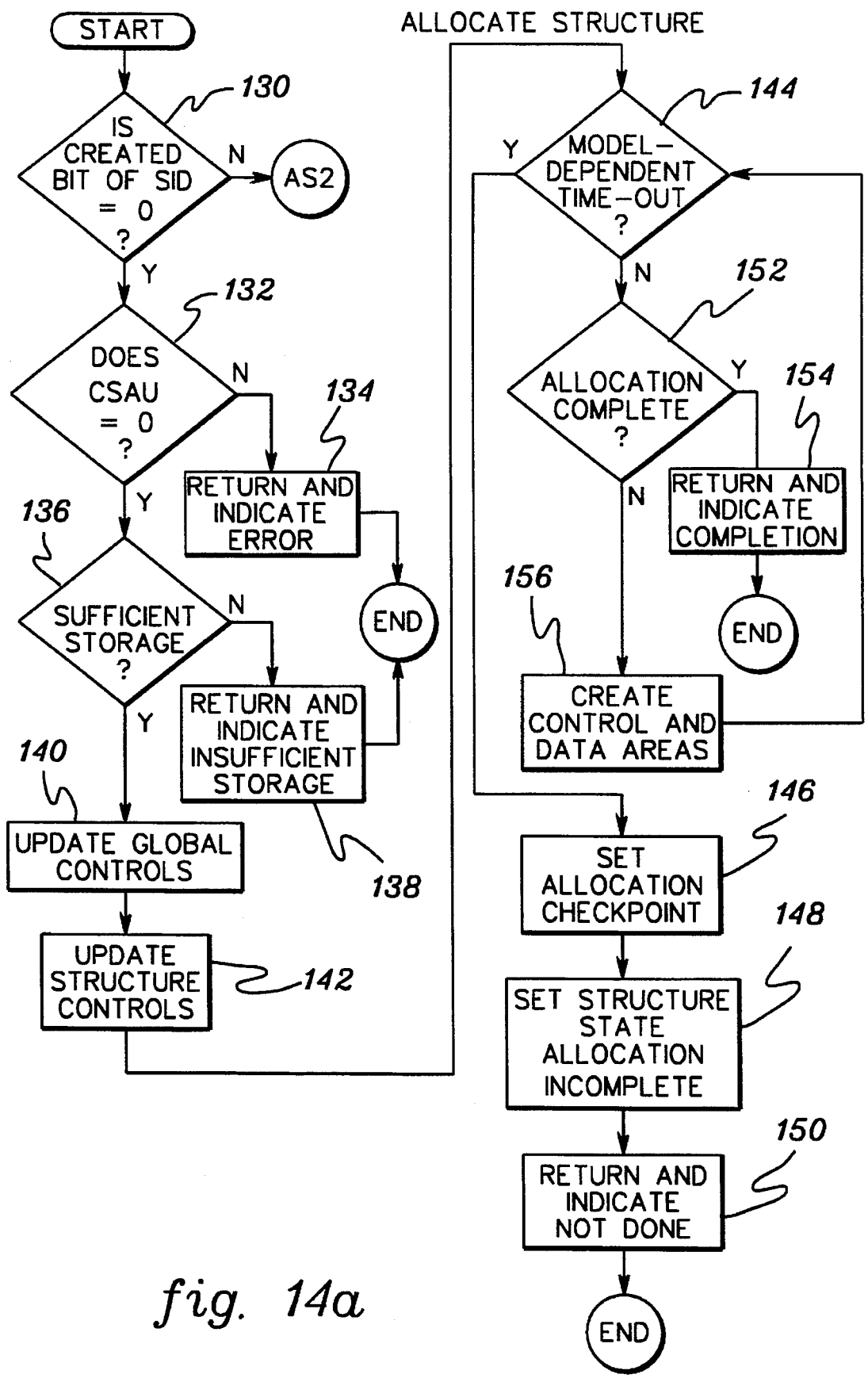
FIGS. 14a, 14b depict one embodiment of the logic associated with an allocate structure command, in accordance with the principles of the present invention.
Figure 14B:
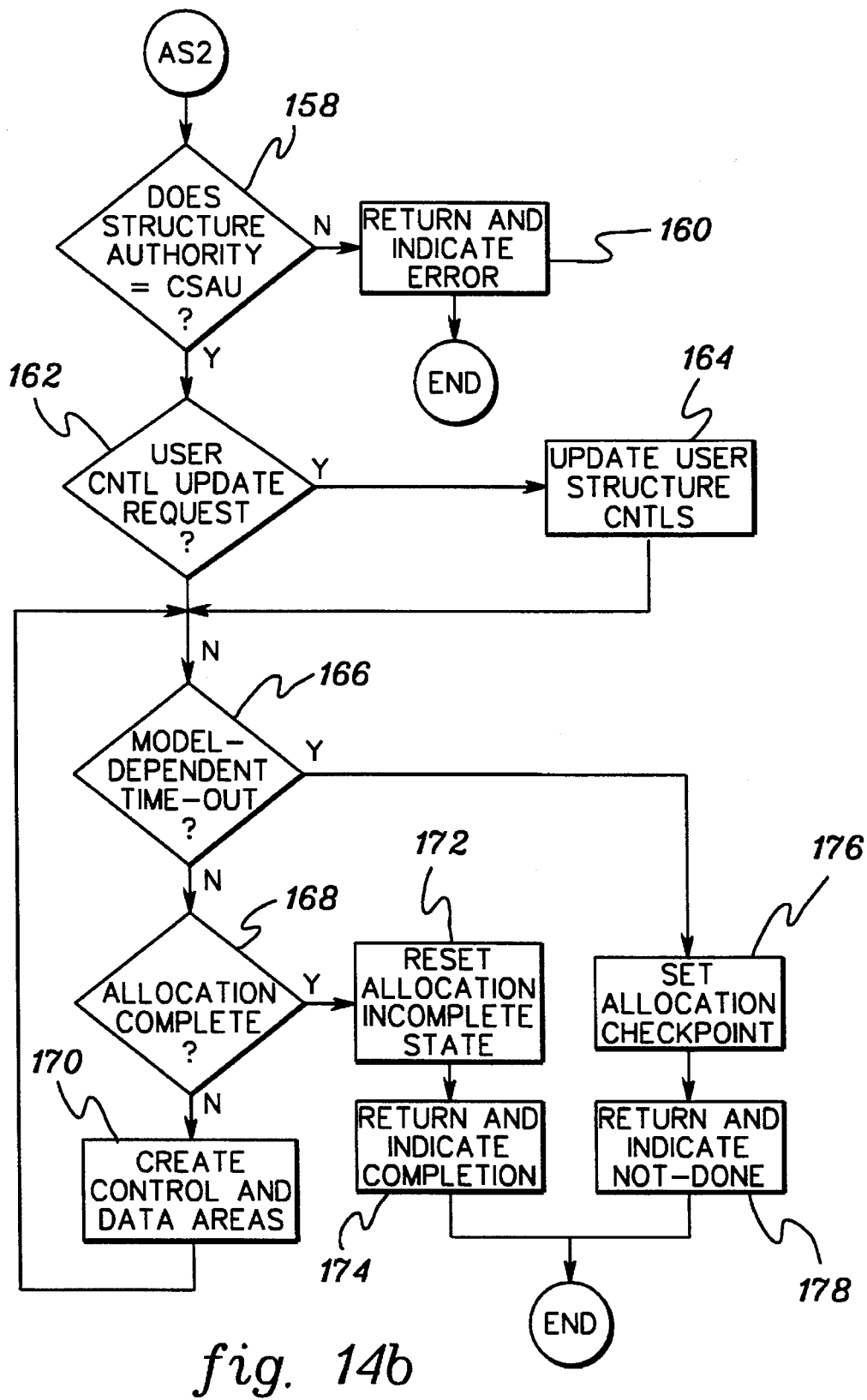

Referring to FIG. 14a, initially, a determination is made as to whether the value of the created bit in the structure identifier vector associated with the SID value is equal to zero, INQUIRY 130 "IS CREATED BIT OF SID=0?" If the value of the created bit associated with the SID is equal to zero, indicating a list structure has not been created, then another determination is made as to whether the comparative structure authority (CSAU) in request/response operands is equal to zero, INQUIRY 132 "DOES CSAU=0?" When the comparative structure authority is not equal to zero, the structure authority value of zero in request/response operands (FIG. 13) and an error code are returned, STEP 134 "RETURN AND INDICATE ERROR."

Otherwise, if the comparative structure authority is equal to zero, then the amount of storage is checked, INQUIRY 136 "SUFFICIENT STORAGE?" Should there be insufficient storage, an indication as such is returned, STEP 138 "RETURN AND INDICATE INSUFFICIENT STORAGE."

Should there be sufficient storage and therefore, a list structure is created, global controls 67 and list structure controls 92 are updated, STEPS 140, 142. In particular, when the list structure is created, the created bit in the structure-identifier vector associated with the SID value is set to one and the free-space and free-control-space global objects are updated. In addition, the UID vector of list structure controls 92 is initialized to zero; the SAU operand of request/response operands is placed in the structure authority object of list structure controls; and the USC operand of the request/response operands is placed in the user-structure control.

Thereafter, there is an indication of whether a model-dependent time-out has occurred, INQUIRY 144 "MODEL- DEPENDENT TIME-OUT?" When a model-dependent time period has elapsed before the allocation processes are completed, the processes are checkpointed, STEP 146 "SET ALLOCATION CHECKPOINT." In particular, the structure size, list structure controls 92, the free-space and free-control-space global objects are updated. Subsequently, the structure state control (not shown) in the structure controls is set as allocation incomplete, STEP 148 "SET STRUCTURE STATE ALLOCATION INCOMPLETE," and list structure information and an exception response code are returned, STEP 150 "RETURN AND INDICATE NOT DONE."

Returning to INQUIRY 144, when a model-dependent time-out has not occurred, a determination is made as to whether the allocation process is complete, as described above, INQUIRY 152 "ALLOCATION COMPLETE?" Should allocation be complete, a successful response code is returned, indicating all requested list-allocation processes are complete, STEP 154 "RETURN AND INDICATE COMPLETION."

Otherwise, when a list structure is created but not completely allocated, all list-structure commands issued to the structure except for the allocate-list-structure, deallocate-list-structure, and read-list-structure-information commands are suppressed or terminated with an initial-allocation-incomplete status condition. Further, control and data areas are created, STEP 156 "CREATE CONTROL AND DATA AREAS." In particular, list controls, list entry controls, data list elements and the lock table are created. Thereafter, flow passes to INQUIRY 144 "MODEL-DEPENDENT TIME-OUT?"

Returning to INQUIRY 130, if the created bit of SID is not equal to zero, signifying a structure is created, a structure authority comparison is made, INQUIRY 158 "DOES STRUCTURE AUTHORITY=CSAU?" Should the value of SAU in list structure controls 69 not be equal to the value of CSAU, the value of the structure authority in the request/response operands and an error code are returned, STEP 160 "RETURN AND INDICATED ERROR." Otherwise, a determination is made as to whether there is a user control update request, as specified as an input to the allocation command, INQUIRY 162 "USER CNTL UPDATE REQUEST?"

Should there be such a request, the user structure control in list-structure controls 92 is updated, STEP 164 "UPDATE USER STRUCTURE CNTLS." Subsequent to updating the user structure controls or if there is no user control update request, a determination is made as to whether a model-dependent time-out has occurred, INQUIRY 166 "MODEL-DEPENDENT TIME-OUT?"

If a time-out has not occurred, then it is ascertained as to whether the allocation process is complete, INQUIRY 168 "ALLOCATION COMPLETE?" If allocation is incomplete, control and data areas are created, STEP 170 "CREATE CONTROL AND DATA AREAS," as described above, and flow passes to INQUIRY 166 in order to complete the initial allocation of the list structure. On the other hand, when allocation is complete, the allocation incomplete state is reset, indicating allocation complete, STEP 172 "RESET ALLOCATION INCOMPLETE STATE." The allocation complete indication is then returned, STEP 174 "RETURN AND INDICATE COMPLETION."

Returning to INQUIRY 166, if a time-out has occurred, the allocation checkpoint is set, STEP 176 "SET ALLOCATION CHECKPOINT" and list structure information and a response code are returned, indicating allocation incomplete, STEP 178 "RETURN AND INDICATE NOT-DONE."

After initial allocation is complete, an allocate-list-structure command is always checkpointed when a successful response code is returned. Also, after initial allocation is complete, an allocation process may be checkpointed any time during the execution of a successful allocate-list-structure command or when background processing continues as a result of a successful allocate-list-structure command. Background processing of a successful allocate-list-structure command stops when a successful response code is returned. When a list-allocation process is checkpointed, the structure size, list-structure objects, the free-space and free control-space global objects are updated.

In accordance with the principles of the present invention, rules governing coupling facility structure allocation and coupling facility structure and user status are stored in an active coupling facility policy. In one embodiment, the coupling facility policy is stored on a function data set, which is coupled to each central processing complex, as shown in the overview diagram of FIG. 15.

Figure 15:
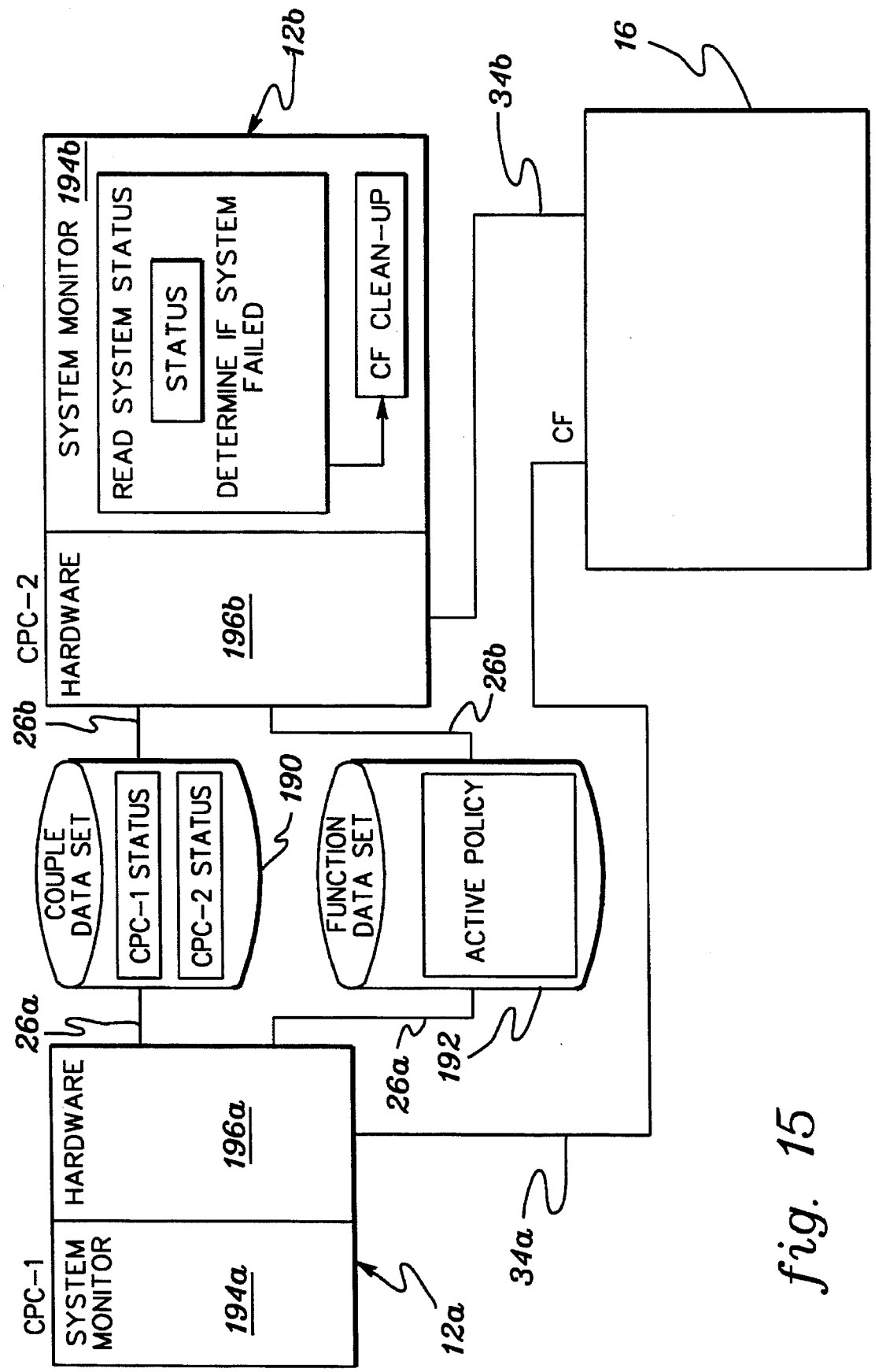
FIG. 15 illustrates one example of an overview diagram depicting an active policy coupled to central processing complexes, in accordance with the principles of the present invention.

Referring to FIG. 15, the overview diagram is described in detail. In the system shown, two CPC's (CPC 12a and CPC 12b) exist. Each CPC is coupled to coupling facility 16; a couple data set 190, which includes the status for CPC 12a and CPC 12b; and a function data set 192, which includes the active policy for coupling facility resources.

Each CPC includes a system monitor 194a, 194b, and hardware 196a, 196b, respectively. The hardware includes, for instance, I/S channels 18a, 18b (not shown), respectively, to connect coupling facility 16 via a bus 34a, 34b, respectively. Also, the hardware includes I/O channels 22a, 22b, (not shown) respectively, to couple CPC 12a, CPC 12b, respectively, via a link 26a, 26b to couple data set 190 and function data set 192.

System monitor 194a, 194b monitors the status of CPC 12a, CPC 12b. For instance, system monitor 194b reads the system status of CPC 12a and CPC 12b to determine, for instance, if the system of CPC 12a has failed. As described below, if CPC 12a fails, CPC 12b initiates a coupling facility cleanup routine.

Figure 16:
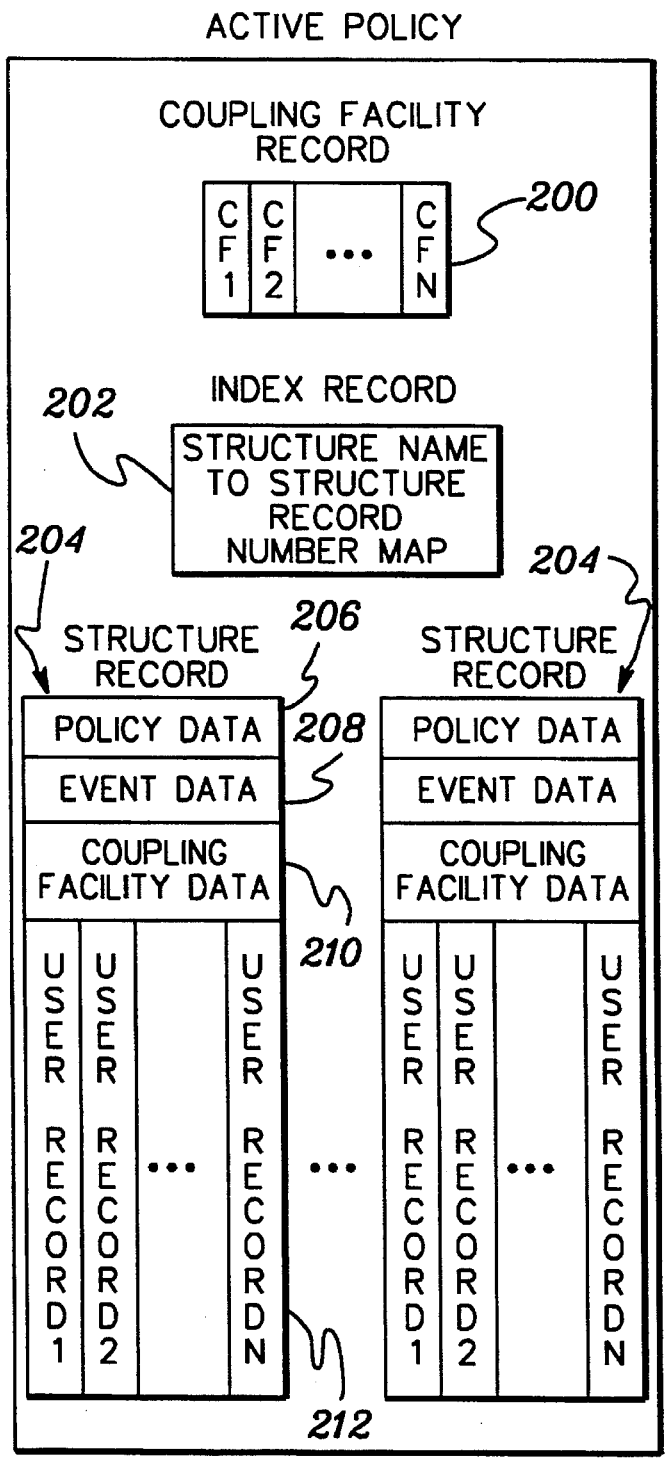
FIG. 16 depicts one embodiment of the fields associated with the active policy of FIG. 15, in accordance with the principles of the present invention.

One example of the coupling facility policy stored on function data set 192 is described in detail with reference to FIG. 16. Referring to FIG. 16, in one embodiment, in accordance with the principles of the present invention, the active policy includes a coupling facility record 200, an index record 202, and one or more structure records 204, each of which is described below.

Coupling facility record 200 includes a record for each coupling facility in the sysplex. Index record 202 includes the structure name to structure record number map. Further, the structure record includes policy data 206, event data 208, coupling facility data 210 and a number of user records 212 (e.g., user record 1—user record n).

In accordance with the principles of the present invention, a user gains access to a coupling facility structure through use of an operating system service, referred to as Cross-System Extended Services or XES. A user of a coupling facility structure is termed a connected XES user. XES supports the defined list, cache and lock structures. Additionally, XES supports the use of a list structure for high performance database locking and specialized use of a list structure with a lock table comprising only global management objects termed a serialized list.

As mentioned above, an XES supported lock structure is comprised of a list coupling facility structure and operating system services. A lock table associated with the list may contain both global management and local management objects. The list set is used in a manner which assigns one list to each assigned user identifier. List entries are comprised of adjunct only areas. The list set is termed a record substructure. A list for a given user identifier is termed a record substructure header. Entries on a given list are termed record substructure entries.

Figure 17A:
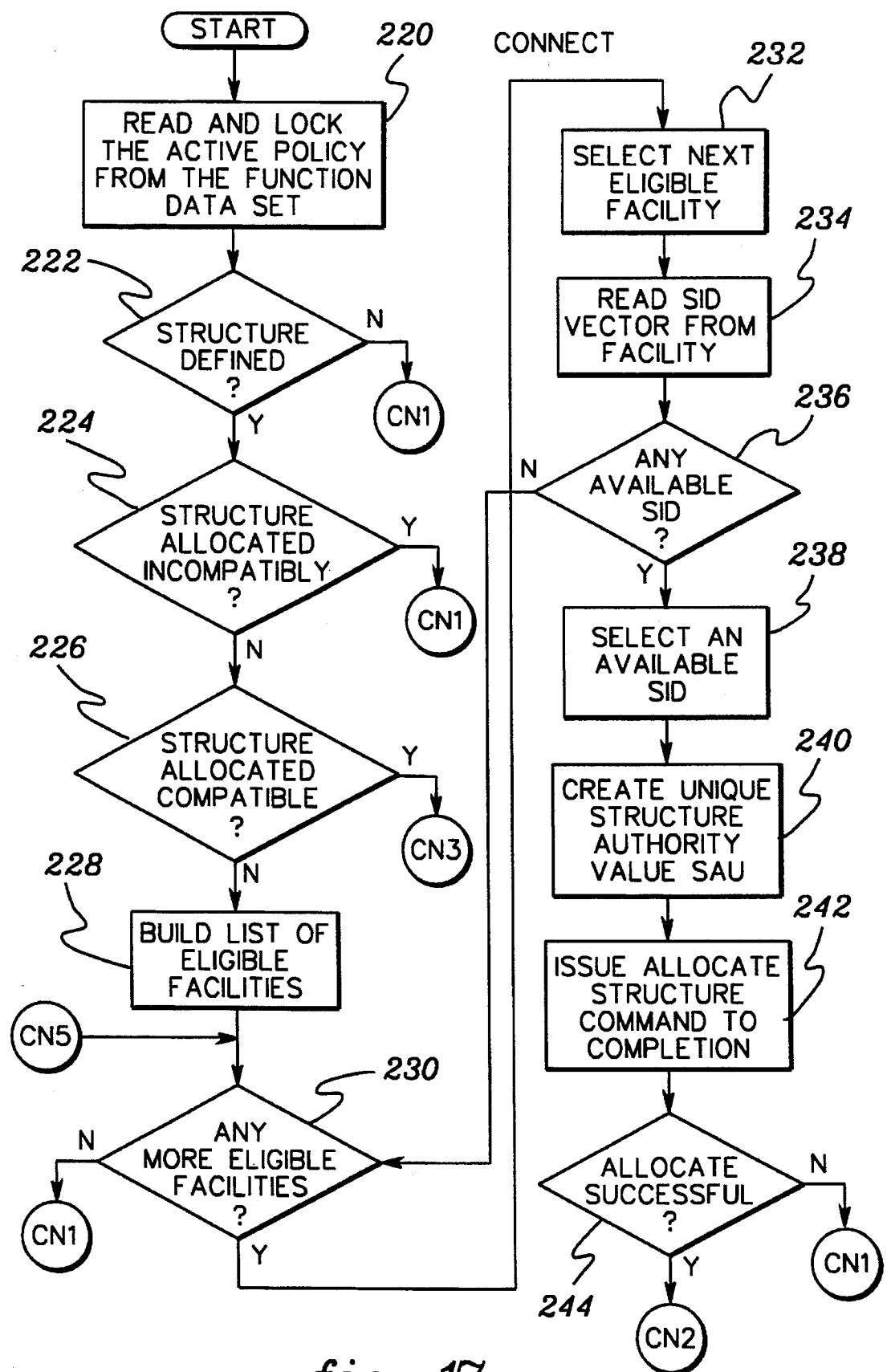
FIGS. 17a–17c depict one embodiment of the logic associated with a connect service, in accordance with the principles of the present invention.
Figure 17B:
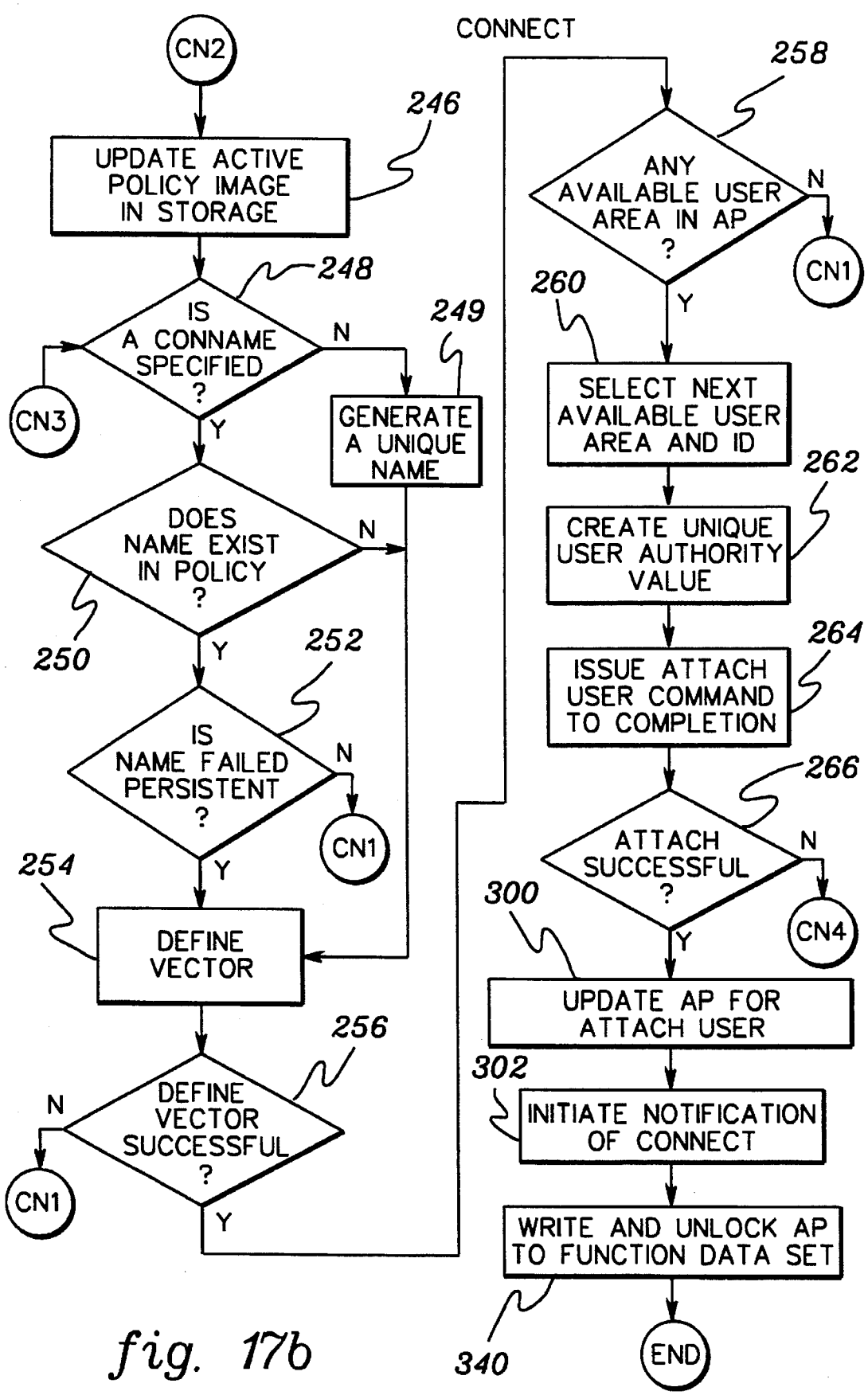
Figure 17C:
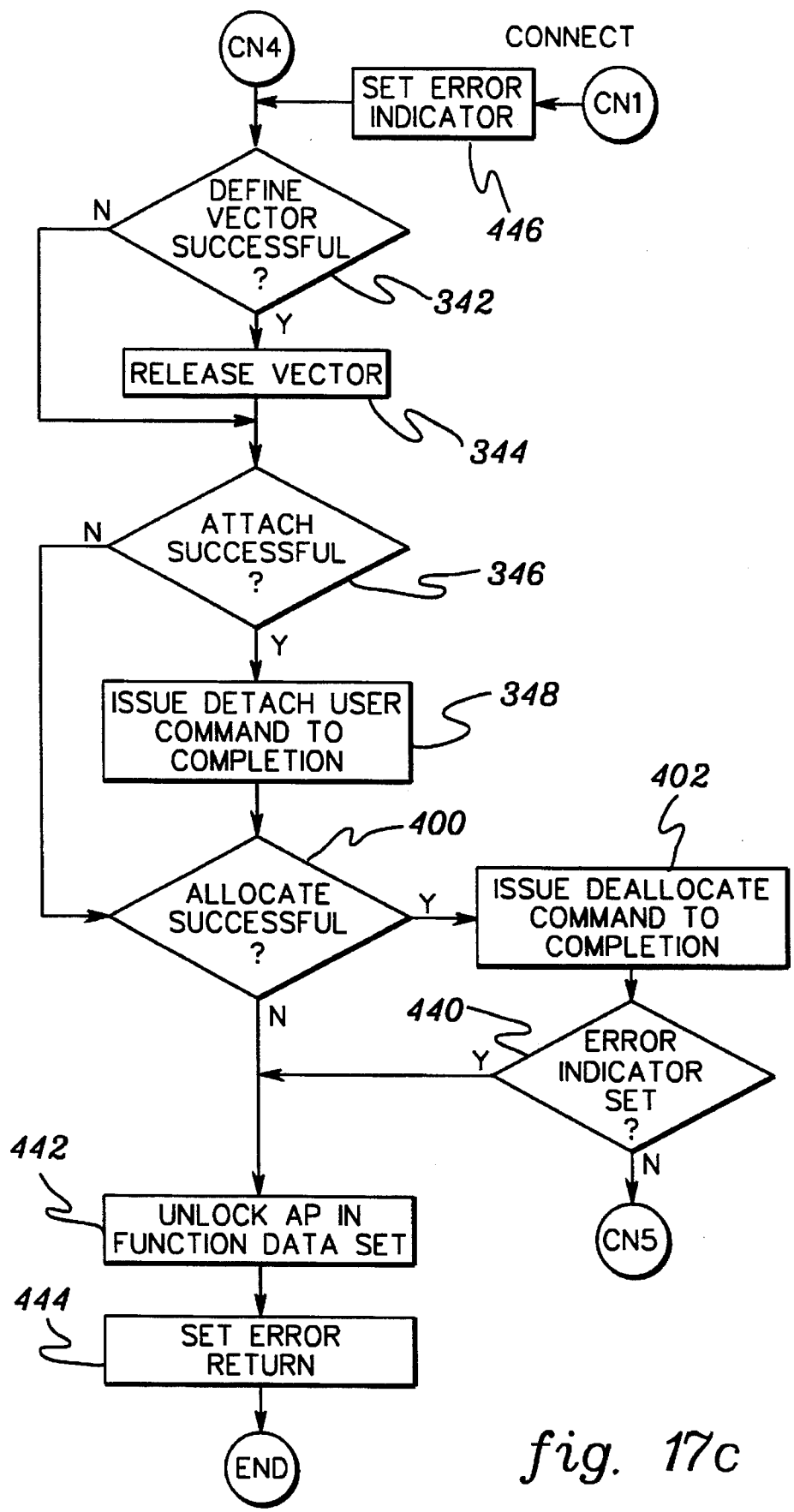

In accordance with the principles of the present invention, a user is connected or reconnected to a structure, such as a cache, list or lock structure via, for example, an operating system connection service. One embodiment of the logic associated with a connection service is described in detail with reference to FIGS. 17a–17c. Initially, the active policy on the function data set is read and locked via, for example, the procedure described in co-pending U.S. patent application Ser. No. 07/548,516 for "Shared Data Access Serialization Method and Apparatus" by Insalaco et al (Attorney Docket No. PO9-88-007), filed on Jul. 2, 1990, which is incorporated herein by reference in its entirety, STEP 220 "READ AND LOCK THE ACTIVE POLICY FROM THE FUNCTION DATA SET." Subsequently, a determination is made as to whether the structure name specified on the connect service (such as, for example, the IXLCONN connect service described below) is defined, INQUIRY 222 "STRUCTURE DEFINED?" In particular, the presence of a structure record in the active policy is checked. Should the structure be defined, a check is made to see if it is allocated incompatibly, INQUIRY 224 "STRUCTURE ALLOCATED INCOMPATIBLY?" This is determined, for instance, by checking the information in the structure controls in the coupling facility.

If a structure is not allocated incompatibly and is not allocated compatibly (i.e., the structure is not allocated), INQUIRY 226 "STRUCTURE ALLOCATED COMPATIBLE?", a list of eligible facilities are built, STEP 228 "BUILD LIST OF ELIGIBLE FACILITIES." In particular, a preference list in structure record 204 of the active policy is utilized to determine which coupling facilities are candidates for the structure. From those facilities, the eligible facilities are selected. Each eligible facility:

(a) has connectivity to the system trying to allocate the structure;

(b) meets the volatility requirement requested by the connector; and (c) has available space greater than or equal to the requested structure size or, if no facility in the policy list has free space greater than or equal to the requested structure size, the facility with the largest amount of free space is chosen.

Subsequent to building the list of eligible facilities, it is ascertained as to whether there are any more eligible facilities, INQUIRY 230 "ANYMORE ELIGIBLE FACILITIES?" If so, the next eligible facility is selected, STEP 232 "SELECT NEXT ELIGIBLE FACILITY." After selecting the next eligible facility, the SID vector is read from global controls 67, STEP 234 "READ SID VECTOR FROM FACILITY."

From the SID vector, a determination is made as to whether any available SID exists in the vector, INQUIRY 236 "ANY AVAILABLE SID?" Should an available SID exist, it is selected, STEP 238 "SELECT AN AVAILABLE SID," and a unique structure authority value (SAU) is created (as described above with reference to FIG. 4), STEP 240 "CREATE UNIQUE STRUCTURE AUTHORITY VALUE SAU." Thereafter, an allocate structure command, described above, is issued to completion, STEP 242 "ISSUE ALLOCATE STRUCTURE COMMAND TO COMPLETION?"

Once the command completes and it is successful, INQUIRY 244 "ALLOCATE SUCCESSFUL," the active policy image in virtual storage is updated in order to indicate the successful allocation of a structure, STEP 246 "UPDATE ACTIVE POLICY IMAGE IN STORAGE."

Subsequently, a determination is made as to whether a CONNAME is specified as an input on IXLCONN, INQUIRY 248 "IS A CONNAME SPECIFIED?" Should a CONNAME be specified, a further determination is made to ascertain whether the name exists in the active policy, INQUIRY 250 "DOES NAME EXIST IN POLICY?" If the name exists, it is checked to see if it is failed-persistent, INQUIRY 252 "IS NAME FAILED-PERSISTENT?"

When the name is indicated as failed-persistent, or if the name does not exist in the policy, INQUIRY 250, a vector is defined at the central processing complex where the connector is executing, STEP 254 "DEFINE VECTOR." In particular, a local bit vector is defined for a cache for cache coherency and for a list, a list notification vector is defined for state transitions. In addition to the above, if a CONNAME is not specified, INQUIRY 248, a unique name is generated, STEP 249, and flow passes to STEP 254 "DEFINE VECTOR."

Should the definition be successful, INQUIRY 256 "DEFINE VECTOR SUCCESSFUL?", a further check is made to determine whether there is any available space in the active policy to record user information, INQUIRY 258 "ANY AVAILABLE USER AREA IN AP?"

If there is an available user area (i.e., an unused area for a new connection or reuse of existing area for a re-connect), it is selected along with the next available user id (for a reconnect, the same user id is used), STEP 260 "SELECT NEXT AVAILABLE USER AREA AND ID." Thereafter, a unique user authority request operand is created and an attach user command, described below, is processed to completion, STEPS 262, 264.

In one embodiment, the logic associated with one example of an attach user command is described in detail with reference to FIG. 18. The attach user command is used to attach a user to a structure, such as a list, cache or lock structure. An example of attaching a list user to a structure is described in detail below.

Figure 18:
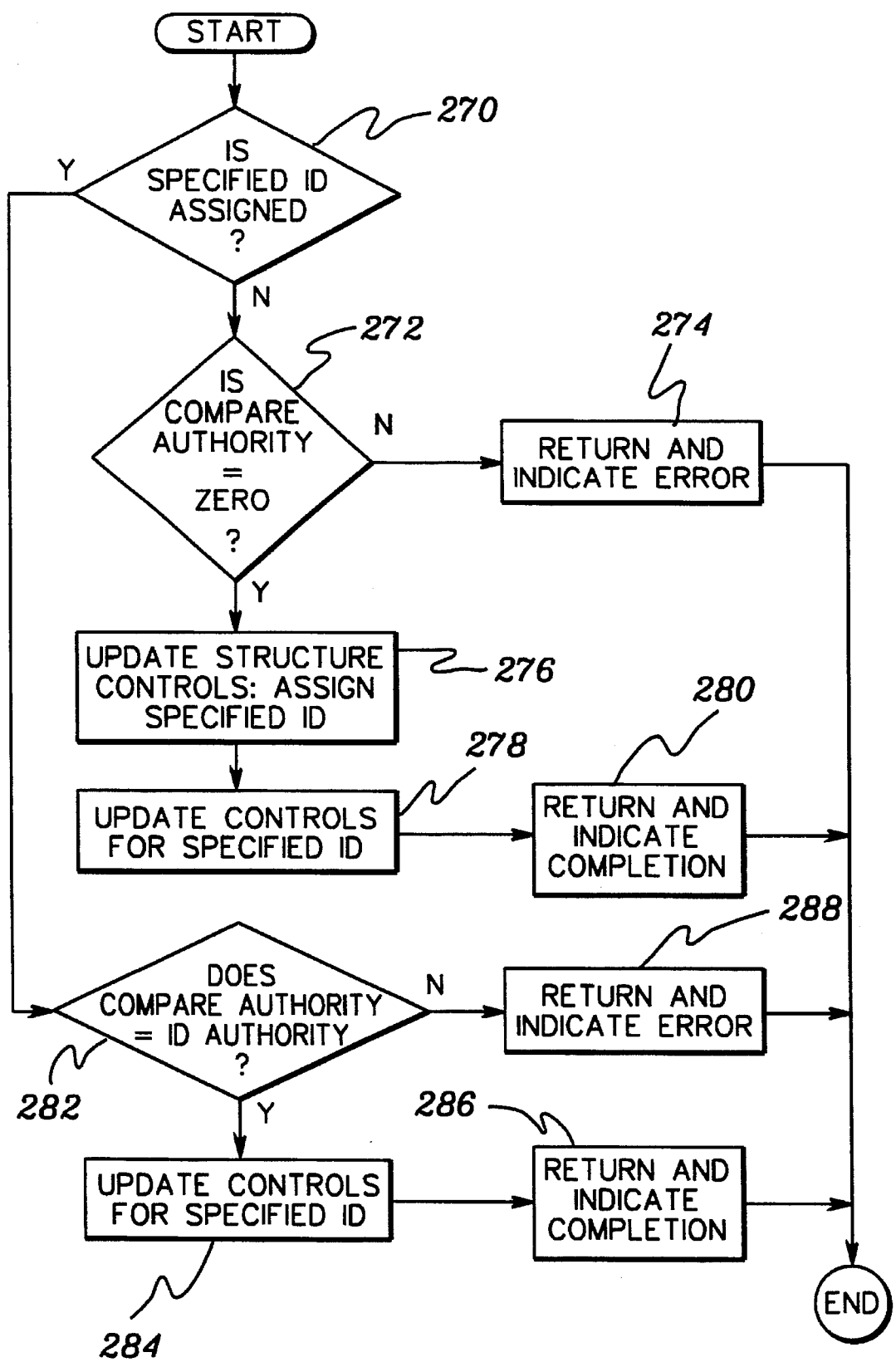
FIG. 18 depicts one embodiment of the logic associated with an attach processing command, in accordance with the principles of the present invention.

Referring to FIG. 18, initially, an inquiry is made as to whether or not the user is already attached to the structure. In particular, a determination is made as to whether the specified user identifier (FIG. 9) is assigned, INQUIRY 270 "IS SPECIFIED ID ASSIGNED?" When the user identifier is not assigned, the comparative user authority value (CUAU) in request/response operands (FIG. 13) is compared to zero, INQUIRY 272 "IS COMPARE AUTHORITY=0?" If the comparative user authority is not zero, the user authority value and the user-attachment control response operands (FIG. 13) are returned, along with an error indication, STEP 274 "RETURN AND INDICATE ERROR.

On the other hand, when the user authority comparison is successful, the structure controls (i.e., list structure controls 92) are updated, STEP 276 "UPDATE STRUCTURE CONTROLS: ASSIGN SPECIFIED ID." In particular, controls, such as the appropriate assigned bit in the user-identifier vector of list-structure controls 92 is set to one, and in list-user control block 94, the user state is set to active, the detachment restart token is set to zero and the user authority and user-attachment controls are updated, STEP 278 "UPDATE CONTROLS FOR SPECIFIED ID." Subsequently, a successful response code indicating completion is returned, STEP 280 "RETURN AND INDICATE COMPLETION." Thereafter, processing of the attach command ends.

Returning to INQUIRY 270 "IS SPECIFIED ID ASSIGNED?", if the user identifier is assigned, then flow passes to INQUIRY 282 "DOES COMPARE AUTHORITY=ID AUTHORITY?" When comparative user authority (FIG. 13) is equal to the user authority (FIG. 9), the user state is set active, the user authority and user-attachment control objects (FIG. 9) are replaced by the user authority and user-attachment control request operands (FIG. 13), STEP 284 "UPDATE CONTROLS FOR SPECIFIED ID." Thereafter, a successful return code indicating completion is returned, STEP 286, and processing ends.

However, if the user authority comparison fails, INQUIRY 282, the user authority, user-attachment control and an error response are returned in the response operands, STEP 288.

Similarly to attaching list structure users, a local cache may be attached. The attach-local-cache command identifies a local cache to an existing coupling facility (SES) cache. In one embodiment, this is accomplished using the same logic as depicted in FIG. 18. In particular, in order to attach a local cache, an inquiry is made as to whether or not the local cache is already assigned. In particular, a determination is made as to whether a specified local cache identifier (FIG. 5) is assigned, INQUIRY 270 "IS SPECIFIED ID ASSIGNED?" When the local cache identifier is not assigned, the comparative local-cache authority value in request/response operands (FIG. 13) is compared to zero, INQUIRY 272 "IS COMPARE AUTHORITY=0?" If the comparative local-cache authority is not zero, the local-cache authority value and the attachment information controls are returned in the request/response operands (FIG. 13), along with an error indication, STEP 274.

On the other hand, when the local-cache authority comparison is successful, the structure controls (i.e., cache structure controls 69) are updated, STEP 276 "UPDATE STRUCTURE CONTROLS: ASSIGN SPECIFIED ID." In particular, the specified local cache identifier is assigned. In addition, controls for the specified local cache identifier are updated, STEP 278. In particular, the attachment status in local-cache control block 70 is placed in the active state, and the local-cache controls, such as local-cache authority, local-cache token, the attachment status, and attachment information in local-cache control block 70 are set, as well as the detachment restart token. Subsequently, a successful response code indicating completion is returned, STEP 280 "RETURN AND INDICATE COMPLETION." Thereafter, processing of the attach command ends.

Returning to INQUIRY 270 "IS SPECIFIED ID ASSIGNED?", if the local-cache identifier is assigned, then flow passes to INQUIRY 282 "DOES COMPARE AUTHORITY=ID AUTHORITY?" When the comparative local-cache authority (FIG. 13) is equal to the local-cache authority (FIG. 5), the attachment status is set to active, the attachment information and local-cache authority controls (FIG. 5) are replaced by the attachment information and local-cache authority request operands (FIG. 13), STEP 284 "UPDATE CONTROLS FOR SPECIFIED ID." Thereafter, a successful return code indicating completion is returned, STEP 286, and processing ends.

However, if the local-cache authority comparison fails, INQUIRY 282, the local-cache authority and attachment information controls of the response operands are returned, along with an exception response code, STEP 288.

Returning to FIG. 17*b*, and in particular INQUIRY 266, when there is a successful attach, INQUIRY 266 "ATTACH SUCCESSFUL?", the active policy image is updated in virtual storage to indicate such, STEP 300 "UPDATE AP FOR ATTACHED USER," and notification of the connect is initiated, as described below, STEP 302 "INITIATE NOTIFICATION OF CONNECT."

Figure 19:
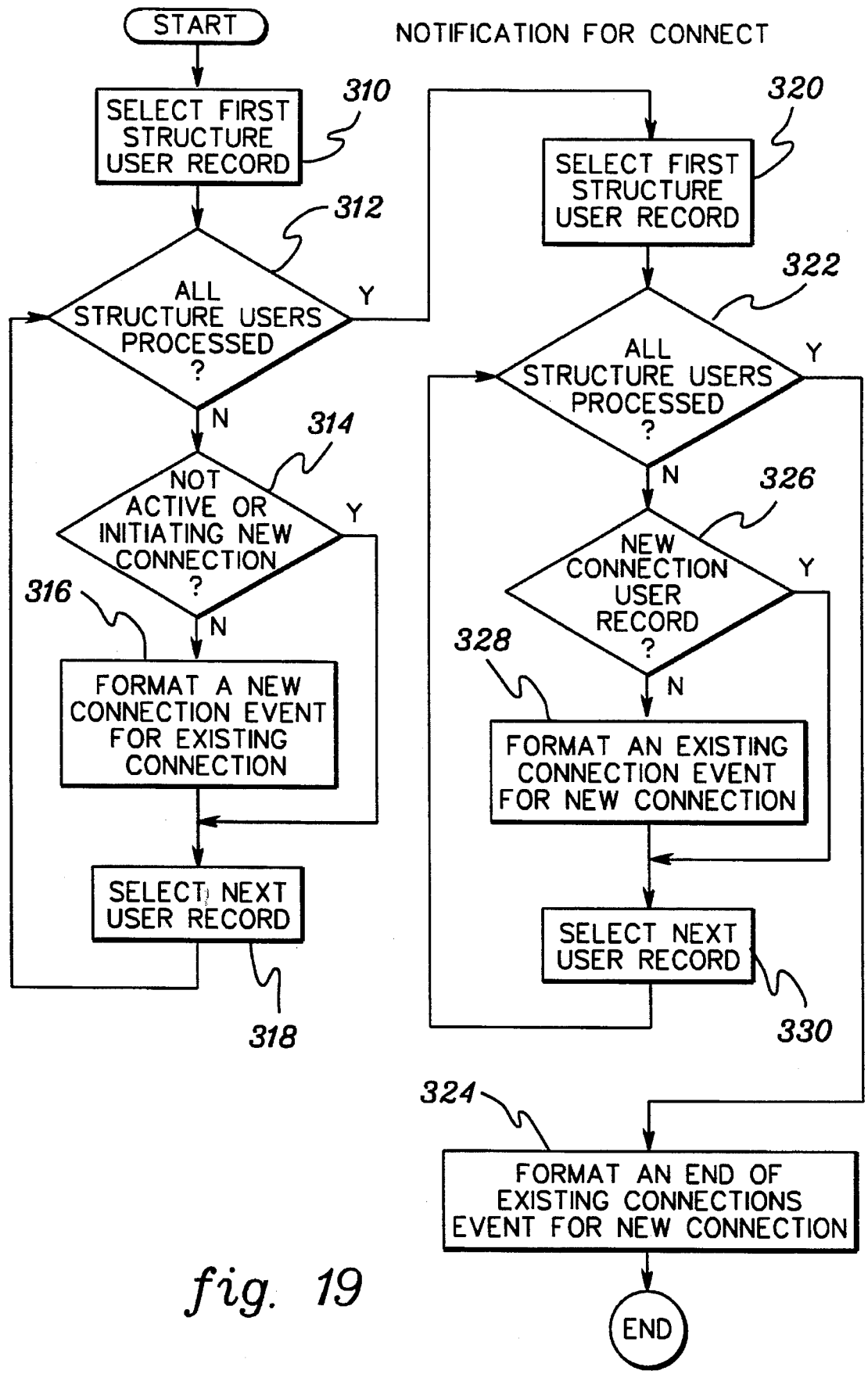
FIG. 19 illustrates one embodiment of the logic associated with a notification for a connect command, in accordance with the principles of the present invention.

Referring to FIG. 19, one example of the logic associated with the notification process is described in detail. Initially, the first structure user record is selected from the active policy, STEP 310 "SELECT FIRST STRUCTURE USER RECORD." Subsequently, a determination is made as to whether all structure users have been processed, INQUIRY 312 "ALL STRUCTURE USERS PROCESSED?"

If all of the users have not been processed, and the user is active and the user is not the one initiating the new connection, INQUIRY 314 "NOT ACTIVE OR INITIATING NEW CONNECTION", a new connection event for the existing connection (described below) is formatted, STEP 316 "FORMAT A NEW CONNECTION EVENT FOR EXISTING CONNECTION." After the event is formatted or if the user is inactive or the user is the one initiating the new connection, the next user record in the active policy is selected, STEP 318 "SELECT NEXT USER RECORD," and flow passes to INQUIRY 312 "ALL STRUCTURE USERS PROCESSED?"

Returning to INQUIRY 312, if all of the structure users have been processed, then the first structure user record is selected from the active policy, STEP 320 "SELECT FIRST STRUCTURE USER RECORD." If all of the users are processed, INQUIRY 322 "ALL STRUCTURE USERS PROCESSED," then an end of existing connections event (described below) is formatted for the new connection, STEP 324 "FORMAT AN END OF EXISTING CONNECTIONS EVENT FOR NEW CONNECTION."

On the other hand, if all of the structure users have not been processed, INQUIRY 322, a determination is made as to whether the user record is for the new connection, INQUIRY 326 "NEW CONNECTION USER RECORD?" Should a user record not be for the new connection, an existing connection event for the new connection is formatted, STEP 328. Subsequent to formatting the connection event or if a user record is for the new connection, the next user record is selected, STEP 330 "SELECT NEXT USER RECORD," and flow passes to INQUIRY 322 "ALL STRUCTURE USERS PROCESSED?"

Returning to FIG. 17*b*, after initiating notification of the connect, the active policy is written from virtual storage to the function data set and the active policy in the function data set is unlocked, STEP 340 "WRITE AND UNLOCK AP TO FUNCTION DATA SET" and the connect process is complete. (One embodiment of the write and unlock process is described in U.S. patent application Ser. No. 07/548,516 for "Shared Data Access Serialization Method and Apparatus" by Insalaco et al (Attorney Docket No. PO9-88-007), filed on Jul. 2, 1990, and is incorporated herein by reference in its entirety.)

Returning to INQUIRY 266, if the attach is unsuccessful, a determination is made as to whether the vector(s) was defined successfully, INQUIRY 342 "DEFINE VECTOR SUCCESSFUL?" When the vector is defined successfully, the vector is released, STEP 344 "RELEASE VECTOR." After releasing the vector or if the vector definition is unsuccessful, a determination is made as to whether the attach was successful, INQUIRY 346 "ATTACH SUCCESSFUL?"

In particular, this inquiry is made to enable back-out of connect processing for failures which occur after the ATTACH successful condition at INQUIRY 266 on FIG.

17*b*. Specific failure conditions are not discussed, since they are not pertinent to the present invention.

Should the attach be successful, a detach user command, described below, is processed to completion, STEP 348 "ISSUE DETACH USER COMMAND TO COMPLETION." In particular, a detach-local-cache command is issued to atomically remove the identification of a local cache to a coupling facility cache and to free the specified local-cache identifier. Alternatively, a detach-list-structure-user command is used to detach a list structure user. One embodiment of the logic associated with a detach-local-cache command and/or a detach-list-structure-user command is described in detail below with reference to FIGS. 20*a*–20*b*. The particular controls associated with the detach-list-structure-user command are included in parentheses after the associated cache controls for the detach-local cache command.

Figure 20A:
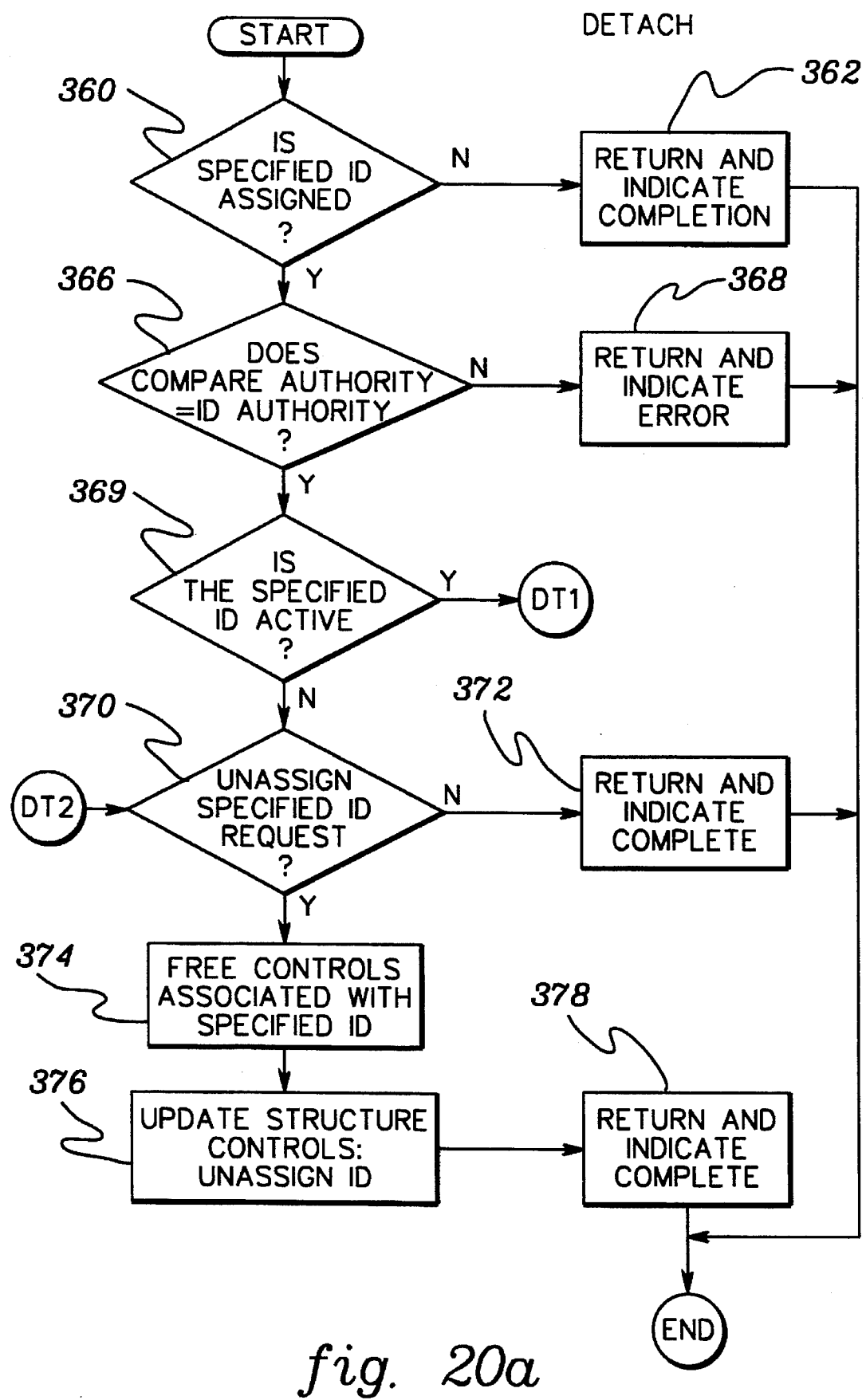
FIGS. 20a–20b depict one embodiment of the logic associated with a detach command, in accordance with the principles of the present invention.
Figure 20B:
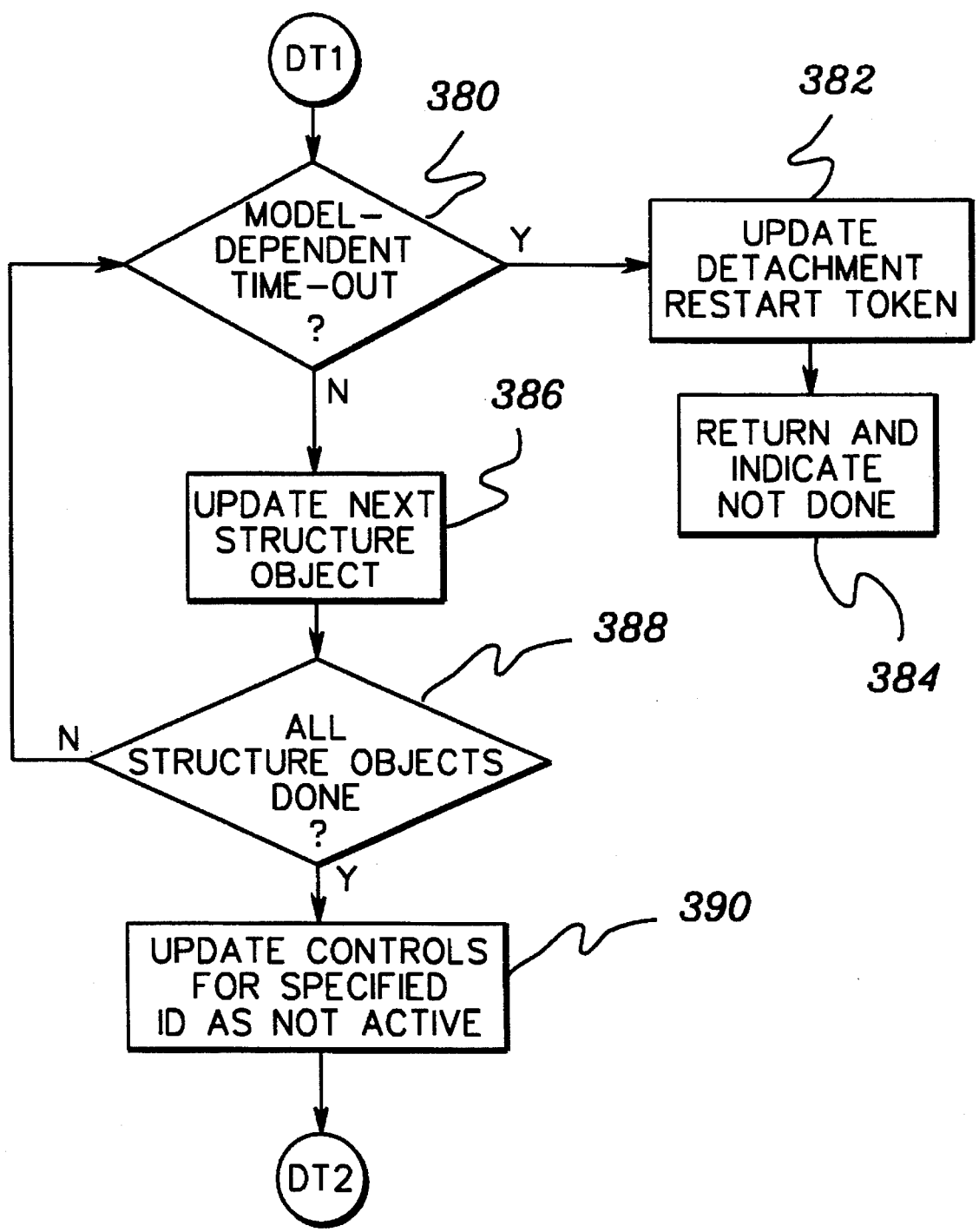

Referring to FIG. 20*a*, a determination is made as to whether a local cache identifier (FIG. 5) (or a user identifier in FIG. 9 in the case of the detach-list-structure-user command) is assigned, INQUIRY 360 "IS SPECIFIED ID ASSIGNED?" In particular, the LCID (or UID) string, which is indexed by LCID (or UID) is checked to see if the bit is on. If the bit is equal to one, the local identifier (or user identifier) is assigned. When the local cache identifier (or user identifier) is not assigned indicating that detachment has been completed, a completion code is returned, STEP 362 "RETURN AND INDICATE COMPLETION."

Should the local cache identifier (or user identifier) be assigned, an authority comparison takes place, INQUIRY 366 "DOES COMPARE AUTHORITY=ID AUTHORITY?" In particular, comparative local-cache authority (or comparative user authority) (FIG. 13) is compared to local-cache authority (FIG. 5) (or user authority (FIG. 9)). Should the comparison fail, the command is completed and the value of the local-cache authority (or user authority and user-attachment control) (FIG. 13) is returned, as well as an error code, STEP 368 "RETURN AND INDICATE ERROR."

If the comparison is successful, a determination is made as to whether the local cache identifier (or user identifier) is active, INQUIRY 369 "IS THE SPECIFIED ID ACTIVE?" That is, is the local cache identifier (or user identifier) inactive, as designated by the attachment status (FIG. 5) (or user attachment control (FIG.9))? Should the local cache identifier (or user identifier) be inactive, a determination is made as to whether the local cache identifier (or user identifier) is to be unassigned, INQUIRY 370 "UNASSIGN SPECIFIED ID REQUEST?" In particular, the LCID-unassignment control (or the detachment-request type) (FIG. 13) is checked, and if it is zero, no action is taken and a successful response code is returned, STEP 372 "RETURN AND INDICATE COMPLETE."

On the other hand, when the LCID-unassignment control (or detachment-request type) is set to one indicating that the local cache identifier (or user identifier) is to be released, then the local-cache controls in FIG. 5 (or the list-user controls in FIG. 9) and the designated bit in the LCID vector (or the user identifier vector) are reset and a successful response code is returned, STEPS 374, 376, and 378.

Returning to INQUIRY 369 "IS THE SPECIFIED ID ACTIVE?" when the local-cache identifier (or user identifier) is active, as designated by the attachment status in FIG. 5 (or user attachment control in FIG. 9) and therefore, attached, an inquiry is made into whether a model-dependent time-out has occurred, INQUIRY 380 "MODEL-DEPENDENT TIME-OUT?" When the model-dependent time-out value is exceeded, the detachment restart token is updated in the local cache controls (for a list structure, list user controls is updated) and an exception response is returned, STEPS 382, 384.

However, when the model-dependent time-out has not been exceeded, the detachment process continues. In particular, for a cache detachment, the directory is searched starting with the directory entry specified by the detachment restart token in the local-cache controls. When the detachment restart token is not zero, detach processing is resumed at the directory entry specified in the token.

Each directory entry is processed as follows: the local-cache register is updated by clearing the row assigned to the local-cache specified by the LCID request operand, STEP 386 "UPDATE NEXT STRUCTURE OBJECT." The cast-out lock is tested. When the first byte of the cast-out lock is set to the value specified in the LCID operand, the cast-out lock is reset to zero, and the change bit in state field 80 is set to indicate the data is changed.

When the entire directory has not been processed, flow returns to INQUIRY 380. However, when the entire directory has been processed, INQUIRY 388 "ALL STRUCTURE OBJECTS DONE?", the attachment status control is updated as not active, STEP 390. Further, when the local-cache unassignment control is one, INQUIRY 370, the designated bit in the LCID vector and the local-cache controls are reset and a successful response is returned, STEPS 374, 376 and 378.

When the entire directory has been processed, the attachment status is reset to inactive, STEP 390, and when the local-cache unassignment control is zero, INQUIRY 370, a successful response code is returned, STEP 372. The remaining local-cache controls and the LCID vector are not changed.

When the model-dependent time-out period has not been exceeded and it is a list structure detachment process, the next list-monitor table entry associated with the list-structure user is updated by resetting the associated list-monitoring-active bit, STEP 386 "UPDATE NEXT STRUCTURE OBJECT." When all of the list-monitoring-active bits of all the list-monitortable entries associated with the list-structure user are reset, INQUIRY 388 "ALL STRUCTURE OBJECTS DONE?", then the user-attachment control is updated to inactive, STEP 390 "UPDATE CONTROLS FOR SPECIFIED ID AS NOT ACTIVE," and flow passes to INQUIRY 370 "UNASSIGN SPECIFIED ID REQUEST?" Should all the structure objects not be done, flow passes back to INQUIRY 380 "MODEL-DEPENDENT TIME-OUT?"

If a detach-list-structure-user command is reissued until a successful response code is returned and no intervening register-list-monitor commands are received for the same user, then all the list-notification commands issued on behalf of the detached user are complete.

The detach-list-structure user command is an exception to the specification of command-concurrent references. A register-list-monitor command is permitted to complete successfully during execution of a detach-list-structure-user command. The program must serialize the detachment process with the issuance of register-list-monitor commands, if all list-notification commands for a user must be complete when a user is detached.

An assigned user identifier for a detached user may be unassigned by issuing the detach-list-structure-user command with the appropriate detachment-request type.

Returning to FIG. 17*c*, after the detach user command or if the attach was unsuccessful, a determination is made as to whether the allocate was successful, INQUIRY 400 "ALLOCATE SUCCESSFUL?" Should the allocate be successful, a deallocate command, described below, is issued to completion, STEP 402 "ISSUE DEALLOCATE COMMAND TO COMPLETION."

In particular, the cache or list structure is deallocated. In one embodiment, the logic associated with deallocating a structure is described in detail with reference to FIG. 21. The logic will be discussed with relation to deallocating a cache structure, and the relevant changes in order to deallocate a list structure will be included in parentheses.

Figure 21:
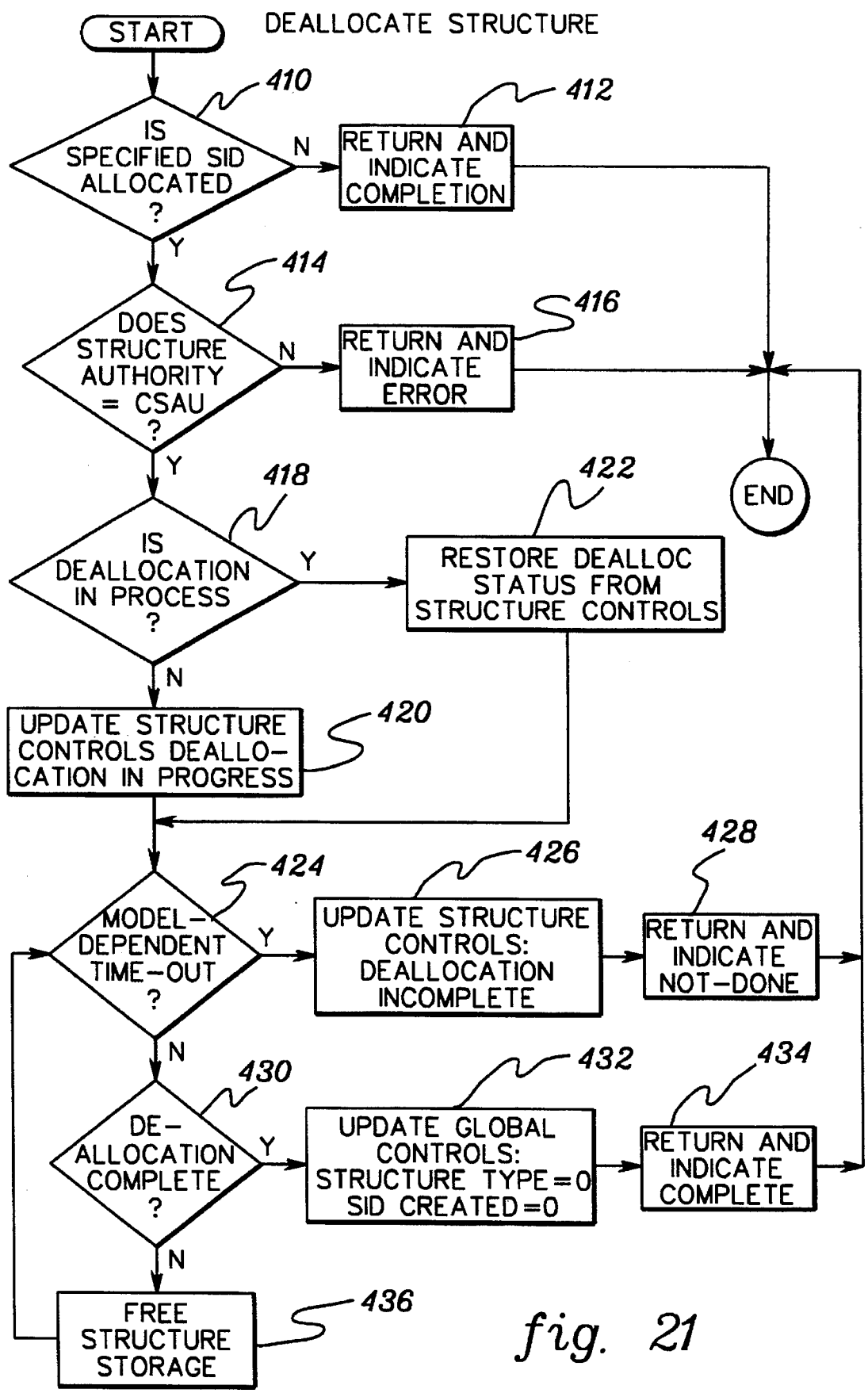
FIG. 21 depicts one embodiment of the logic associated with a deallocate structure command, in accordance with the principles of the present invention.

Referring to FIG. 21, a determination is made as to whether the specified structure identifier, SID, is allocated, INQUIRY 410 "IS SPECIFIED SID ALLOCATED?" When the specified created bit of the structure-identifier vector is zero, no processing occurs and a successful response code is returned, STEP 412 "RETURN AND INDICATE COMPLETION".

When the specified bit of the structure identifier vector is one, a structure authority comparison is made, INQUIRY 414 "DOES STRUCTURE AUTHORITY=CSAU?" When the value of the structure authority in cache-structure controls 69 (FIG. 4) (or in list-structure controls 92 (FIG. 8)) is not equal to the comparative structure authority operand in request/response operands (FIG. 13), the value of the structure authority and the user structure control (USC) in the request/response operands (or for a list structure, the structure authority and the user structure control (USC)) and an error response code are returned, STEP 416 "RETURN AND INDICATE ERROR."

When the structure authority comparison is successful, a determination is made as to whether deallocation is already in progress, INQUIRY 418 "IS DEALLOCATION IN PROCESS?" When deallocation is not is progress, as indicated by a deallocation control (not shown) in cache-structure controls (or list structure controls), deallocation is initiated for a cache (or list) structure. In particular, the cache-structure controls (or list-structure controls) are updated to indicate deallocation is in progress, STEP 420 "UPDATE STRUCTURE CONTROLS: DEALLOCATION IN PROGRESS," and flow passes to INQUIRY 424.

Returning to INQUIRY 418, when deallocation is in process, the deallocation control in cache-structure controls (or list-structure controls) is restored, STEP 422 "RESTORE DEALLOC STATUS FROM STRUCTURE CONTROLS," and flow passes to INQUIRY 424.

Should a model-dependent time-out occur before the deallocation process is complete, INQUIRY 424 "MODEL-DEPENDENT TIME-OUT?", the structure is placed in the deallocation incomplete state, the free space and free control space global controls are updated and an exception response code is returned, STEPS 426, 428.

When there is no model-dependent time-out and deallocation is complete, INQUIRY 430 "DEALLOCATION COMPLETE?", the structure type and the created bit in the structure-identifier vector are reset to zero and a successful response code is returned, STEPS 432, 434.

When the response code is successful, the structure is no longer available, and its associated storage is available for a subsequent allocation request.

When deallocation is incomplete, the structure storage is freed and the free-space and free-control-space global controls are updated, STEP 436 "FREE STRUCTURE STORAGE." Thereafter, flow returns to INQUIRY 424 "MODEL-DEPENDENT TIME-OUT?"

When a deallocate-cache-structure command designates a cache structure that has not been created but for which allocation is not complete, the structure is deallocated.

The specified created bit of the SID vector is reset on completion of the deallocate command. When deallocation is in progress, all commands except for the read-structure-type, and deallocate-cache-structure command fail with an exception response.

As for a list structure, the specified created bit of the SID vector is reset on completion of the deallocate command. When deallocation is in progress, all commands, except for the read-structure-type, and deallocate-list-structure commands fail with an exception response.

When deallocation is in progress, the read-structure-type command returns the structure type of the structure that is being deallocated. Also, an allocation command specifying the same SID fails with a deallocation-incomplete status condition.

Returning to FIG. 17c, subsequent to processing the deallocate command to completion, STEP 402, a check of the error indicator is made, INQUIRY 440. Should the error indicator not be set, the flow returns to INQUIRY 230 (FIG. 17a) "ANY MORE ELIGIBLE FACILITIES?" Otherwise, if the error indicator is set or if allocate is unsuccessful, the active policy in the function data set is unlocked, STEP 442 "UNLOCK AP IN FUNCTION DATA SET," and an error code is returned, STEP 444 "SET ERROR RETURN."

Returning to INQUIRIES 222, 224, 230, 244, 252, 256, and 258, if the structure is undefined, or the structure allocation is incompatible, or there are no more eligible facilities or the allocate is unsuccessful or the name is not failed persistent or the vector definition is unsuccessful or there are not any available user area in the active policy, flow passes to STEP 446 "SET ERROR INDICATOR." Thereafter, processing continues with INQUIRY 342 "DEFINE VECTOR SUCCESSFUL?"

Returning to INQUIRY 226, should the structure allocation be compatible, flow passes to INQUIRY 248 "IS A CONNAME SPECIFIED?" and processing continues, as described above. Further, returning to INQUIRY 236, if there is not an available SID, flow returns to INQUIRY 230 "ANY MORE ELIGIBLE FACILITIES?", and processing continues, as described above.

One example of a connection service, the logic of which is described above, is referred to as IXLCONN. The IXLCONN service is a vehicle by which a user becomes a connected XES user, gains access to XES services, gains access to a coupling facility structure, and defines the attributes of the coupling facility structure and the connection.

In one embodiment, the caller of IXLCONN supplies, for example, some or all of the following information to the service:

(a) a coupling facility structure name;

(b) the attributes of the structure, such as the number of lists in a list structure; and (c) a set of one or more exit routines, each of which is designed to facilitate communication between the connected XES user and XES software services. Examples of exit routines to be invoked by XES are described below:

1. An EVENT exit is required for all connections and is used to report error and status conditions.

2. A COMPLETE exit is required for all connections and is used to inform the connected XES user that a previous request has completed.

3. A LIST TRANSITION exit, which is optional for list structures, is used to inform a connected XES user that a monitored list has transitioned into a nonempty state. The LIST TRANSITION exit is required, however, in order to use the list monitoring function.

When invoking the IXLCONN service, the connected XES user identifies the coupling facility structure that it wishes to access. This is accomplished by specifying the coupling facility structure name (STRNAME). The structure name and the total size of each structure are controlled by the installation through the installation coupling facility policy, described above. All other attributes of the structure are specified by the connected XES user on the IXLCONN service.

In one embodiment, IXLCONN has the following syntax (some of the keywords for IXLCONN and other services described below are designated as required, but may be optional in another embodiment):

```
IXLCONN  STRNAME=xstrname
         [,STRSIZE={xstrsize|0}]
         [,CONDATA={xcondata|ALL_ZEROES}]
         ,STRDISP={KEEP|DELETE}
         ,CONDISP=KEEP
                ,CONNAME=xconname
         ,CONDISP=DELETE
                [,CONNAME={xconname|GENERATED
                          NAME}]
         [,NONVOLREQ={NO|YES}]
         ,EVENTEXIT=xeventexit
         ,COMPLETEEXIT=xcompleteexit
         ,TYPE=CACHE
                [,ELEMCHAR={xelemchar|0}]
                [,MAXELEMNUM={xmaxelemnum
                              |16}]
                [,DIRRATIO={xdirratio|1}]
                [,ELEMENTRATIO={xelementratio
                               |1}]
                [,ADJUNCT={NO|YES}]
                 ,VECTORLEN=xvectorlen
                 ,NUMCOCLASS=xnumcoclass
                 ,NUMSTGCLASS=xnumstgclass
         ,TYPE=LIST
                [,ELEMCHAR={xelemchar|0}
                    [,MAXELEMNUM={xmaxelemnum
                                  |16}]]
                [,ENTRYRATIO=xentryratio|1}]
                [,ELEMENTRATIO={xelementratio
                               |1}]
                [,ADJUNCT={NO|YES}]
                [,LISTCNTRLTYPE={ENTRY
                                 |ELEMENT}]
                [,REFOPTION={NOKEYNAME|KEY
                             |NAME}]
                [,VECTORLEN={xvectorlen|0}
                    [,LISTTRANEXIT=
                        {xlisttranexit|0}]]
                 ,LISTHEADERS=xlistheaders
                [,LOCKENTRIES={xlockentries
                              |0}
                 ,NOTIFYEXIT=xnotifyexit]
         ,TYPE=LOCK
                [,RECORD={NO|YES}]
                 ,LOCKENTRIES=xlockentries
                 ,NUMUSERS=xnumusers
                 ,CONTEXIT=xcontexit
                 ,NOTIFYEXIT=xnotifyexit
         ANSAREA=xansarea
         ,ANSLEN=xanslen
         [,RETCODE=xretcode]
         [,RSNCODE=xrsncode]
```

Where:

STRNAME(xstrname) is the name (RS-type) (or address in register (2)-(12) ASM only) of a required 16 character input that specifies the structure name the user wishes to connect to. The logical structure name provides the ability to map the request to a physical facility. The name is defined in the active policy.

The structure name must be 16 characters long, padded on the right with blanks if necessary.

[STRSIZE({xstrsize|0})] is the name (RS-type) (or address in register (2)-(12) ASM only) of an optional fullword input that specifies the structure size. This size will be used to allocate the structure if the size is smaller than the structure size defined in the active policy. If the size is not smaller than the policy size, the policy size will be used to allocate the structure.

Regardless of whether the connector specified size or the policy size is used, the structure may always be allocated using less than the requested space when there are limited facility resources available. The actual structure size is returned in the connect answer area.

When STRSIZE is 0 (default), the structure size in the active policy, described herein, is used. DEFAULT: 0

[{CONDATA({xcondata|ALL_ZEROES})] is the name (RS-type) (or address in register (2)-(12) ASM only) of an optional 8 character input that specifies connector data that will be provided to this connection's exits and can be used as the invoker wishes. DEFAULT: ALL_ZEROES STRDISP({KEEP|DELETE}) is a required keyword input which defines an attribute of the structure to be allocated. The disposition of a structure defines whether the structure is persistent when there are no longer any defined connections (active or failed-persistent).

KEEP structure always remains allocated.

DELETE structure is deleted when there are no active or failed-persistent connections.

CONDISP({KEEP|DELETE}) is a required keyword input which defines an attribute of the connection. The disposition of a connection defines whether the connection is persistent, if the connection abnormally terminates.

CONDISP(KEEP) connection is in a failed-persistent state after abnormal termination. There are several ways that a failed-persistent connection can be cleaned up: 1) via the IXLEERSP macro, described below, after all serving connectors have cleaned up for the terminated connection, 2) by reconnecting as the terminated user (by specifying the same CONNAME on IXLCONN), or 3) via an IXLFORCE macro, described below, which can be invoked to force deletion of the failed-persistent connection.

CONNAME(xconname) is the name (RS-type) (or address in register (2)-(12) ASM only) of a required 16 character input that specifies a name by which the user wishes to be identified. The name must be unique within the scope of the given structure.

The CONNAME must be 16 characters long, padded on the right with blanks if necessary.

If the name provided matches the name of another active connection to the same structure, then the connect request will be rejected. If the name provided matches the name of a connection in the failed-persistent state and all peer connections have acknowledged via return code in the event exit parameter list (EEPL) or have issued IXLEERSP, then the connection is re-established (reconnected). Otherwise, the connection is rejected. On a reconnection, a new CONTOKEN is returned to the user in the answer area.

For all supported exits, the CONNAME for the subject of the event is presented.

CONDISP(DELETE) connection is not defined after abnormal termination.

[CONNAME({xconname|GENERATED_NAME})] is the name (RS-type) (or address in register (2)-(12) ASM only) of an optional 16 character input that specifies a name by which the user wishes to be identified. The name must be unique within the scope of a given structure.

If the CONNAME keyword is not specified, then a unique name will be generated and returned to the user in the answer area. The attributes and characteristics of CONNAME are described above.

[NONVOLREQ({NO|YES})] is an optional keyword input which indicates whether the structure requires that the coupling facility be non-volatile. DEFAULT: NO.

NO The structure may be allocated in any facility regardless of the volatility attribute of the facility.

YES The structure should be allocated in a facility that is non-volatile. The user must check the CONAVOLATILE flag in the connect answer area to determine whether the non-volatility requirement was honored.

EVENTEXIT(xeventexit) is a required input. It is the name (RS-type) (or address in register (2)-(12) ASM only) of the user's event exit. The user's event exit will receive control in SRB mode, enable and unlocked.

COMPLETEEXIT(xcompleteexit) is a required input. It is the name (RS-type) (or address in register (2)-(12) ASM only) of the user's complete exit. The user's complete exit will receive control in SRB mode, enabled and unlocked.

TYPE({CACHE|LIST|LOCK}) is a required keyword input which defines the structure type for the structure to which the user is connecting to.

TYPE(CACHE) specifies a cache structure.

[ELEMCHAR({xelemchar|0})] is the name (RS-type) (or address in register (2)-(12) ASM only) of an optional byte input that specifies the element characteristic. The element characteristic defines the element size. The element size is specified as the power of two in the following formula:

$$256*(2**\text{ELEMCHAR}).$$

For example: If ELEMCHAR=0, then each data element will be 256 bytes.

The data written to and read from the structure is called a data entry. A data entry can be up to 16 times the data element characteristics.

The size of the data elements is a model dependent attribute of the coupling facility (e.g., SES). DEFAULT: 0

[MAXELEMNUM({xmaxelemnum|16})] is the name (RS-type) (or address in register (2)-(12) ASM only) of an optional byte input that specifies the maximum number of data elements per data entry. MAXELEMNUM must be in the range of 1 and 16 decimal. The value specified for MAXELEMNUM must be greater than or equal to the ELEMENTRATIO divided by DIRRATIO. This restriction ensures that all possible data elements allocated in a structure can be assigned to directory entries.

MAXELEMNUM is ignored if ELEMENTRATIO is zero. DEFAULT: 16

[DIRRATIO({xdirratio|1})] is the name (RS-type) (or address in register (2)-(12) ASM only) of an optional byte input that contains the directory part of the directory-to-element ratio.

DIRRATIO must be greater than zero. DEFAULT: 1

[ELEMENTRATIO({xelementratio|1})] is the name (RS-type) ( or address in register (2)-(12) ASM only) of an optional byte input that contains the element part of the directory-to-element ratio.

If the element portion of the directory-to-element ratio is zero, then the cache structure is allocated without data elements. DEFAULT: 1

(ADJUNCT({NO|YES})] is an optional keyword input which indicates whether an adjunct entry for each cache entry is needed. Each adjunct entry is 64 bytes. DEFAULT : NO NO Specifies no adjunct entries should be allocated.

YES Specifies adjunct entries should be allocated.

VECTORLEN(xvectorlen) is the name (RS-type) (or address in register (2)-(12) ASM only) of a required fullword input that contains the number of local buffers in the user's local cache which require concurrent registration. The value of this field is used to allocate resources which map the local buffers in the user's cache to the named entries in the cache structure.

NUMCOCLASS(xnumcoclass) is the name (RS-type) (or address in register (2)-(12) ASM only) of a required fullword input that contains the number of cast-out classes.

NUMSTGCLASS(xnumstgclass) is the name (RS-type) (or address in register (2)-(12) ASM only) of a required fullword input that contains the number of storage classes.

TYPE(LIST) specifies a list structure.

[ELEMCHAR({xelemchar|0}) is the name of an optional byte input that specifies the element characteristic, and is described above.

[MAXELEMNUM({xmaxelemnum|16})]] is the name of an optional byte input that specifies the maximum number of data elements per data entry, and is described above.

[ENTRYRATIO({xentryratio|1})] is the name (RS-type) (or address in register (2)-(12) ASM only) of an optional byte input that contains the entry part of the entry-to-element ratio. DEFAULT: 1

[ELEMENTRATIO({xelementratio|1})] is the name (RS-type) (or address in register (2)-(12) ASM only) of an optional byte input that contains the element part of the entry-to-element ratio.

If the element portion of the entry-to-element ratio is zero, then the entry-to-element ratio is IGNORED. The list structure is allocated without data elements. DEFAULT: 1

[ADJUNCT({NO|YES})] is an optional keyword input which indicates whether an adjunct entry for each list entry is needed, and is described above.

[LISTCNTLTYPE=({ENTRY|ELEMENT})] is an optional keyword input which specifies whether list limits should be specified and tracked as data entries or elements. DEFAULT: ENTRY ENTRY: Specifies that the list limits are specified and tracked as limits on data entries.

ELEMENT: Specifies that the list limits are specified and tracked as limits on data elements.

[REFOPTION({NOKEYNAME|KEY|NAME})] is an optional keyword input which indicates how the list entry will be referenced. The list entry can be referenced by the LEID in list entry control block 102 or the unkeyed position. The following optional reference options allow the list entry to also be referenced either by KEY or NAME. DEFAULT: NOKEYNAME NOKEYNAME: No additional reference options are requested.

KEY Indicates key support is requested. Key support allows the user to provide a 16 byte key when creating an entry. Key support is used to keep the list entry in sequence by key.

NAME: Indicates name support is requested. Name support allows the user of the list structure to associate a unique 16-byte name with each list entry. This name can be used by direct reference entry by name.

[VECTORLEN({xvectorlen|0}) is the name (RS-type) (or address in register (2)-(12) ASM only) of an optional fullword input that contains the number of list headers this connection will be monitoring for list transitions. DEFAULT: 0

[LISTTRANEXIT({xlisttranexit|0})]] is an optional input. It is the name (RS-type) (or address in register (2)-(12) ASM only) of the connected XES-list user's list transition exit. DEFAULT: 0

LISTHEADERS(xlistheaders) is the name (RS-type) (or address in register (2)-(12) ASM only) of a required fullword input that contains the number of list headers to be allocated for the list structure. The number of list headers must be greater than zero.

[LOCKENTRIES({xlockentries|0}) is the name (RS-type) (or address in register (2)-(12) ASM only) of an optional fullword input that contains the number of lock entries to be allocated. The number of lock entries will be rounded upward to a power of 2, if it is not already. If this keyword is not specified, then the list structure will not be allocated with serialization support. DEFAULT: 0

NOTIFYEXIT(xnotifyexit)] is a required input. It is the name (RS-type) (or address in register (2)-(12) ADM only) of the connected XES-list user's notify exit.

TYPE(LOCK) specifies a lock structure. [RECORD({NO|YES})] is an optional keyword input which indicates whether recording is desired. DEFAULT: NO NO Specifies no recording.

YES Specifies recording.

LOCKENTRIES(xlockentries) is the name (RS-type) (or address in register (2)-(12) ASM only) of a required fullword input that contains the number of lock entries to be allocated for the lock structure. The number of lock entries will be rounded upward to a power of 2, if it is not already.

NUMUSERS(xnumusers) is the name (RS-type) (or address in register (2)-(12) ASM only) of a required byte input that contains the maximum number of users that may connect and use the lock structure.

CONTEXIT(xcontexit) is a required input. It is the name (RS-type) (or address in register (2)-(12) ASM only) of the connected XES-locking user's contention exit.

NOTIFYEXIT(xnotifyexit) is a required input. It is the name (RS-type) (or address in register (2)-(12) ASM only) of the connected XES-locking user's notify exit.

ANSAREA(xansarea) is a required input. It is the name (RS-type) area to contain the data being returned by the IXLCONN service routine. The answer area must begin on a double word boundary.

ANSLEN(xanslen) is the name (RS-type) of a required fullword input that contains the length of the ANSAREA.

[RETCODE(xretcode)] is the name (RS-type) of an optional fullword output variable (or register (2)-(12) ASM only) into which the return code is to be copied from, for example, general purpose register (GPR) 15.

[RSNCODE(xrsncode)] is the name (RS-type) of an optional fullword output variable (or register (2)-(12) ASM only) into which the reason code is to be copied from, for instance, general purpose register (GPR) 0.

If the connected XES user is the first user to connect to the coupling facility structure specified by the structure name and this structure is not already allocated in a coupling facility, then the attributes specified on IXLCONN are used to allocate the structure in a coupling facility. The actual attributes of the allocated structure are returned on completion of the IXLCONN service. The new structure is allocated in the first coupling facility specified in the installation policy list which:

(a) has connectivity to the system trying to allocate the structure;

(b) meets the volatility requirement requested by the connector; and (c) has available space greater than or equal to the requested structure size or, if no facility in the policy list has free space greater than or equal to the requested structure size, the facility with the largest amount of free space is chosen.

On connects that occur when the structure has already been allocated as the result of some prior connection, the structure's attributes are not changed by any of the attributes on the IXLCONN request. The actual attributes of the structure that is allocated in the coupling facility are returned on completion of the IXLCONN service.

It is the responsibility of the connector to verify that the attributes of the structure, as indicated on return from the connect service, are acceptable. If the attributes are not acceptable, then the connector may decide to disconnect or cause other connections to disconnect so that a new structure can be allocated with acceptable attributes.

The attribute of persistence applies to both structures and connections to a structure. This attribute is specified at connect time. A persistent connection that has abnormally terminated is described as a failed-persistent connection.

Persistence for a connection means that the connection and the structure remain allocated if the connection terminates abnormally until all surviving connections have provided an event exit response and until either:

1. The failed-persistent connection reconnects as the same connection;

2. A peer connection detects that all recovery operations have been completed on behalf of the failed-persistent connection and that the connection no longer needs to be persistent. XES is informed by an IXLEERSP service, described below, or by setting a return code in the event exit parameter list; or 3. The failed-persistent connection is explicitly deleted through use of an IXLFORCE service, described below.

The persistence attribute for a connection does not apply when the connection terminates normally through an IXLCONN disconnect service (IXLDISC), described below, requesting normal termination.

Persistence for a structure means that the structure remains allocated even after all connections to the structure have terminated. The structure can be deleted by an IXLFORCE service, described below, only if there are no active or failed-persistent connections.

In order to determine the state of connections and structures, in one example, a query service referred to as IXCQUERY is used. One embodiment of IXCQUERY is described in MVS/ESA Application Development Reference: Services for Authorized Assembler Language Programs, IBM Publication No. GC28-1648-2, pp. 207–211, however, in accordance with the principles of the present invention, IXCQUERY has been modified, as described herein, in order to enable the retrieving of information for structures and users of structures. The query service is the interface to retrieve information regarding the coupling facility or coupling facility structure information from the active policy. More detailed information on a specific coupling facility or structure may be obtained by specifying the name. If an optional name is not specified, then general information on all coupling facilities or coupling facility structures is returned.

For general information on all coupling facilities, the data includes the coupling facility name and the coupling facility world wide unique identifier.

For detailed information on a named coupling facility or all coupling facilities, data is returned for system connectivity to the coupling facility, and for coupling facility structures assigned resources in the coupling facility. System connectivity information is comprised of a system name. Information regarding the coupling facility resources allocated in the coupling facility is the structure name and allocation status.

For general information of all coupling facility structures, data includes the structure name, the total size of the structure, and status of the structure. Status includes indications for allocation in a coupling facility.

For detailed information on a named structure or all structures, data is returned for coupling facility structure data, for the coupling facilities which may be used to contain the structure, for coupling facilities which do contain the structure, and for data on connectors to the coupling facility structure. The name of each coupling facility which can be used to contain the structure is returned. Information regarding the coupling facility resources assigned in a coupling facility for the structure include the coupling facility name, structure version, and the structure allocation status. Data reflecting the use of a structure include, for each user, the job or started task name, the address space, the system name where the user is/was executing, the connection identification information (including name, data, and version) and connection state (active and failed-persistent).

The IXCQUERY service may also be used to determine which connections are in a failed-persistent state and their associated connect names.

Possible states for a connection to a structure include:

(a) Undefined—the connection does not exist;

(b) Active—the connection exists;

(c) Disconnecting or Failing—the connection has disconnected with REASON=NORMAL (disconnecting state), or has been abnormally terminated or disconnected with REASON=FAILURE (failing state); and all event exit responses have not been received for the failure of this connection. If IXLCONN is issued with the same connection name as the connection in the disconnecting or failing state, the connect request will fail. A connection in the disconnecting or failing state cannot be forced using the IXLFORCE programming interface.

When all event exit responses are received, the connection will be placed in an undefined state, if the connection disposition is delete or the connection disconnected with REASON=NORMAL. If the connection disposition is keep and the connector terminated abnormally or disconnected with REASON=FAILURE, then the connection state is dependent on the response specified by each peer connection. If any peer connection indicated that the connection could be released, then the connection will be placed in the undefined state. If all connections specified that the connection should not be released, then the connection will be placed in the failed-persistent state; and (d) Failed-Persistent—the connection has abnormally terminated or disconnected with REASON=FAILURE, and all event exit responses have been received. All event exit responses from peer connections indicated that the connection should not be released.

With reference to FIG. 22, one embodiment of the events which cause a connection's state to transition between undefined, active, disconnecting or failing and failed-persistent is described in detail below.

(a) Active to Disconnecting or Failing (reference numeral 460): The connection is in the disconnecting or failing state until all peer connections provide an event exit response to the disconnected or failed connection event. See below active to undefined and active to failed-persistent for cases causing this state.

(b) Active to Undefined (reference numeral 462): All peer connections must provide an event exit response for the disconnected or failed connection event in order for a connection to be in the undefined state. The following cases will cause a connection to be put in the undefined state:
1) Abnormal termination of a connection with CONDISP=DELETE, described below, or
2) Disconnect, using IXLDISC REASON=NORMAL. An IXLDISC REASON=NORMAL request by a connector which owns resources in a lock structure, will be converted to an IXLDISC REASON=FAILURE request; or
3) Disconnect, using IXLDISC REASON=FAILURE for a connection with CONDISP=DELETE; or
4) At least one peer connection indicated RELEASECONN=YES when providing an event exit response for a connection that abnormally terminated with CONDISP=KEEP.

(c) Undefined to Active (reference numeral 464): In order to connect, use IXLCONN.

(d) Active to Failed-Persistent (reference numeral 466): All peer connections must provide an event exit response for the disconnected or failed connection event with RELEASECONN=NO in order for the connection to be placed in the failed-persistent state. The following cases will cause a connection to be put in the failed-persistent state:
1) Abnormal termination of a connection with CONDISP=KEEP, or
2) Disconnect, using IXLDISC REASON=FAILURE for a connection with CONDISP=KEEP.

(e) Failed-Persistent to Undefined (reference numeral 468):
1) Event exit response for the existing connection event indicating that the connection should be released; or
2) Using, for instance, an IXLFORCE macro, described below.

(f) Failed-Persistent to Active (reference numeral 470): A failed-persistent connection can be reconnected via IXLCONN specifying the same connection name as the failed-persistent connection. When a connection is reconnected, the connector is guaranteed that the structure version is the same as it was for the prior instance of the connection. The structure version is a value which is changed each time a new structure is allocated for the same structure name. The structure version for a new structure will always be greater than the structure version for a previous instance of the structure.

Reconnection to a structure is useful when a connection terminates abnormally and peer recovery is not possible. In this case, the failed connected XES user restarts and issues IXLCONN with the same connect name that was originally specified. If the connection is reconnected, IXLCONN will set a return and reason code, indicating that additional status information is available about the connection and/or structure. Returned information indicates whether the connection has been reconnected. If the connection was reconnected, the connected XES user may have additional clean-up or recovery to do depending on the application's recovery protocol.

On successful completion of the IXLCONN service routine, the requesting connected XES user is returned data which includes:

(a) A sysplex-wide unique connect token (CONTOKEN) that is used on subsequent requests for services from the connected XES user initiating the IXLCONN request.

(b) A connection identifier. Each connection, active or failed-persistent, is assigned a number unique within the scope of the structure. When a connection is in a failed-persistent state, the identifier will not be assigned to another connection. If a connection is reconnected, the identifier is equivalent to the previous instance of the connection. Some list and cache services return a connection identifier as an output.

(c) Attribute information for the coupling facility structure to which the connected XES user is connected. The connected XES user is responsible for verifying that the attributes of the coupling facility structure are acceptable. If the attributes are unacceptable, the user may release its connection by invoking the IXLDISC service.

(d) An indication of whether the connection is a new connection or whether a previous instance of the connection has been reconnected.

(e) A connection and structure version number. A structure version number is unique within the scope of the structure name. The structure version number changes (ascending) each time a new structure is allocated for the same structure name. A connect version number is unique within the scope of the structure name. The connect version number changes (ascends) for each new connection. For example, if a failed-persistent connection is reconnected, the new connection version number will be greater than the connection version number assigned to the previous instance of the connection.

(f) A vector token is only for connections to a list structure with list monitoring or a cache structure.

On successful completion of the IXLCONN service routine, the requesting connected XES user is connected to the requested coupling facility structure:

If the connected XES user is the first to allocate the coupling facility structure, it is connected to the coupling facility structure in the initialized state. A response indicates whether the connection allocated the coupling facility structure or not.

If the connected XES user is not the first to allocate the coupling facility structure (i.e., it is or was in use by other connections), the requesting connected XES user is connected to a coupling facility structure that may reflect requests previously issued by other connections.

May request all other supported XES functions that are valid for the type of structure to which the user is connected.

Is notified about all connections, active and failed persistent, through its event exit. All active connections are also notified of the new connection through their event exits. The new connection may receive events describing existing connections before the connect request completes. The set of existing connections presented to the new connection is a snap shot of all active and failed-persistent connections defined at the instant the new connection was assigned.

XES receives notification of events that affect both the availability and use of a coupling facility within the sysplex. The event exit may be driven before control has returned from the IXLCONN service. In general, changes in the status of the coupling facility are reported to each connector in the same sequence. For example, a connection will always see a new connection event before a connection disconnected or failed event.

In accordance with the principles of the present invention, the events which may be reported to a connection after connecting to a coupling facility structure include the following:

New Connection: This event is initiated by a successful connect to a coupling facility structure. For the new connection event, each active connected XES user connected to the same structure specified on the IXLCONN request is notified that a new connection to the coupling facility structure has been assigned. Information provided about the new connection includes the connection's connection name, connection identifier, and connection disposition.

Existing Connection: This event is initiated by a successful connect to a coupling facility structure. For the existing connection event, the new connected XES user receives notification of all other connections to the same coupling facility structure specified on its IXLCONN request. Each existing connection event describes one connection. Additional information provided along with this event describes the state (active or failed-persistent) and disposition of the existing connection.

Disconnected or Failed Connection: This event is initiated when either:
a) A connected XES user disconnects from a coupling facility structure by invoking the IXLDISC service, or
b) A connection's system terminates before the corresponding disconnect is issued: When the connection's system terminates, another system in the sysplex performs recovery processing for all connections owned by the failed system (or if no other systems were able to perform the cleanup, recovery processing would be done on a re-ipl). XES on the recovering system cleans up structure specific resources as appropriate. Peer connections are notified of the termination via the disconnected or failed connection event presented to their event exits. Once all peer connections have provided an event exit response for the failed connection, the connection will become failed-persistent, if the connection was defined requesting failed-persistence on abnormal termination. If the connection was defined, requesting deletion on abnormal termination, then the connection will become undefined. If there are no longer any defined connections, either active or failed-persistent, then the structure will be de-allocated, if it is not a persistent structure.
(c) A connection's address space terminates before the corresponding disconnect is issued: On address space termination, a subsystem/system component end-of-memory resource manager receives control prior to the XES resource manager. When the XES resource manager receives control, XES cleans up structure specific resources as appropriate. Peer connections are notified of the termination via the disconnected or failed connection event presented to their event exits. Once all peer connections have provided an event exit response for the failed connection, the connection will become failed-persistent, if the connection was defined requesting failed-persistence on abnormal termination. If the option at connect-time requested deletion on abnormal termination, the connection will become undefined. If there are no longer any defined connections, either active or failed-persistent, then the structure will be de-allocated, if it is not a persistent structure.

(d) Connection's Task Terminates: On task termination, a subsystem/system component end-of-task resource manager receives control prior to the XES resource manager. When the XES resource manager receives control, XES cleans up structure specific resources as appropriate. Peer connections are notified of the termination via the disconnected or failed connection event presented to their event exits. Once all peer connections have provided an event exit response for the failed connection, the connection will become failed-persistent, if the connection was defined requesting failed-persistence on abnormal termination. If the option at connect-time requested deletion on abnormal termination, the connection will become undefined. If there are no longer any defined connections, either active or failed persistent, then the structure will be deallocated, if it is not a persistent structure.

Each of the above disconnected or failed connection events is described in greater detail below.

The IXLDISC service is the vehicle by which a connected XES user releases its access to XES services and the coupling facility structure. Upon return from XES, the requesting connected XES user is denied any further access to XES-supported functions. To re-establish access authorization, it is necessary for the connected XES user to issue an IXLCONN request. A connected XES user may request IXLDISC services either because it is terminating due to failure or because it no longer requires access to a coupling facility structure.

Figure 23:
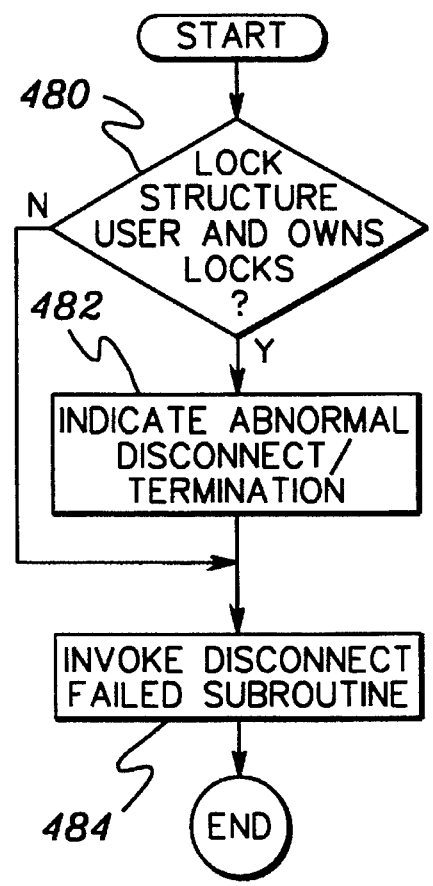
FIGS. 23, 23a–23c depict one embodiment of the logic associated with a disconnect/failed routine, in accordance with the principles of the present invention.
Figure 23A:
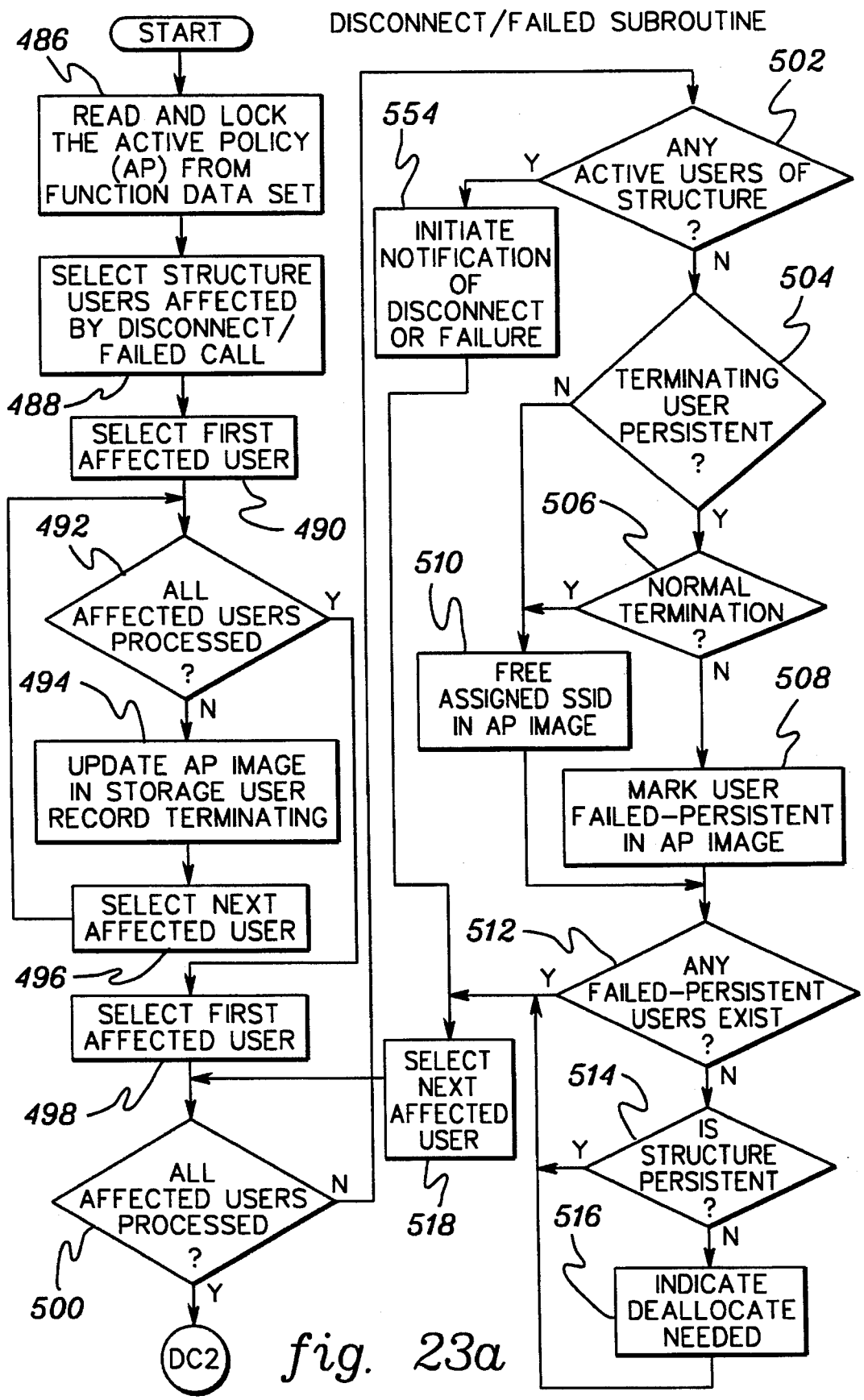
Figure 23B:
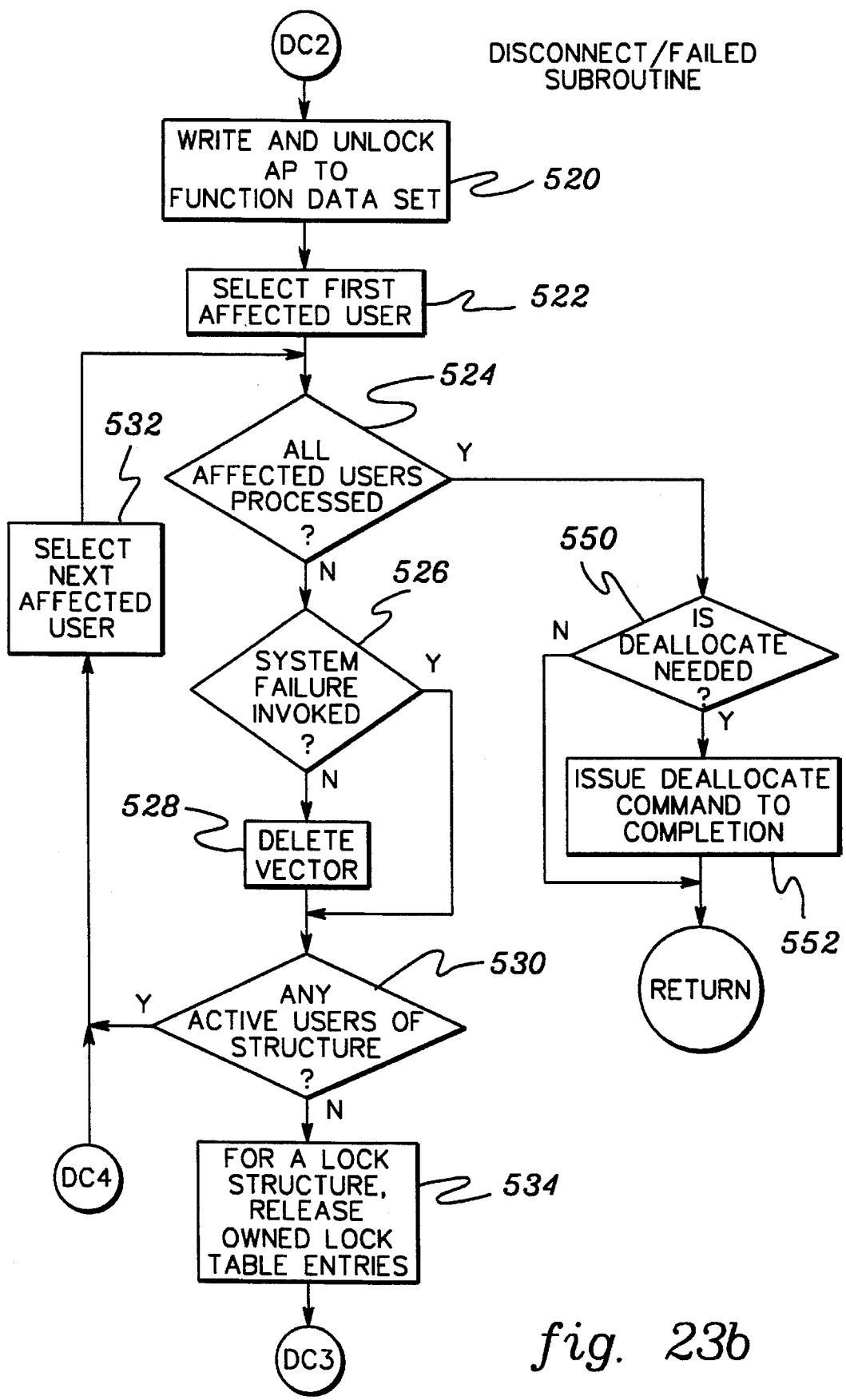
Figure 23C:
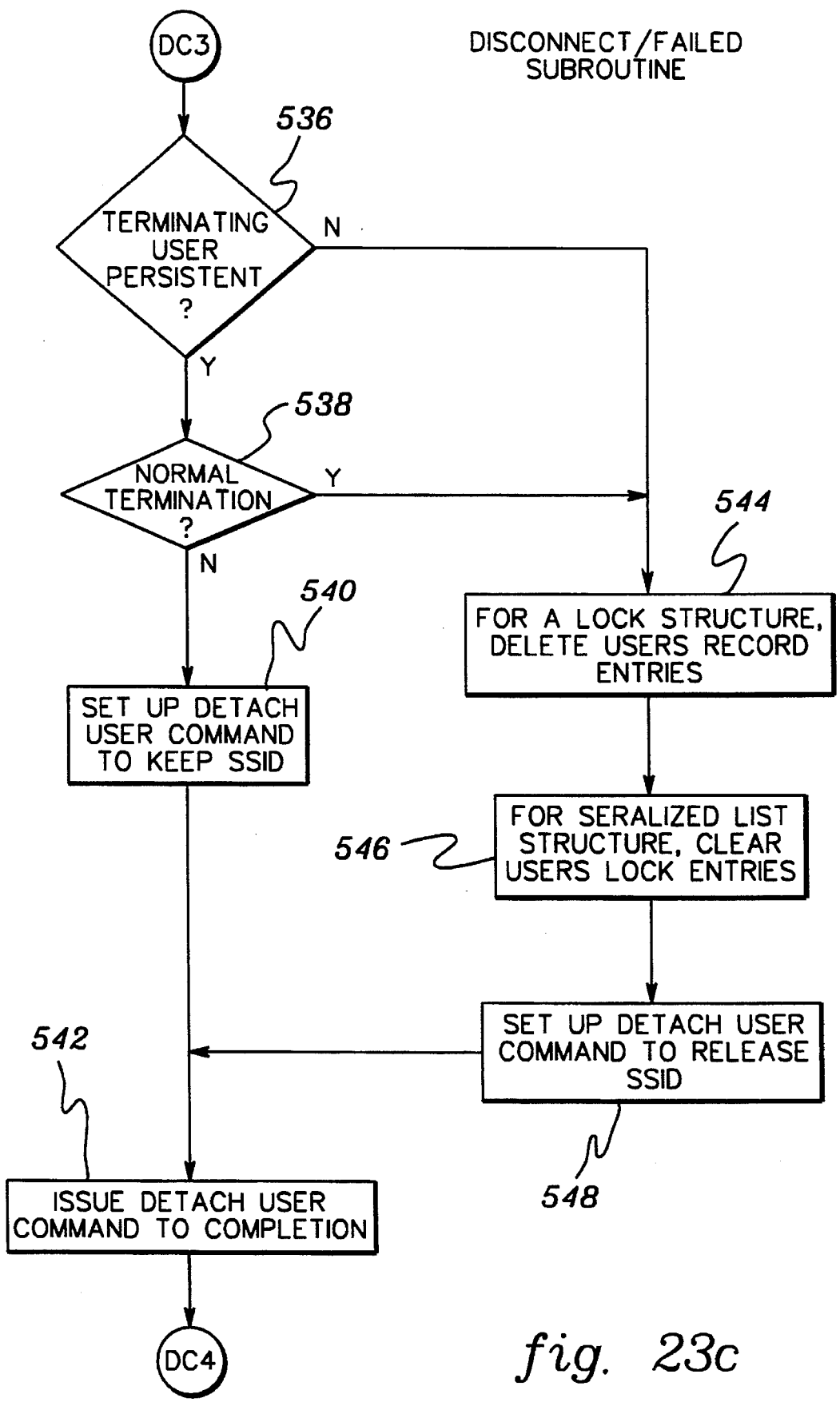

With reference to FIGS. 23–23c, the logic associated with the IXLDISC service is described. Initially, a determination is made as to whether the structure user is a lock user and whether the user owns locks, INQUIRY 480 "LOCK STRUCTURE USER AND OWNS ANY LOCKS." Should the user be a lock structure user and the lock structure user owns locks, abnormal disconnection/termination is indicated, STEP 482 "INDICATE ABNORMAL DISCONNECT/TERMINATION." After such indication or if it is not a lock structure user that owns locks, a disconnect failed subroutine is invoked, STEP 484 "INVOKE DISCONNECT FAILED SUBROUTINE," as described in detail below.

During the disconnect/failed subroutine, the active policy is read from the function data set and a lock (using, for example, the procedure described in co-pending U.S. patent application Ser. No. 07/548,516 for "Shared Data Access Serialization Method and Apparatus" by Insalaco et al. (Attorney Docket No. PO9-88-007), filed on Jul. 2, 1990, which is incorporated herein by reference in its entirety), is placed in the active policy, STEP 486 "READ AND LOCK THE ACTIVE POLICY (AP) FROM FUNCTION DATA SET." The structure users affected by the disconnect/failed call are then selected, STEP 488 "SELECT STRUCTURE USERS AFFECTED BY DISCONNECT/FAILED CALL." Further, the first affected user is selected, STEP 490 "SELECT FIRST AFFECTED USER."

If all of the affected users have not been processed, INQUIRY 492 "ALL AFFECTED USERS PROCESSED?", then the active policy image in virtual storage is updated to reflect the user record as terminating, STEP 494 "UPDATE AP IMAGE IN STORAGE USER RECORD TERMINATING." Thereafter, the next affected user is selected, STEP 496 "SELECT NEXT AFFECTED USER" and processing passes to INQUIRY 492 "ALL AFFECTED USERS PROCESSED?"

When all of the affected users have been processed, the first affected user is selected, STEP 498 "SELECT FIRST AFFECTED USER." If all of the affected users have not been processed, INQUIRY 500 "ALL AFFECTED USERS PROCESSED," then a determination is made as to whether there are any active users of the structure, INQUIRY 502 "ANY ACTIVE USERS OF STRUCTURE?" Should there be no active users of the structure, and the terminating user is persistent, INQUIRY 504, and termination is not normal, INQUIRY 506, the user record is marked in the image copy of the active policy as failed-persistent, STEP 508 "MARK USER FAILED-PERSISTENT IN AP IMAGE."

Should the terminating user not be persistent, INQUIRY 504, or there is normal termination, INQUIRY 506, then the assigned SSID in the active policy image is freed, STEP 510 "FREE ASSIGNED SSID IN AP IMAGE." (As used herein, SSID refers to a subsystem ID, which is either an LCID for a cache structure or an UID for a list structure.)

Subsequent to marking the user as failed-persistent or after freeing the assigned SSID, a determination is made as to whether any failed-persistent users exist, INQUIRY 512 "ANY FAILED-PERSISTENT USERS EXIST?" If no failed-persistent users exist and if a structure is not persistent, INQUIRY 514 "IS STRUCTURE PERSISTENT?", an indication is made that deallocation is needed, STEP 516 "INDICATE DEALLOCATE NEEDED."

Once the deallocation indication is made or if any failed-persistent users exist, INQUIRY 512, or if the structure is persistent, INQUIRY 514, the next affected user is selected, STEP 518 "SELECT NEXT AFFECTED USER." Thereafter, flow passes to INQUIRY 500 "ALL AFFECTED USERS PROCESSED?" and processing continues, as described herein.

If all of the affected users are processed, INQUIRY 500, then the information located in the virtual storage image of the active policy is written to the function data set and the function data set is unlocked, STEP 520 "WRITE AND UNLOCK AP TO FUNCTION DATA SET."

Thereafter, the first affected user is selected, STEP 522 "SELECT FIRST AFFECTED USER," and if all of the affected users have not been processed, INQUIRY 524 "ALL AFFECTED USERS PROCESSED?", a check is made to determine if the disconnect/failed subroutine was invoked due to a system failure, INQUIRY 526 "SYSTEM FAILURE INVOKED?" If not invoked by a system failure, then the vector, described above, is deleted, STEP 528 "DELETE VECTOR."

Subsequent to deleting the vector, or if invoked by a system failure, a determination is made as to whether there exists any active users of the structure, INQUIRY 530 "ANY ACTIVE USERS OF STRUCTURE?" Should there be active users of the structure, the next affected user is selected, STEP 532 "SELECT NEXT AFFECTED USER" and flow passes to INQUIRY 524 "ALL AFFECTED USERS PROCESSED?"

If there are no active users of the structure, owned lock table entries of a lock structure are released, STEP 534 "FOR A LOCK STRUCTURE, RELEASE OWNED LOCK TABLE ENTRIES." Thereafter, if a persistent user is being terminated, INQUIRY 536, and there is an abnormal termination, INQUIRY 538, a detach user command is set up in order to keep the SSID, STEP 540 "SET UP DETACH USER COMMAND TO KEEP SSID." Subsequent to setting up the detach user command, it is issued to completion, STEP 542 "ISSUE DETACH USER COMMAND TO COMPLETION."

After completing the detach user command, the next affected user is selected, STEP 532 "SELECT NEXT AFFECTED USER," and flow passes to INQUIRY 524 "ALL AFFECTED USERS PROCESSED?"

Returning to INQUIRY 536 "TERMINATING USER PERSISTENT?", if a persistent user is not being terminated, or if a persistent user is terminating normally, the user record entries for a lock structure are deleted, STEP 544, and user lock entries for a serialized list structure are cleared, STEP 546. Thereafter, the detach user command is set up to release the SSID, STEP 548 and the detach user command is processed to completion, STEP 542. Subsequent to processing the detach user command, flow passes to STEP 532 and processing continues, as described above.

Returning to INQUIRY 524 "ALL AFFECTED USERS PROCESSED?", if all of the affected users are processed, then a check is made to see if deallocation is needed, INQUIRY 550 "IS DEALLOC NEEDED?" If it is needed, the deallocate command is processed to completion, STEP 552 "ISSUE DEALLOCATE COMMAND TO COMPLETION." After issuing the deallocate command or if no deallocation is needed, processing of the disconnect/failed subroutine is complete.

Returning to INQUIRY 502 "ANY ACTIVE USERS OF STRUCTURE?", should there be any active users, notification of disconnect or failure is initiated, STEP 554 "INITIATE NOTIFICATION OF DISCONNECT OR FAILURE." In one embodiment, the logic associated with notification of a disconnect or failure is described in detail with reference to FIG. 24.

Figure 24:
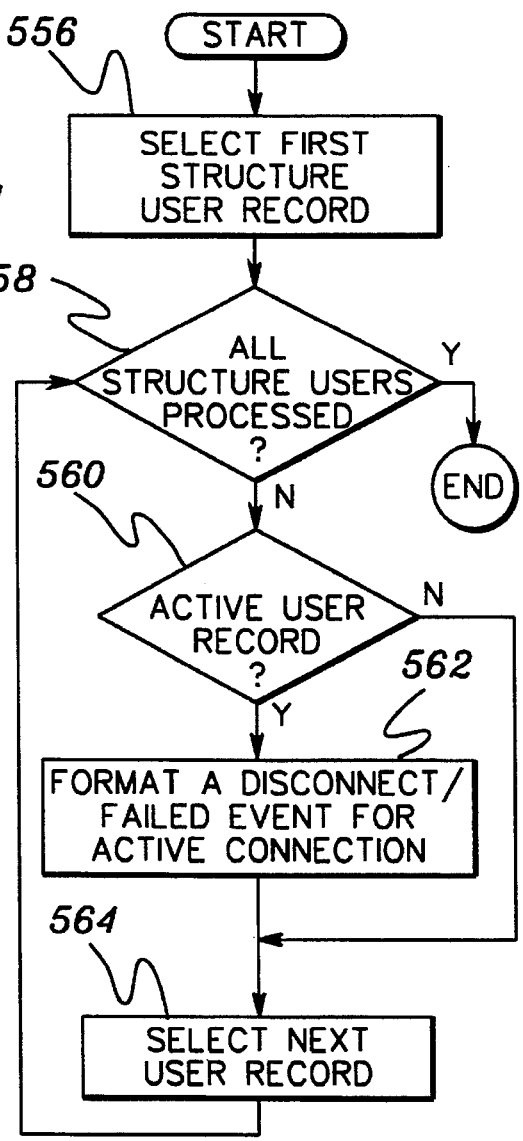
FIG. 24 illustrates one example of the logic associated with a notification for disconnect/failed routine, in accordance with the present invention.

Referring to FIG. 24, the first structure user record is selected, STEP 556 "SELECT FIRST STRUCTURE USER RECORD" and if all of the structure users have been processed, INQUIRY 558 "ALL STRUCTURE USERS PROCESSED?", processing of the notification logic is complete. Otherwise, if all of the structure users are not processed, and the selected structure user is an active user record, INQUIRY 560 "ACTIVE USER RECORD?", a disconnect/failed event for active connection is formatted, STEP 562. Subsequent to formatting the disconnect/failed event or if the selected structure user is not an active user record, the next user record is selected, STEP 564 "SELECT NEXT USER RECORD" and flow passes to INQUIRY 558 "ALL STRUCTURE USERS PROCESSED?"

Returning to FIG. 23a and, in particular, STEP 518 "SELECT NEXT AFFECTED USER," the next affected user is selected, STEP 518 "SELECT NEXT AFFECTED USER" and processing passes to INQUIRY 500 "ALL AFFECTED USERS PROCESSED?" Processing continues as described above.

When a connection is terminated normally or abnormally, either via disconnect or a failure, a set of resources are cleaned up by XES on behalf of the connector. The set of resources cleaned up is different based on the type of failure (abnormal or normal), the connection and structure disposition, and the type of structure.

For all types of connections, the connection is placed in an available state on normal connection termination which makes the connection identifier available for reuse. The connection is placed in a failed-persistent state on abnormal termination of a connection having specified a connect disposition of KEEP, which does not permit the connection identifier to be reused.

The following summarizes the resources cleaned up for a connection termination by structure type:

Cache Structure

For normal termination or abnormal termination regardless of the connection disposition the following resources are cleaned up:
Local cache vector
Cast-out locks held by the terminating connection
Registered interest in named directory entries List Structure For a list structure, the list notification vector is released if allocated, regardless of the type of termination or the connection disposition.

Lock Structure

For normal termination of a connection to a lock structure with no locks held, the record list is released, if allocated. Management responsibilities of resources managed by the terminated connection are assigned to a surviving connected XES user.

For abnormal termination of a connection with a connection disposition of delete, the lock entries associated with the failed connection are cleared. Management responsibilities of resources managed by the terminated connection are assigned to a surviving connected XES user. The record list is released, if allocated.

For abnormal termination of a connection with a connection disposition of keep, the lock entries associated with the failed connection are cleared. Management responsibilities of resources managed by the terminated connection are assigned to a surviving connected XES user. The record list remains intact for recovery use.

Serialized List Structure

For all terminations, normal or abnormal, the list notification vector is released, if allocated.

For normal termination of a connection to a serialized list structure or abnormal termination of a serialized list user, which is not persistent, the lock entries containing the terminated user's connection identifier are cleared. Requests pending because of a lock held by the failed connection are redriven. The redriven requests race in order to obtain the lock associated with the request, and a new list of waiting requests is built for the requests that lose the race.

For abnormal termination of a serialized list user which is persistent, lock table entries owned by the terminating user are not cleared. Requests for a lock owned by a failed-persistent user are rejected.

One embodiment of the syntax associated with IXLDISC is described in detail below. The IXLDISC service routine is given control from the IXLDISC macro to disconnect a user from an XES structure.

The IXLDISC service only supports disconnection from a single structure per invocation. If a user wishes to disconnect multiple connections, it issues the IXLDISC macro once for each connection.

```
IXLDISC  CONTOKEN=xcontoken
         DISCDATA=xdiscdata|ALL_ZEROES
         [,REASON={NORMAL|FAILURE}]
         [,RETCODE=xretcode]
         [,RSNCODE=xrsncode]
```

Where:
CONTOKEN(xcontoken) is the name (RS-type) (or address in register (2)-(12) ASM only) of a required 16 character input field that specifies the connect token returned to the invoking user in the answer area when it requested the IXLCONN service.

DISCDATA is the name (RS-type), or address in register (2)-(12), of an optional 8 character input that specifies connector data that will be provided to other connection's event exits, and can be used as the invoker wishes. DEFAULT: ALL_ZEROES

[REASON({NORMAL|FAILURE})] is an optional keyword input which identifies the reason for disconnecting from a structure. The disconnect reason is presented to all surviving connected XES users in the event exit parameter list. The reason in conjunction with the connection disposition affects the state of the connection upon completion of the disconnect. DEFAULT: NORMAL NORMAL Normal termination. The connection disposition specified on IXLCONN does not apply. A disconnect specifying normal termination is considered a normal connection termination; therefore, the connection will not be persistent, even if persistence is specified to the IXLCONN service. The connection disposition attribute is applicable only in abnormal terminations such as a disconnect specifying failure, system failure, task termination, and address space termination.

There is one exception which causes the connection disposition to be applicable on a normal disconnect. The exception occurs when a connection disconnects for a lock structure while holding resources shared or exclusive. If the connection disposition was KEEP, the connection will be put into a failed-persistent state. If the lock structure contains a record substructure, then record list entries will remain associated with the failed connection until the failed-persistent connection is released.

If a connection to a lock structure, which owns locking resources, disconnects with REASON=NORMAL, then the disconnect requests will be treated as if the user had specified REASON=FAILURE.

FAILURE Termination due to a failure. The connection disposition specified on IXLCONN does apply. The connection will be placed in a failed-persistent state if the connection disposition is KEEP.

[RETCODE(xretcode)] is the name (RS-type) of an optional fullword output variable (or register (2)-(12) ASM only) into which the return code is to be copied from GPR 15.

[RSNCODE(xrsncode)] is the name (RS-type) of an optional fullword output variable (or register (2)-(12) ASM only) into which the reason code is to be copied from GPR 0.

When a connected XES user issues an IXLDISC request, the IXLDISC service is considered complete when all connections to the structure have acknowledged the disconnect request. Surviving connectors acknowledge a disconnect by responding to an event reported to their event exit, as described in detail below.

In addition to IXLDISC, an end of task service is available for initiating a disconnect/failed event. One embodiment of an end of task service is described in detail with reference to FIG. 26.

Figure 26:
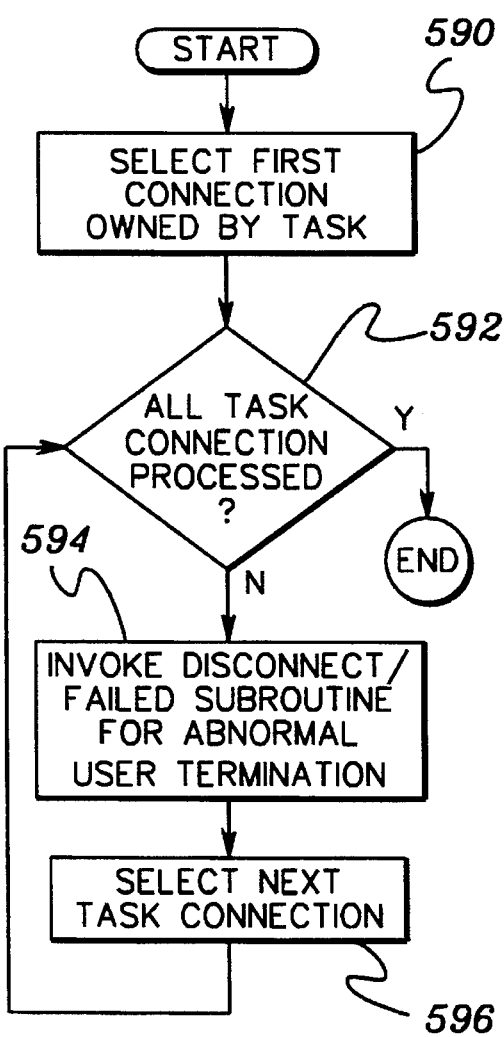
FIG. 26 depicts one embodiment of the logic associated with an end-of-task routine, in accordance with the principles of the present invention.

Referring to FIG. 26, the first connection owned by the ending task is selected, STEP 590 "SELECT THE FIRST CONNECTION OWNED BY TASK." If all of the task connections are processed, INQUIRY 592 "ALL TASK CONNECTIONS PROCESSED?", processing of the end of task service is complete. Otherwise, if there are task connections to be processed, the disconnect/failed subroutine for abnormal user termination is invoked, as described above with reference to FIGS. 23–23c, STEP 594. Subsequently, the next task connection is selected, STEP 596 "SELECT NEXT TASK CONNECTION" and flow returns to INQUIRY 592 "ALL TASK CONNECTIONS PROCESSED?"

Figure 27:
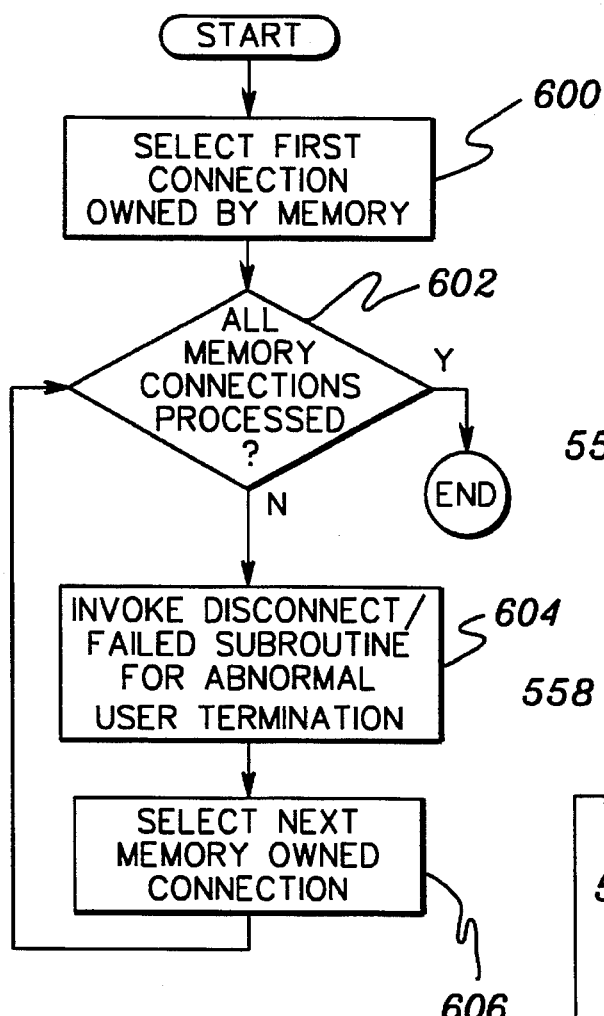
FIG. 27 depicts one embodiment of the logic associated with an end-of-memory routine, in accordance with the principles of the present invention.

In addition to the above, a disconnect/failed event may be initiated by an end of memory service, one example of which is described below with reference to FIG. 27.

The first connection owned by the memory is selected, STEP 600 "SELECT THE FIRST CONNECTION OWNED BY MEMORY," and if all the memory connections are processed, INQUIRY 602 "ALL MEMORY CONNECTIONS PROCESSED?", processing of the end of memory service is complete.

Should there be memory connections to be processed, INQUIRY 602, the disconnect/failed subroutine for abnormal user termination, described above with reference to FIGS. 23–23c is invoked, STEP 604. Thereafter, the next memory owned connection is selected, STEP 606, and processing flows to INQUIRY 602 "ALL MEMORY CONNECTIONS PROCESSED?"

In addition to the IXLDISC, end of task and end of memory services described above, a disconnect or failed event may be initiated by a coupling facility cleanup service. As described above with reference to FIG. 15, when a system monitor has detected failure of a system, the coupling facility cleanup service is given control. One embodiment of the logic associated with a cleanup service is described in detail with reference to FIG. 25.

Figure 25:
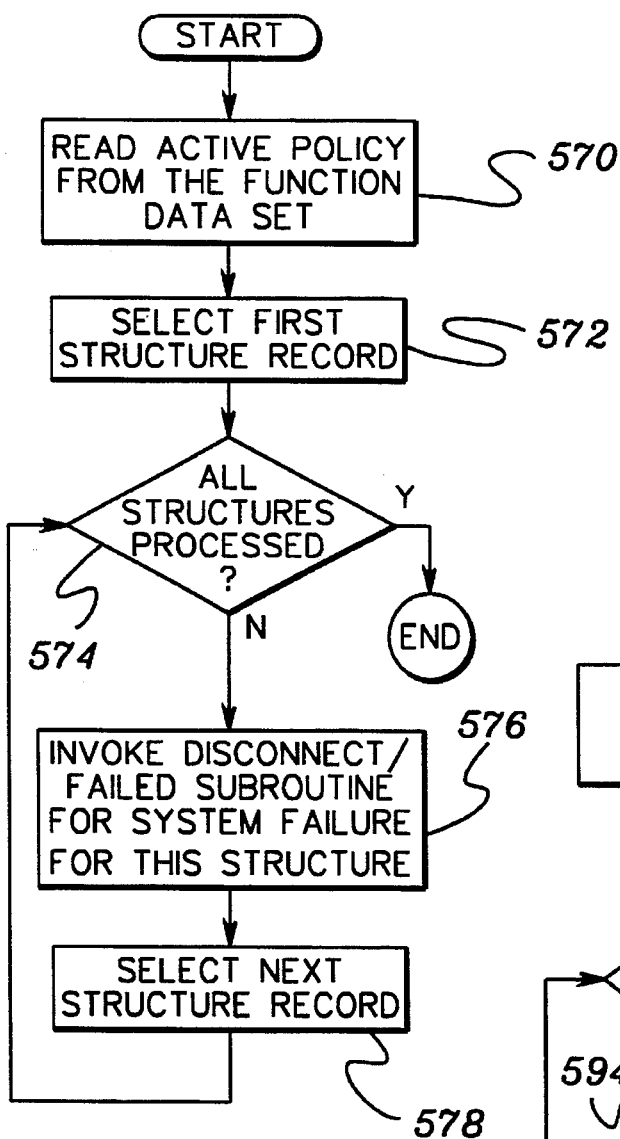
FIG. 25 depicts one embodiment of the logic associated with a coupling facility cleanup routine, in accordance with the principles of the present invention.

Referring to FIG. 25, the active policy is read from the function data set, STEP 570 "READ ACTIVE POLICY (AP) FROM FUNCTION DATA SET." From the active policy, the first structure record is selected, STEP 572 "SELECT FIRST STRUCTURE RECORD." When all of the structures are processed, INQUIRY 574 "ALL STRUCTURES PROCESSED?", processing of the cleanup service is complete.

However, if there are structures to be processed, the disconnect/failed subroutine for system failure, described above with reference to FIGS. 23–23c is invoked for this structure, STEP 576. Thereafter, the next structure record is selected, STEP 578 "SELECT NEXT STRUCTURE RECORD" and flow passes to INQUIRY 574 "ALL STRUCTURES PROCESSED."

Described above are a number of events. A connector's event exit receives control whenever an event that affects the availability and use of the structure associated with the connector occurs. The event exit receives control with, for instance, an event exit parameter list (referred to as IXLY-EEPL) that describes the event being reported. Upon return from the event exit, the event exit parameter list is no longer accessible to the connected XES user.

A connected XES user will receive events in the event exit in the sequence in which the events were reported. For example, a related connector will always receive an event indicating that a connection is active (new connection event for a given connection), before receiving a disconnected or failed connection event for that connection. In most cases, each connection to the structure will receive the events in the same sequence.

Several events reported to the event exit require the connected XES user to cooperate in the processing associated with the event. This may be accomplished by setting a return code in the event exit parameter list or by invoking a service, such as IXLEERSP.

When a connected XES user's event exit is notified of an event which requires an event exit response, the connected XES user that receives the event is expected to initiate processing as required. If there is no processing to do, or the processing may be done synchronously, in the event exit, then the connected XES user may respond to XES by setting a return code in the event exit parameter list upon completion of the processing. If the processing for the event will be done asynchronously, then the connected XES user must set a special return code in the event exit parameter list which indicates that the connected XES user is not providing a response in the exit parameter list. The connected XES user will invoke the IXLEERSP service later to give XES its response to the event. There is no required sequence between setting the special return code in the exit parameter list and issuing IXLEERSP.

Once a response is received from all connections to the structure about an event, XES will continue its processing for the event. Described below are the expected XES and connected XES user processing for each of the events that require a response.

The disconnected or failed connections event requires an event exit response from the connected XES user. An event exit response can optionally be provided for the existing connection event, when the subject of the event is a failed connection.

The disconnected or failed connection event is reported to all connections to the structure when a peer connection disconnects or abnormally terminates. The connection identified remains assigned to the disconnect/failed connection until all peer connections provide an event exit response. For a failed-persistent connection the type of response indicates whether the failed persistent connection can be released or not. If the connection was to a lock structure then there may still be a record list allocated for the failed connection.

The event exit parameter list contains flags that indicate how the user terminated. This information will indicate to the connected XES user how much recovery processing must be done. The event exit parameter list (EEPL) indicates whether the connection disconnected or terminated abnormally. If the failed/disconnected connection was a locking user, the EEPL indicates whether the connection disconnected with locks held. The EEPL also indicates whether the terminating connection is persistent or not.

The connected XES user is expected to clean up all knowledge of the failed/disconnected connection, perform necessary recovery processing, and then respond to XES indicating that XES's recovery can proceed.

There are two types of responses the connected XES user can give: continue cleanup for the failed/disconnected connection or continue cleanup for the failed/disconnected connection and release the failed-persistent connection. The latter option only makes sense for connections with a disposition of KEEP given that a connection cannot get into the failed-persistent state unless a disposition of KEEP was specified to connect.

If the failed connection was associated with a lock structure, then the connected XES user is expected to do recovery processing for all locks that were held by the failed connection before providing an event exit response to the disconnect or failed connection event. This sequence is essential since the locks will be released by XES when a response is received from all surviving connected XES users.

The record substructure can be used to keep a record of all locks held by a particular connected XES user and can be read by any connection to the structure. If the record substructure is used for this purpose, then recording must be requested on the IXLCONN service and the connection persistence attribute must be KEEP.

If the failed connection was persistent and/or a record substructure was allocated, one or all surviving connected XES users may request that the record list and failed-persistent connection be released through the IXLEERSP service, or setting a return code in the EEPL when notified of the disconnect or failed connection event.

If the failed connection was associated with a serialized list structure, then the connected XES user is expected to do recovery processing for all locks that were held by the failed connection before providing an event exit response to the disconnect or failed connection event. This sequence is essential since the locks for a user which is not persistent will be released by XES when a response is received from all surviving connected XES users.

Processing by XES when all responses are received includes:

Connection to a Serialized List

For connections to a serialized list, lock entries are cleared if owned by the failed connection if the connection disposition was not KEEP or the termination was initiated with REASON=NORMAL.

Requests pending because of a lock held by the failed connection are redriven. The redriven requests race in order to obtain the lock associated with the request, and a new list of waiting requests is built for the requests that lose the race. Requests for locks held by a failed-persistent user will be rejected.

Connection to a Lock Structure

Upon receiving an event exit response from all connections to the structure for the disconnected or failed connection event, XES will initiate recovery processing for the connected XES user failure. XES will perform the following processing:

management responsibilities of resources managed by the connected XES user that has failed are assigned by XES to surviving connected XES users;

resource requests managed by surviving connected XES users on behalf of the failed connection are discarded;

if the terminating connection's disposition is DELETE or the event exit response was "release the persistent connection" then, the record list, if any, associated with the connected XES user that has failed, is reclaimed by XES. If the terminating connection's disposition is KEEP and the event exit response did not indicate "release the persistent connection", then the record list is unchanged and can continue to be accessed by any surviving connected XES user.

When a new connection learns that there are failed-persistent connections to the structure, the new connection has the option of verifying that all recovery processing for the failed connection is complete and releasing the failed-persistent connection by either setting a return code in the event exit parameter list or invoking the IXLEERSP service. XES will release the failed-persistent connection when any connection provides this response. If the failed-persistent connection is connected to a lock structure with a record substructure, the record list will be released. If the failed-persistent connection is connected to a serialized list, locks owned by the failed-persistent connection will be cleared.

Figure 28A:
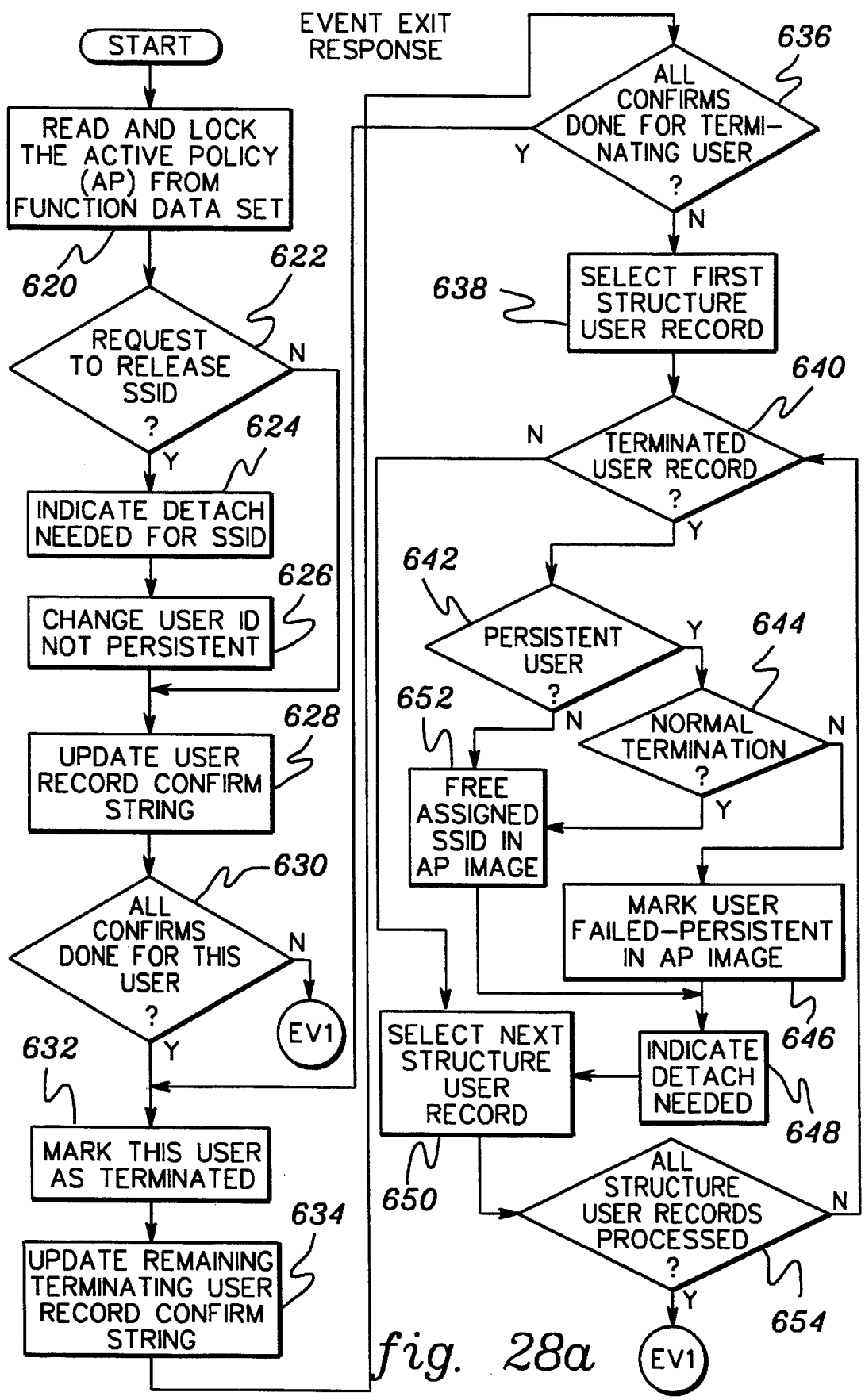
FIGS. 28a–28c depict one embodiment of the logic associated with an event exit response service, in accordance with the principles of the present invention.
Figure 28B:
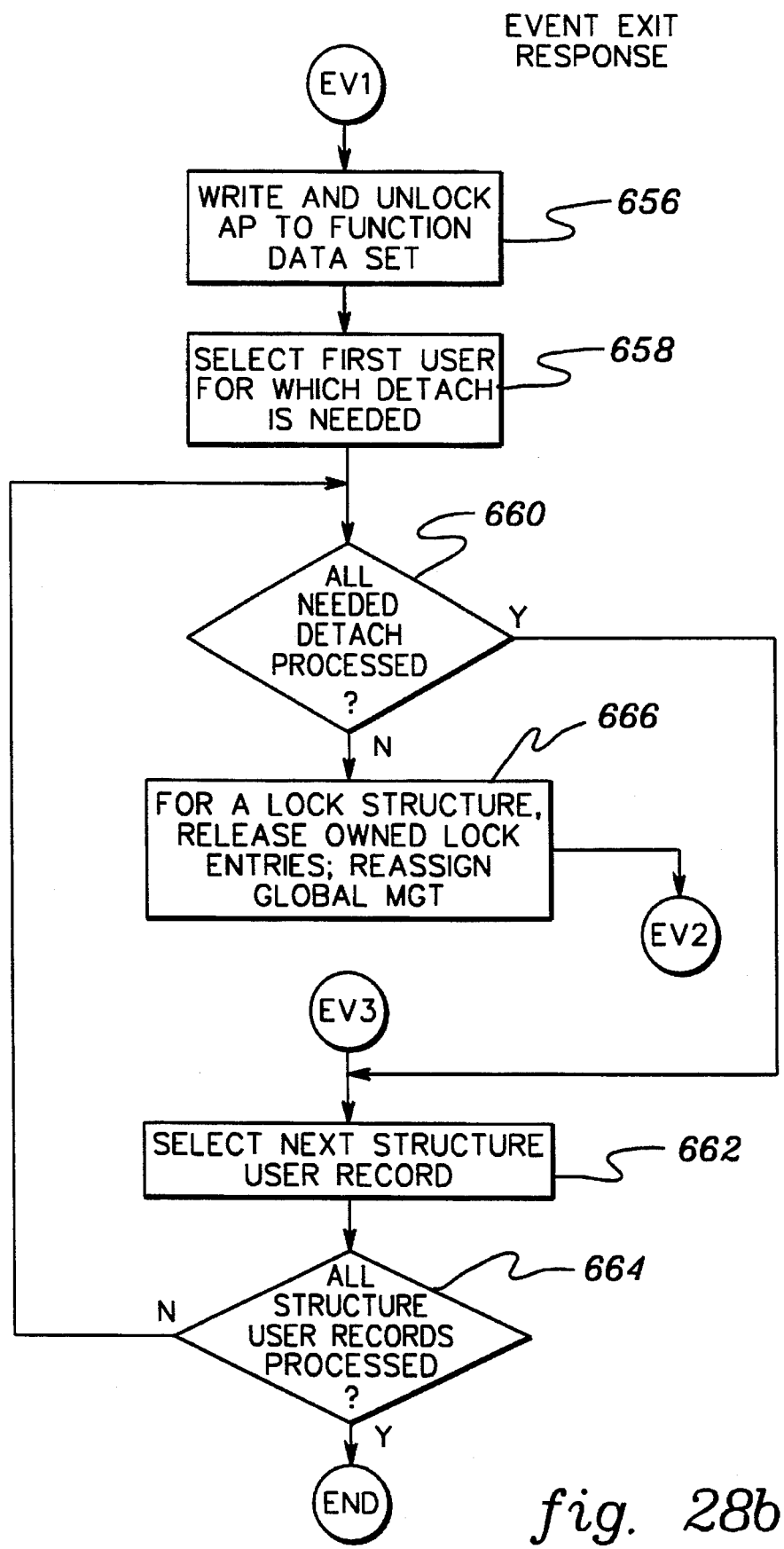
Figure 28C:
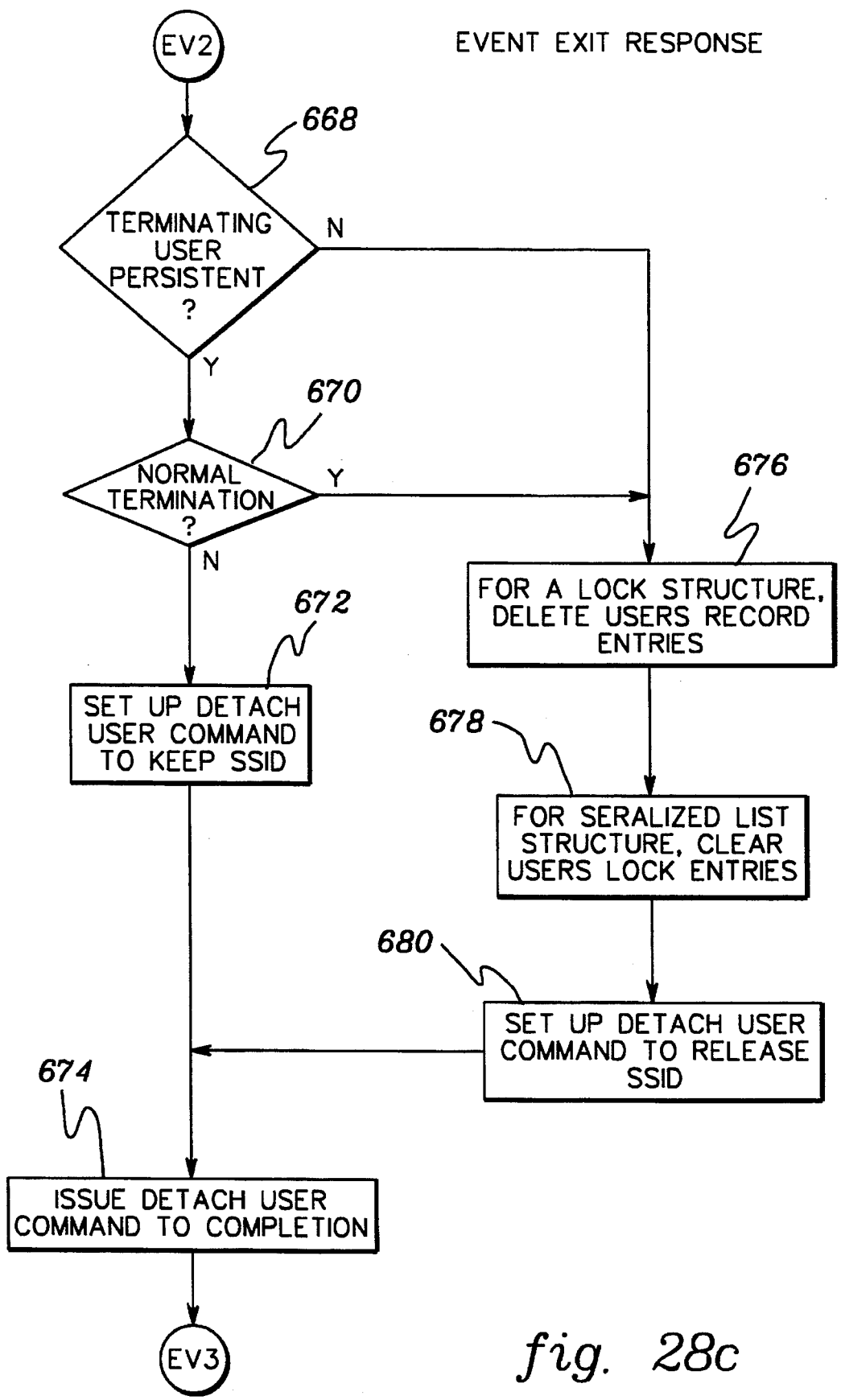

One embodiment of the logic associated with an event exit response, such as the IXLEERSP service, is described in detail with reference to FIGS. 28a–28c. Referring to FIG. 28a, the active policy is read and the function data set is locked, STEP 620 "READ AND LOCK THE ACTIVE POLICY (AP) FROM THE FUNCTION DATA SET." Thereafter, a determination is made as to whether there is a request to release the LCID for a cache or UID for a list, INQUIRY 622 "REQUEST TO RELEASE SSID?" (SSID is used herein as a subsystem ID, which is either an LCID or UID.) In particular, RELEASECONN on IXLEERSP will indicate this. Should there be such a request, detach is indicated for the SSID, STEP 624 "INDICATE DETACH NEEDED FOR SSID."

After the indication of detach is made, the user identification is changed to not persistent, STEP 626 "CHANGE USER ID NOT PERSISTENT." Subsequent to changing the user ID or if there is no request to release the SSID, the user record confirm string in the active policy is updated, STEP 628 "UPDATE USER RECORD CONFIRM STRING."

Thereafter, if all the confirms are done for this user, INQUIRY 630 "ALL CONFIRMS DONE FOR THIS USER?", the user is marked as terminated in the user record of the active policy, STEP 632, the remaining terminating user record confirm string is updated, STEP 634, and once again, a determination is made as to whether all the confirms are done for the terminating user, INQUIRY 636 "ALL CONFIRMS DONE FOR TERMINATING USER?"

If all the confirms are done, flow pass to STEP 632 "MARK THIS USER AS TERMINATED." However, if all the confirms are not done, the first structure user record is selected, STEP 638 "SELECT FIRST STRUCTURE USER RECORD." Should the user record be terminated, INQUIRY 640 "TERMINATED USER RECORD?", the user be persistent, INQUIRY 642, and abnormal termination occur, INQUIRY 644, the user is marked as failed-persistent in the active policy image in virtual storage, STEP 646 "MARK USER FAILED-PERSISTENT IN AP IMAGE."

Subsequent to marking the user, an indication is made in the user policy that detach is needed, STEP 648 "INDICATE DETACH NEEDED." Thereafter, or if the user record is not terminated, the next structure user record is selected, STEP 650 "SELECT NEXT STRUCTURE USER RECORD." Similarly, if the user is not persistent or termination is normal, the assigned SSID in the active policy image in virtual storage is freed, STEP 652 "FREE ASSIGNED SSID IN AP IMAGE," and flow passes to STEP 648.

After selecting the next structure user record, STEP 650, if all of the structure user records have not been processed, INQUIRY 654, flow passes to INQUIRY 640 and processing continues, as described above. However, when all of the structure user records have been processed, the active policy is written to the function data set, which is unlocked, STEP 656 "WRITE AND UNLOCK AP TO FUNCTION DATA SET."

Subsequently, the first user for which detach is needed is selected, STEP 658, and a determination is made as to whether all of the needed detached records are processed, INQUIRY 660 "ALL NEEDED DETACH PROCESSED?" If all of the detached records are processed, the next structure user record is selected, STEP 662 "SELECT NEXT STRUCTURE USER RECORD" and if all of the structure user records are not processed, INQUIRY 664 "ALL STRUCTURE USER RECORDS PROCESSED?", flow returns to INQUIRY 660 "ALL NEEDED DETACH PROCESSED?"

However, if all of the user structure records are processed, INQUIRY 664, processing of the event exit response is complete.

Returning to INQUIRY 660, if all of the needed detached records are not processed, the owned lock entries for a lock structure are released and global management is reassigned, STEP 666. Thereafter, a determination is made as to whether the termination is of a user persistent, INQUIRY 668 "TERMINATING USER PERSISTENT?" If it is a persistent user, and it is abnormal completion, INQUIRY 670 "NORMAL TERMINATION?" the detach user command is set up to keep the SSID, STEP 672 "SET UP DETACH USER COMMAND TO KEEP SSID." Further, the detach user command is processed to completion, STEP 674 "ISSUE DETACH USER COMMAND TO COMPLETION" and flow returns to STEP 662 "SELECT NEXT STRUCTURE USER RECORD."

On the other hand, if the termination is not of a persistent user, INQUIRY 668 or there is normal termination, INQUIRY 670, the user's record entries are deleted for a lock structure, STEP 676, user's lock entries are cleared for a list structure, STEP 678, and the detach user command is set up to release the SSID, STEP 680. Thereafter, flow passes to STEP 674 "ISSUE DETACH USER COMMAND TO COMPLETION" and processing continues, as described above.

Returning to INQUIRY 630 "ALL CONFIRMS DONE FOR THIS USER?", if all of the confirms are not done, flow passes to STEP 656 "WRITE AND UNLOCK AP TO FUNCTION DATA SET", as described above.

One embodiment of the syntax associated with an event exit interface, and in particular, IXLEERSP, is described in detail below.

```
IXLEERSP  EVENT=DISCFAILCONN
         ,SUBJCONTOKEN=xsubjcontoken
         ,EVENTSEQ=xeventseq#
         ,RELEASECONN={NO|YES}
     ,EVENT=EXISTINGCONN
         ,SUBJCONTOKEN=xsubjcontoken
     CONTOKEN=xcontoken
     [,RETCODE=xretcode]
     [,RSNCODE=xrsncode]
```

Where:
EVENT({DISCFAILCONN|EXISTINGCONN}) is a required keyword input which identifies the event the connector's response is for:
  EVENT (DISCFAILCONN)
    Disconnected or Failed Connection event (EEPLDISFAILCONNECTION)
    SUBJCONTOKEN(xsubjcontoken) is the name (RS-type) (or address in register (2)-(12) ASM only) of a required 16 character input field that specifies the connect token the response is for. The connect token specified should be the value presented to this connection in the event exit parameter list (EEPL, field EEPLSUBJCONTOKEN).
    EVENTSEQ#(xeventseq#) is the name (RS-type) (or address in register (2)-(12) ASM only) of a required fullword input field that specifies the subject event sequence number. The event sequence number specified should be the value presented to this connection in the event exit parameter list (EEPL, field EEPLEVENTSEQ#)
    RELEASECONN({NO|YES}) is a required keyword input which indicates whether the connection should remain persistent or be released.
  NO specifies XES should continue processing for the failed connection. The connector issuing IXLEERSP has completed all processing for the failed connection. This persistence attribute of the connection is not affected by this response.

YES specifies XES should continue processing for the failed connection and indicates that this connection is no longer required to be persistent. The connector issuing IXLEERSP has completed all processing for the failed connection.

EVENT(EXISTINGCONN) Existing failed-persistent connection event (EEPLEXISTINGCONNECTION) This response indicates that a failed-persistent connection no longer needs to be persistent, i.e. can be released.

SUBJCONTOKEN(xsubjcontoken) is the name (RS-type) (or address in register (2)-(12) ASM only) of a required 16 character input field that specifies the connect token the response is for. The connect token specified should be the value presented to this connection in the event exit parameter list (EEPL, field EEPLSUBJCONTOKEN).

CONTOKEN(xcontoken) is the name (RS-type) (or address in register (2)-(12) ASM only) of a required 16 character field that specifies the connect token of the responding connection.

[RETCODE(xretcode)] is the name (RS-type) of an optional fullword output variable (or address in register (2)-(12) ASM only) into which the return code is to be copied from GPR 15.

[RSNCODE(xrsncode)] is the name (RS-type) of an optional fullword output variable (or address in register (2)-(12) ASM only) into which the reason code is to be copied from GPR 0.

Described above in detail are the mechanisms for managing structures and users of structures and for recording the status of users and structures in the coupling facility, where the data is also located. The combination of customer specified policy, state information recorded on a shared coupling data set, and status regarding structures and users of structures maintained at the coupling facility, determines the continued existence of structures at the coupling facility and status information regarding users of the structures. Processing which correctly records the status of structures and users of structures is invoked across the systems comprising the configuration of initiation and termination of users of the coupling facility resources.

In accordance with the principles of the present invention, structures which are allocated based on customer policy at a coupling facility may be deallocated or continue to exist when there are no longer active users. Status regarding users of a coupling facility structure may be discarded or maintained when the user terminates based on user option and normal or abnormal user termination. The continued existence of a structure may be determined by the presence of status regarding terminated users.

When a user connects to a structure, it is the responsibility of the user to verify that the attributes of the structure, as indicated on return from the connect service, are acceptable. If the attributes are not acceptable, then the connector may decide to disconnect or cause other connections to disconnect so that a new structure can be allocated with acceptable attributes.

The attribute of persistence applies to both structures and connections to structures. A persistent connection that has abnormally terminated is described as a failed-persistent connection. As described above, persistence for a structure means that the structure remains allocated even after all connections to the structure have terminated. The structure can be deleted by an IXLFORCE service, described below, only if there are no active or failed-persistent connections.

A failed-persistent connection can be cleaned up or recovered in the following manner:

(a) Reconnecting as a new instance of the failed-persistent connection by issuing IXLCONN with the connect name of the failed connection. A new connection version number will be returned to the connector. If the structure is a lock structure with a record substructure, then any record data associated with the failed connection remains accessible.

(b) A peer surviving connection releasing the failed-persistent connection by providing an event exit response. A surviving connection can release the failed-persistent connection when all related connections have provided an event exit response to the disconnected or failed connection event. A surviving connection can release the failed-persistent connection by either setting a return code in the event exit parameter list when it is notified of the failed connection event or invoking the IXLEERSP service for the DISFAILCONN event and requesting release on the connection.

(c) A new connection releasing the failed-persistent connection by providing an event exit response. A new connection is notified through its event exit about all existing connections. This set includes failed-persistent connections. After ensuring that the failed connection has been recovered, the new connector can release the failed-persistent connection by setting a return code in the service for the EXISTINGCONN event.

(d) Forcing the failed-persistent connection to be deleted by invoking the IXLFORCE service.

The IXLFORCE service forces deletion of one of the following coupling facility objects:

(a) A coupling facility structure. A persistent structure can be deleted, if there are no active or failed-persistent connections to the structure.

(b) A failed-persistent connection to a coupling facility structure. A failed-persistent connection can be deleted if all surviving connectors have recognized that this connection has terminated and have provided an event exit response by either invoking the IXLEERSP service or setting a return code in the event exit parameter list. An active connection cannot be forced, the connection can only be terminated by a normal disconnect. If the last connection to a non-persistent structure is deleted, the structure will also be deleted.

(c) All failed-persistent connections to a coupling facility structure. Each failed-persistent connection to a structure will be deleted as if a single IXLFORCE request for each connection has been requested. Each connection is subject to the rules and restrictions stated for single connection requests. Only those failed-persistent connections that are present when the IXLFORCE request is received will be processed. It is possible that during the window between the receipt and processing of the request, and the time that the requestor receives control back, that one or more new failed-persistent connections to the structure would come into existence.

A program can use IXCQUERY to determine the set of objects that are candidates for deletion. In the case of forcing all failed-persistent connections to a structure, a program can use IXCQUERY to determine the set of connections that could be forced. There is no inherent serialization to prevent the set of failed-persistent connectors from changing during the time between IXCQUERY and IXLFORCE processing.

If an installation is running in a production environment where data integrity is important, the installation can restart the application to cleanup or reconnect the failed-persistent connections, and use the applications's normal shut down procedure to cause the application to disconnect and stop using the structure. Once there are no longer any connections in the active or failed-persistent state, issuing IXLFORCE will force deletion of the structure.

One embodiment of the logic associated with a force deletion service, such as IXLFORCE, is described in detail with reference to FIG. 29.

Figure 29:
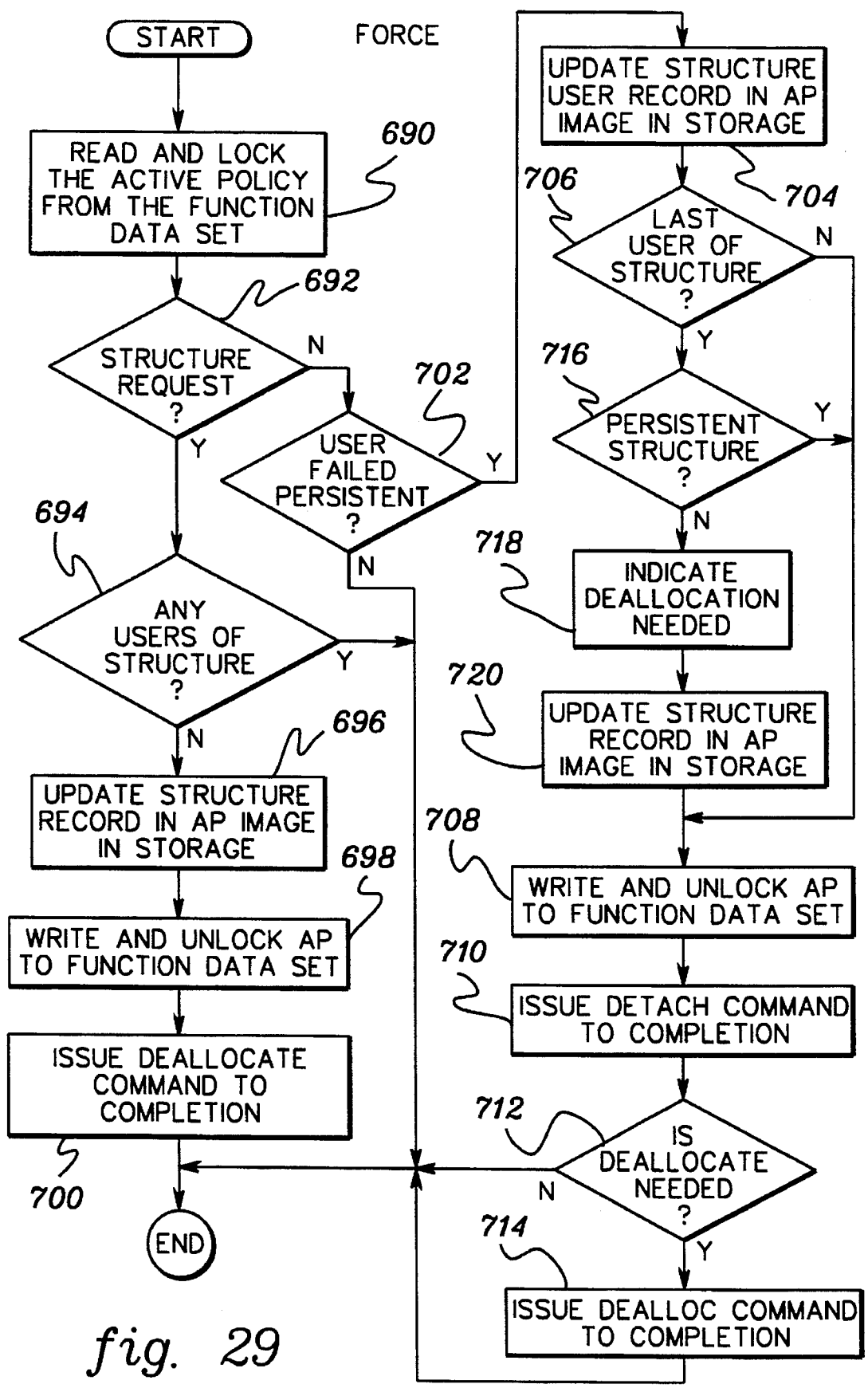
FIG. 29 depicts one embodiment of the logic associated with a force service, in accordance with the principles of the present invention.

Referring to FIG. 29, the active policy is read from the function data set and the function data set is locked, STEP 690 "READ AND LOCK THE ACTIVE POLICY (AP) FROM FUNCTION DATA SET." When a structure request is made, INQUIRY 692 "STRUCTURE REQUEST?", a determination is made as to whether any users of the structure exist, INQUIRY 694 "ANY USERS OF THE STRUCTURE?" Should there be users of the structure, the force command completes.

Otherwise, if there are no users of the structure, the structure record in the virtual storage image of the active policy is updated, STEP 696 "UPDATE STRUCTURE RECORD IN AP IMAGE IN STORAGE", and then, the active policy is written from storage to the function data set and the function data set is unlocked, STEP 698 "WRITE AND UNLOCK AP TO FUNCTION DATA SET." Thereafter, the deallocate command is issued to completion, STEP 700 "ISSUE DEALLOCATE COMMAND TO COMPLETION" and processing of the force service completes.

Returning to INQUIRY 692 "STRUCTURE REQUEST?", if there is no structure request, and the user is not failed-persistent, INQUIRY 702 "USER FAILED PERSISTENT?", processing ends.

If the user is failed-persistent, the structure user record in the active policy image in virtual storage is updated to indicate the user does not exist any more, STEP 704. When it is not the last user of a structure, INQUIRY 706 "LAST USER OF STRUCTURE?", the active policy image is written to the function data set and the function data set is unlocked, STEP 708 "WRITE AND UNLOCK AP TO FUNCTION DATA SET." Subsequently, the detach command is issued to completion, STEP 710 "ISSUE DETACH COMMAND TO COMPLETION."

After processing the detach command, processing of the force service ends, if no deallocation is needed, INQUIRY 712 "IS DEALLOC NEEDED?" If deallocation is needed, the deallocation command is processed to completion, STEP 714 "ISSUE DEALLOC COMMAND TO COMPLETION."

Returning to INQUIRY 706 "LAST USER OF STRUCTURE, when it is the last user of the structure and it is a persistent structure, INQUIRY 716 "PERSISTENT STRUCTURE", flow passes to STEP 708 "WRITE AND UNLOCK AP TO FUNCTION DATA SET." However, when it is the last user of a structure and the structure is not persistent, deallocation is indicated, STEP 718 "INDICATE DEALLOC NEEDED." Thereafter, the structure record in the active policy image is updated, STEP 720, and flow continues with STEP 708 "WRITE AND UNLOCK AP TO FUNCTION DATA SET", as described above.

One embodiment of the syntax associated with IXLFORCE is described in detail below.

```
IXLFORCE  REQUEST=STRUCTURE
         ,STRNAME=xstrname
         ,REQUEST=CONNECTION
         ,STRNAME=xstrname
```

-continued

```
         ,CONNAME=xconname
         ,REQUEST=ALLCONNS
         STRNAME=xstrname
         [,RETCODE=xretcode]
         [,RSNCODE=xrsncode]
```

Where:
REQUEST ({STRUCTURE|CONNECTION|ALLCONNS}) is a required keyword input which identifies whether a structure, failed persistent connection to a structure, all failed persistent connectors to a structure is to be deleted.

REQUEST(STRUCTURE) A structure is to be deleted. A structure can be deleted only when there are no active nor failed-persistent connections to the structure. IXCQUERY can be used to determine the state of connections to a structure. Note that forcing the deletion of the structure without understanding the usage of the structure may cause loss of data.
STRNAME(xstrname) is the name (RS-type) (or address in register (2)-(12) ASM only) of a required 16 character input that specifies the name of the structure to be deleted.

REQUEST(CONNECTION) A failed-persistent connection to a structure is to be deleted. If the last connection to a non-persistent structure is deleted, the structure will also be deleted. Note that forcing the deletion of a connection without understanding the usage of the structure may cause loss of data.
STRNAME(xstrname) is the name (RS-type) (or address in register (2)-(12) ASM only) of a required 16 character input that specifies the name of the connection to be deleted.
CONNAME(xconname) is the name (RS-type) (or address in register (2)-(12) ASM only) of a required 16 character input that specifies the CONNAME of the connection to be deleted. The connection is connected to the structure specified by STRNAME.

REQUEST(ALLCONNS) All failed-persistent connections to a structure are to be deleted. If the last connection to a non-persistent structure is deleted, the structure will also be deleted. Note that forcing the deletion of a connection without understanding the usage of the structure may cause loss of data.
STRNAME(xstrname) is the name (RS-type) (or address in register (2)-(12) ASM only) of a required 16 character input that specifies the name of the connection to be deleted.

[RETCODE(xretcode)] is the name (RS-type) of an optional fullword output variable (or address in register (2)-(12) ASM only) into which the return code is to be copied from GPR 15.

[RSNCODE(xrsncode)] is the name (RS-type) of an optional fullword output variable (or address in register (2)-(12) ASM only) into which the reason code is to be copied from GPR 0.

Described above in detail is a method and system for managing information in a data processing system. In particular, the data processing system includes a number of operating systems which share data, such as cache, list and lock structures, stored in a coupling facility. Advantageously, also stored within the coupling facility are controls associated with the structures and the status of users of the structures. The structure controls and user status may be modified by a single atomic operation, such as the DETACH command.

In addition, as described above, the connector or user of the data can conditionally specify whether the user status is to be maintained when the user terminates. The condition may be dependent on whether the user terminates normally or abnormally.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for managing status information in a data processing system comprising at least one operating system, said method comprising the steps of:

executing by said at least one operating system a user process, said at least one operating system being coupled to a coupling facility comprising processing means and a memory, said memory comprising a storage structure; and maintaining at said coupling facility status information indicating whether said user process is attached to said storage structure.

2. The method of claim 1, wherein said storage structure comprises one or more objects, each of said one or more objects having one or more controls for indicating an interest of said user process in said one or more objects.

3. The method of claim 2, further comprising the step of modifying said status information and said one or more controls in a single atomic operation.

4. The method of claim 3, wherein said single atomic operation comprises a detach command, said detach command updating said one or more controls, resetting a user control corresponding to said user process of said storage structure, and updating said status information of said user process.

5. The method of claim 4, wherein said storage structure is a cache structure and said one or more controls are located within said cache structure within said coupling facility and said user process is identified by a local cache identifier.

6. The method of claim 5, wherein said local cache identifier is stored within said coupling facility.

7. The method of claim 5, wherein said one or more controls are stored within a directory register located within said cache structure.

8. The method of claim 5, wherein said status information is stored within a local-cache control block located within said cache structure.

9. The method of claim 4, wherein said storage structure is a list structure and said one or more controls are located within said list structure within said coupling facility and said user is identified by a user identifier.

10. The method of claim 9, wherein said user identifier is stored within said coupling facility.

11. The method of claim 9, wherein said one or more controls are stored within a list monitor table located within said list structure.

12. The method of claim 9, wherein said status information is stored within a list-user control block located within said list structure.

13. The method of claim 2, further comprising the step of updating said one or more controls when said user process terminates due to an unexpected condition.

14. The method of claim 13, further comprising the step of maintaining allocation of said storage structure and said status information when said user process terminates due to an unexpected condition until one or more predefined conditions occur.

15. The method of claim 14, wherein one or more user processes in addition to the user process terminated due to an unexpected condition (abnormally terminated user process) is connected to said storage structure, and wherein said one or more predefined conditions include providing by each of said one or more user processes an event exit response.

16. The method of claim 15, further comprising the step of performing one of having said abnormally terminated user process reconnect to said storage structure, having a peer connection inform said data processing system that said storage structure and said abnormally terminated user process no longer need to be allocated, and unconditionally deleting said status information of said abnormally terminated user process.

17. The method of claim 14, wherein said one or more predefined conditions include said user process reconnecting to said storage structure.

18. The method of claim 14, wherein said one or more predefined conditions includes unconditionally deleting said status information.

19. The method of claim 2, further comprising the step of updating said one or more controls when said user process is terminated.

20. The method of claim 19, further comprising the step of determining whether said user process is terminated due to an expected condition or an unexpected condition.

21. The method of claim 19, further comprising specifying at a connection of said user process to said storage structure whether said status information is to be maintained when said termination is due to an unexpected condition.

22. The method of claim 19, wherein said termination is performed by a disconnect service, said disconnect service providing the ability to indicate a reason for said termination.

23. The method of claim 19, further comprising the step of updating said one or more controls when said user process terminates due to an expected condition.

24. The method of claim 1, wherein said maintaining step comprises the step of maintaining at said coupling facility status information for a plurality of user processes.

25. The method of claim 24, further comprising the step of notifying one or more of said plurality of user processes which is active when one of said plurality of user processes terminates.

26. The method of claim 25, further comprising the step of performing cleanup for said terminated user process subsequent to receiving a response from one or more of said plurality of user processes.

27. The method of claim 26, wherein said cleanup comprises modifying one or more controls corresponding to said terminated user process, resetting a user control corresponding to said terminated user processes, and updating said status information of said terminated user process.

28. The method of claim 25, further comprising the step of performing cleanup for said terminated user process subsequent to receiving a response from all of said plurality of user processes.

29. The method of claim 1, further comprising the step of terminating said storage structure when said user process is terminated.

30. The method of claim 29, further comprising the step of conditionally keeping said storage structure when said user process is terminated.

31. The method of claim 30, wherein said conditionally keeping step is dependent on whether said user process is terminated due to an expected condition or an unexpected condition.

32. The method of claim 1, further comprising the step of connecting said user process to said storage structure.

33. The method of claim 32, further comprising the step of disconnecting said user process from said storage structure.

34. The method of claim 1, further comprising the step of conditionally keeping said status information when said user process is terminated.

35. The method of claim 34, wherein said conditionally keeping step is dependent upon whether said user process terminates due to an expected condition or an unexpected condition.

36. The method of claim 1, further comprising the step of maintaining allocation of said storage structure when said user process is terminated.

37. The method of claim 1, wherein said data processing system comprises a plurality of operating systems and said data processing system further comprises the step of modifying one or more controls of said storage structure, resetting a user control corresponding to said user process regardless of the operating system said user process is active on, and updating said status information of said user process.

38. A system for managing status information in a data processing system comprising at least one operating system for executing a user process, said system comprising:

a coupling facility coupled to said at least one operating system, said coupling facility comprising a processing means and a memory, said memory comprising a storage structure; and means for maintaining at said coupling facility status information indicating whether said user process is attached to said storage structure.

39. The system of claim 38, wherein said storage structure comprises one or more objects, each of said one or more objects having one or more controls for indicating an interest of said user process in said one or more objects.

40. The system of claim 39, further comprising means for modifying said status information and said one or more controls in a single atomic operation.

41. The system of claim 40, wherein said single atomic operation comprises detach means, said detach means comprising means for updating said one or more controls, means for resetting a user control corresponding to said user process, and means for updating said status information of said user process.

42. The system of claim 41, wherein said storage structure is a cache structure and said one or more controls are located within said cache structure within said coupling facility and said user process is identified by a local cache identifier.

43. The system of claim 42, wherein said local cache identifier is stored within said coupling facility.

44. The system of claim 42, wherein said one or more controls are stored within a directory register located within said cache structure.

45. The system of claim 42, wherein said status information is stored within a local-cache control block located within said cache structure.

46. The system of claim 41, wherein said storage structure is a list structure and said one or more controls are located within said list structure within said coupling facility and said user is identified by a user identifier.

47. The system of claim 46, wherein said user identifier is stored within said coupling facility.

48. The system of claim 46, wherein said one or more controls are stored within a list monitor table located within said list structure.

49. The system of claim 46, wherein said status information is stored within a list-user control block located within said list structure.

50. The system of claim 39, further comprising means for updating said one or more controls when said user process terminates due to an unexpected condition.

51. The system of claim 50, further comprising means for maintaining allocation of said storage structure and said status information when said user process terminates due to an unexpected condition until one or more predefined conditions occur.

52. The system of claim 51, wherein said one or more predefined conditions include means for said user process to reconnect to said storage structure.

53. The system of claim 51, wherein said one or more predefined conditions include means for unconditionally deleting said status information.

54. The system of claim 51, wherein one or more user processes in addition to the user process terminated due to an unexpected condition (abnormally terminated) is connected to said storage structure, and wherein said one or more predefined conditions include means for providing by each of said one or more user processes an event exit response.

55. The system of claim 39, further comprising means for updating said one or more controls when said user process is terminated.

56. The system of claim 55, further comprising means for determining whether said user process is terminated due to an expected condition or an unexpected condition.

57. The system of claim 55, further comprising means for specifying at a connection of said user process to said storage structure whether said status information is to be maintained when said termination is due to an unexpected condition.

58. The system of claim 55, wherein said termination is performed by a disconnect means, said disconnect means providing the ability to indicate a reason for said termination.

59. The system of claim 55, further comprising means for updating said one or more controls when said user process terminates due to an expected condition.

60. The system of claim 38, wherein said maintaining means comprises means for maintaining at said coupling facility status information for a plurality of user processes.

61. The system of claim 60, further comprising means for notifying one or more of said plurality of user processes which is active when one of said plurality of user processes terminates.

62. The system of claim 61, further comprising cleanup means for cleaning up said terminated user process subsequent to receiving a response from one or more of said plurality of user processes.

63. The system of claim 62, further comprising cleanup means for cleaning up said terminated user process subsequent to receiving a response from all of said plurality of user processes.

64. The system of claim 62, wherein said cleanup means comprises means for modifying one or more controls corresponding to said terminated user process, means for resetting a user control corresponding to said terminated user process, and means for updating said status information of said terminated user process.

65. The system of claim 38, further comprising means for terminating said storage structure when said user process is terminated.

66. The system of claim 65, further comprising means for conditionally keeping said storage structure to be terminated when said user process is terminated.

67. The system of claim 66, wherein said conditionally keeping means comprises means for determining whether said user process is terminated due to an expected condition or an unexpected condition.

68. The system of claim 38, further comprising connect means for connecting said user process to said storage structure.

69. The system of claim 68, further comprising disconnecting means for disconnecting said user process from said storage structure.

70. The system of claim 38, further comprising means for conditionally keeping said status information when said user process is terminated.

71. The system of claim 70, wherein said conditionally keeping means comprises means for determining whether said user process terminates due to an expected or unexpected condition.

72. The system of claim 38, further comprising means for maintaining allocation of said storage structure when said user process is terminated.

73. The system of claim 38, wherein said data processing system comprises a plurality of operating systems and said data processing system further comprises means for modifying one or more controls of said storage structure, means for resetting a user control corresponding to said user process regardless of the operating system said user process is active on, and means for updating said status information of said user process.

74. A computer system comprising:

at least one operating system executing a user process; and a coupling facility coupled to said at least one operating system, said coupling facility comprising processing means and a storage structure, said storage structure comprising status information indicating whether said user process is attached to said storage structure.

75. The computer system of claim 74, wherein said storage structure is one of a cache structure and a list structure.

\* \* \* \* \*